United States Patent
Nathan et al.

(10) Patent No.: US 8,490,323 B2
(45) Date of Patent: Jul. 23, 2013

(54) RODENT TRAP HAVING A PIVOTING PLATFORM

(75) Inventors: Philip Nathan, Royal Oak, MI (US); Matthew L. Philips, Litchfield, CT (US); Lynn Briggs, Bristol, CT (US); Thomas Paul Danniger, Ostrander, OH (US); Richard Gene Foster, Powell, OH (US); Kenneth E. Schlack, Powell, OH (US); Mou Li Lin, Tainan (TW); Di Jun Yan, Hunan Province (CN)

(73) Assignee: OMS Investments, Inc., Los Angeles, CA (US)

( * ) Notice: Subject to any disclaimer, the term of this patent is extended or adjusted under 35 U.S.C. 154(b) by 306 days.

(21) Appl. No.: 12/904,279

(22) Filed: Oct. 14, 2010

(65) Prior Publication Data

US 2011/0072708 A1    Mar. 31, 2011

Related U.S. Application Data

(63) Continuation-in-part of application No. 11/956,963, filed on Dec. 14, 2007, now Pat. No. 7,921,593, and a continuation-in-part of application No. 11/956,912, filed on Dec. 14, 2007, now Pat. No. 7,886,479, and a continuation-in-part of application No. 12/139,849, filed on Jun. 16, 2008, now Pat. No. 7,814,702.

(51) Int. Cl.
*A01M 23/30* (2006.01)
*A01M 23/24* (2006.01)
*A01M 23/00* (2006.01)

(52) U.S. Cl.
USPC ............. 43/81; 43/81.5; 43/82; 43/83; 43/85; 43/77

(58) Field of Classification Search
USPC ................... 43/81, 81.5, 82, 83, 83.5, 85, 88, 43/90, 92–95, 77
See application file for complete search history.

(56) References Cited

U.S. PATENT DOCUMENTS

| 83,074 A | 10/1868 | McClure |
|---|---|---|
| 441,677 A | 12/1890 | Lovell |

(Continued)

FOREIGN PATENT DOCUMENTS

| EP | 0553336 | 8/1993 |
|---|---|---|
| EP | 0745323 | 12/1996 |

(Continued)

OTHER PUBLICATIONS

International Preliminary Report on Patentability and Written Opinion Dated Dec. 29, 2010 for International Application No. PCT/US2009/047499.

(Continued)

*Primary Examiner* — Darren W Ark
(74) *Attorney, Agent, or Firm* — Hunton & Williams LLP

(57) ABSTRACT

A trap with a housing having a first wall, an entrance, and a base; a latch mechanism coupled with the base; a pivoting platform pivotally coupled with the housing adjacent a juncture of the base and first wall and adapted to releasably engage with the latch mechanism; and a trigger plate assembly including a first trigger plate and a second trigger plate that are pivotally coupled with the pivoting platform. The first trigger plate is operably coupled with the latch mechanism and the second trigger plate is operably coupled with the first trigger plate. When the trap is triggered by an animal, the pivoting platform disengages from the latch mechanism and the pivoting platform and trigger plate assembly pivot toward the first wall of the housing, moving the rodent toward the first wall of the housing and trapping the rodent between the trigger plate assembly and the first wall of the housing.

6 Claims, 56 Drawing Sheets

U.S. PATENT DOCUMENTS

| | | | | |
|---|---|---|---|---|
| 691,301 A | | 1/1902 | Tschantre | |
| 982,486 A | | 1/1911 | Edwards | |
| 1,199,901 A | * | 10/1916 | Keeffner | 43/81 |
| 1,281,876 A | | 10/1918 | Taylor | |
| 1,323,400 A | | 12/1919 | Lokai | |
| 1,347,310 A | * | 7/1920 | Van Meter | 43/81 |
| D57,320 S | | 3/1921 | Dorsch | |
| 1,435,841 A | * | 11/1922 | Hall | 43/82 |
| 1,456,377 A | * | 5/1923 | Harried | 43/81 |
| 1,466,102 A | * | 8/1923 | Proctor | 43/81 |
| 1,500,332 A | * | 7/1924 | Preston | 43/82 |
| 1,507,532 A | * | 9/1924 | Vickers | 43/81 |
| 1,539,666 A | * | 5/1925 | Hagermann | 43/81 |
| 1,587,536 A | | 6/1926 | Lobit | |
| 1,616,552 A | | 2/1927 | Rulison | |
| 1,623,841 A | * | 4/1927 | King | 43/81 |
| 1,657,976 A | * | 1/1928 | Soucy | 43/81 |
| 1,677,470 A | | 7/1928 | Dorsch et al. | |
| 1,743,389 A | * | 1/1930 | Poncelet | 43/81 |
| 1,745,609 A | * | 2/1930 | Dorton | 43/85 |
| 1,747,380 A | * | 2/1930 | McCully | 43/61 |
| 1,794,463 A | * | 3/1931 | Kelp | 43/81 |
| 1,951,296 A | | 3/1934 | Klefman | |
| 2,059,937 A | * | 11/1936 | Ellis | 43/81 |
| 2,160,986 A | | 6/1939 | Rafferty et al. | |
| 2,161,874 A | * | 6/1939 | Lehn et al. | 43/83.5 |
| 2,169,783 A | * | 8/1939 | Allen | 43/75 |
| 2,187,001 A | * | 1/1940 | Uttz, Sr. | 43/83.5 |
| 2,195,484 A | | 4/1940 | George | |
| 2,416,481 A | * | 2/1947 | Hollenbeck | 43/81 |
| 2,495,454 A | * | 1/1950 | Hrabal | 43/83.5 |
| 2,510,655 A | | 6/1950 | Price et al. | |
| 2,525,010 A | * | 10/1950 | Allison | 43/83.5 |
| 2,529,589 A | | 11/1950 | Biery | |
| 2,581,327 A | * | 1/1952 | Knox | 43/82 |
| 2,590,316 A | * | 3/1952 | Heal | 43/83 |
| 2,592,302 A | | 4/1952 | Long | |
| 2,610,431 A | * | 9/1952 | Osborn et al. | 43/81 |
| 2,619,766 A | * | 12/1952 | Parkhurst | 43/81 |
| 2,684,553 A | * | 7/1954 | Schroeder | 43/81 |
| 3,045,384 A | * | 7/1962 | Gruschow et al. | 43/81.5 |
| 3,973,352 A | * | 8/1976 | Souza et al. | 43/92 |
| 4,000,578 A | * | 1/1977 | Souza | 43/92 |
| 4,030,230 A | | 6/1977 | Souza | |
| 4,127,958 A | | 12/1978 | Peters et al. | |
| 4,144,667 A | | 3/1979 | Souza | |
| 4,151,673 A | | 5/1979 | Campbell | |
| 4,231,180 A | | 11/1980 | Bare | |
| 4,245,423 A | | 1/1981 | Souza et al. | |
| 4,253,264 A | | 3/1981 | Souza | |
| 4,363,184 A | | 12/1982 | Marcolina | |
| 4,366,642 A | * | 1/1983 | Gardner et al. | 43/82 |
| 4,462,182 A | | 7/1984 | French | |
| 4,578,893 A | * | 4/1986 | Wickenberg | 43/77 |
| 4,685,245 A | | 8/1987 | LaPier | |
| 4,769,942 A | | 9/1988 | Copenhaver, Sr. | |
| 4,803,799 A | | 2/1989 | Vajs et al. | |
| D300,163 S | | 3/1989 | Landell et al. | |
| 4,852,294 A | * | 8/1989 | Langli | 43/81 |
| 4,856,225 A | | 8/1989 | Radesky et al. | |
| 4,858,373 A | | 8/1989 | Combs | |
| 4,926,581 A | | 5/1990 | Grivas | |
| 5,040,327 A | | 8/1991 | Stack et al. | |
| 5,044,111 A | | 9/1991 | Lindros | |
| 5,044,113 A | | 9/1991 | Stack et al. | |
| 5,107,619 A | * | 4/1992 | Zapata et al. | 43/81 |
| 5,148,624 A | * | 9/1992 | Schmidt | 43/81 |
| 5,172,512 A | * | 12/1992 | Bodker et al. | 43/81 |
| 5,185,953 A | | 2/1993 | Gross | |
| 5,267,411 A | * | 12/1993 | Phillips et al. | 43/81 |
| D346,199 S | | 4/1994 | Spragins et al. | |
| 5,337,512 A | | 8/1994 | Krenzler | |
| 5,384,981 A | | 1/1995 | Cohen | |
| 5,398,442 A | | 3/1995 | Musket | |
| 5,448,852 A | | 9/1995 | Spragins et al. | |
| 5,471,781 A | | 12/1995 | Vine | |
| 5,477,636 A | | 12/1995 | Musket | |
| 5,481,824 A | | 1/1996 | Fiore | |
| 5,572,825 A | | 11/1996 | Gehret | |
| 5,577,342 A | | 11/1996 | Johnson et al. | |
| D385,611 S | | 10/1997 | Prince et al. | |
| D386,554 S | | 11/1997 | Brewer | |
| 5,692,336 A | | 12/1997 | Fiore, Jr. et al. | |
| 5,746,020 A | | 5/1998 | Fiore, Jr. et al. | |
| 5,806,237 A | | 9/1998 | Nelson et al. | |
| D409,711 S | | 5/1999 | Johnson | |
| 5,950,353 A | | 9/1999 | Johnson et al. | |
| 5,950,354 A | * | 9/1999 | Carnwath | 43/81 |
| 6,047,494 A | | 4/2000 | Johnson et al. | |
| D441,828 S | | 5/2001 | Leyerle et al. | |
| 6,248,730 B1 | | 6/2001 | Poche | |
| 6,266,917 B1 | | 7/2001 | Hight | |
| 6,389,738 B1 | | 5/2002 | Denny et al. | |
| D459,428 S | | 6/2002 | Johnson et al. | |
| 6,397,517 B1 | | 6/2002 | Leyerle et al. | |
| 6,415,544 B1 | | 7/2002 | Leyerle et al. | |
| 6,481,151 B1 | | 11/2002 | Johnson et al. | |
| 6,493,988 B1 | | 12/2002 | Johnson | |
| 6,508,031 B1 | | 1/2003 | Johnson et al. | |
| 6,543,179 B1 | | 4/2003 | Lee | |
| 6,574,912 B1 | | 6/2003 | Johnson | |
| 6,594,948 B1 | | 7/2003 | Novack | |
| 6,609,328 B2 | | 8/2003 | Swift et al. | |
| 6,618,985 B1 | * | 9/2003 | Kaino | 43/88 |
| 6,622,422 B2 | | 9/2003 | Gehret et al. | |
| 6,631,582 B2 | | 10/2003 | Knuppel et al. | |
| D485,597 S | | 1/2004 | Turner | |
| 6,684,560 B2 | | 2/2004 | Lafforthun | |
| 6,691,452 B1 | | 2/2004 | Knuppel et al. | |
| 6,694,669 B2 | | 2/2004 | Gehret et al. | |
| 6,735,899 B1 | | 5/2004 | Anderson et al. | |
| 6,775,947 B2 | | 8/2004 | Anderson et al. | |
| 6,796,081 B2 | | 9/2004 | Anderson et al. | |
| 6,807,768 B2 | | 10/2004 | Johnson et al. | |
| 6,836,999 B2 | | 1/2005 | Rich et al. | |
| 6,938,368 B2 | | 9/2005 | Guidry | |
| 6,955,007 B2 | | 10/2005 | Gehret et al. | |
| 6,990,766 B2 | | 1/2006 | Gehret et al. | |
| D514,655 S | | 2/2006 | Rodgers et al. | |
| D515,175 S | | 2/2006 | Mayo et al. | |
| 7,010,882 B2 | | 3/2006 | Rich et al. | |
| 7,069,688 B2 | | 7/2006 | Hill | |
| 7,089,701 B2 | | 8/2006 | Frisch | |
| D529,571 S | | 10/2006 | Hoyes | |
| 7,171,777 B2 | | 2/2007 | Welin-Berger | |
| 7,219,466 B2 | | 5/2007 | Rich et al. | |
| 7,231,738 B2 | | 6/2007 | Watson et al. | |
| D573,224 S | | 7/2008 | Rodriguez | |
| D577,412 S | | 9/2008 | Nathan et al. | |
| D589,583 S | | 3/2009 | Phillips et al. | |
| D589,584 S | | 3/2009 | Phillips et al. | |
| 7,506,471 B2 | * | 3/2009 | Rodgers et al. | 43/77 |
| 7,607,254 B1 | * | 10/2009 | Huang | 43/85 |
| 7,814,702 B2 | | 10/2010 | Nathan | |
| 7,921,593 B2 | * | 4/2011 | Everett et al. | 43/85 |
| 8,104,222 B2 | * | 1/2012 | Hovey | 43/83.5 |
| 2003/0084603 A1 | | 5/2003 | Lafforthun | |
| 2003/0215481 A1 | | 11/2003 | Borchert et al. | |
| 2004/0025410 A1 | | 2/2004 | Shapland | |
| 2004/0088903 A1 | | 5/2004 | Poche | |
| 2004/0244274 A1 | | 12/2004 | Dellevigne et al. | |
| 2005/0279015 A1 | | 12/2005 | Hall | |
| 2006/0032110 A1 | | 2/2006 | Yang | |
| 2006/0042153 A1 | | 3/2006 | Bowerman | |
| 2006/0053682 A1 | * | 3/2006 | Goldstein | 43/67 |
| 2006/0117644 A1 | | 6/2006 | Hoyes et al. | |
| 2006/0156615 A1 | * | 7/2006 | Hale | 43/81 |
| 2006/0156617 A1 | * | 7/2006 | Hale | 43/81 |
| 2006/0265941 A1 | | 11/2006 | Newton | |
| 2006/0272197 A1 | | 12/2006 | Wiesener et al. | |
| 2007/0017148 A1 | | 1/2007 | Blau | |
| 2007/0017149 A1 | | 1/2007 | Rodgers et al. | |
| 2007/0277426 A1 | | 12/2007 | Wolgram | |
| 2008/0120896 A1 | | 5/2008 | Johnson | |
| 2009/0151223 A1 | | 6/2009 | Nathan et al. | |
| 2009/0151225 A1 | | 6/2009 | Everett et al. | |

FOREIGN PATENT DOCUMENTS

| | | |
|---|---|---|
| EP | 0806138 | 11/1997 |
| EP | 0280504 | 8/1998 |
| EP | 1149350 | 10/2001 |
| EP | 1149530 | 10/2001 |
| EP | 1300077 A2 * | 4/2003 |
| FR | 534482 | 3/1922 |
| GB | 2095526 A * | 10/1982 |
| GB | 2329125 | 3/1999 |
| GB | 2332356 A * | 6/1999 |
| GB | 2384966 | 8/2003 |
| GB | 2393628 A * | 4/2004 |
| JP | 6165630 | 6/1994 |
| JP | 2000270753 A * | 10/2000 |
| WO | 02/102147 | 12/2002 |
| WO | 03/059057 | 7/2003 |
| WO | 2005/022992 | 3/2005 |
| WO | 2005/072524 | 8/2005 |

OTHER PUBLICATIONS

European Search Report from EP 09767593.8 dated Dec. 6, 2012.
International Search Reported Dated Jan. 26, 2009 for International Application No. PCT/US08/85683.
Written Opinion of the International Searching Authority for PCT/US2008/085683, mailed Jan. 26, 2009, 5 pages.
International Preliminary Report on Patentability for PCT/US2008/085683, issued Jun. 15, 2010, 6 pages (including Written Opinion of the International Searching Authority, mailed Jan. 15, 2009).
International Preliminary Report on Patentability for PCT/US2008/085676, issued Jun. 15, 2010, 5 pages (including Written Opinion of the International Searching Authority, mailed Jan. 15, 2009).
Notification of Transmittal of the International Search Report and the Written Opinion of the International Searching Authority, or the Declaration for PCT/US09/047499, mailed Jul. 31, 2009, 1 page.
International Search Report for PCT/US2009/047499, mailed Jul. 31, 2009, 2 pages.
International Preliminary Report on Patentability for PCT/US2009/047499, issued Dec. 18, 2010, 6 pages (including Written Opinion of the International Searching Authority, mailed Jul. 31, 2009).
International Preliminary Report on Patentability for PCT/US2008/085690, issued Jun. 15, 2010, 6 pages (including Written Opinion of the International Searching Authority, mailed Feb. 4, 2009).

* cited by examiner

RODENT TRAP HAVING A PIVOTING PLATFORM

CROSS-REFERENCE TO RELATED APPLICATION

This application is a continuation-in-part of, claims priority to, and incorporates by reference in their entirety U.S. application Ser. No. 11/956,963 filed on Dec. 14, 2007; U.S. application Ser. No. 11/956,912, filed on Dec. 14, 2007; and U.S. application Ser. No. 12/139,849, filed on Jun. 16, 2008, which is a continuation-in-part of U.S. application Ser. No. 11/956,929 filed on Dec. 14, 2007.

FIELD OF THE INVENTION

The present embodiments relate to animal traps in general, and more particularly to rodent traps having a pivoting platform, which when triggered, traps and contains the rodent within the trap.

BACKGROUND INFORMATION

Conventional animal traps are not always self contained. In other words, in conventional traps the trapping mechanism, and therefore the trapped animal, are open to the environment so that they are visible to and accessible from the environment. For example, in conventional rodent traps having a spring loaded wicket trap or "glue trap," the "trapped" rodent is visible. When the rodent is trapped, it is often still alive. Thus making disposal of the trap difficult and uncomfortable for some people. In addition, because these type of traps are not self-contained children and/or pets may accidentally trigger the traps and/or get caught in the trap. For example, a dog may attempt to eat the bait on the spring loaded wicket trap and have the wicket come down on the dog's snout. With respect to glue traps, a child may step on the trap and have a difficult time removing the trap and/or glue. These and other problems exist with conventional traps.

The description herein of certain advantages and disadvantages of known methods and devices is not intended to limit the scope of the present invention. Indeed the present embodiments may include some or all of the features described above without suffering from the same disadvantages.

SUMMARY OF THE INVENTION

In view of the foregoing, one or more embodiments include a trap that securely traps a rodent, such as a mouse, within an enclosure. The enclosure can have limited external accessibility and visibility, thus the trap and rodent can be disposed of without seeing and/or touching the rodent.

At least one embodiment provides a trap having a housing with an entrance, a first wall, and a base extending therebetween; a latch mechanism coupled with the base; a pivoting platform pivotally coupled with the housing adjacent a juncture of the base and the first wall of the housing, and adapted to releasably engage with the latch mechanism; and a trigger plate assembly comprising a first trigger plate pivotally coupled with the pivoting platform and operably coupled with the latch mechanism; and a second trigger plate pivotally coupled with the pivoting platform and operably coupled with the first trigger plate. The trigger plate assembly, when triggered by a rodent, disengages the pivoting platform from the latch mechanism, and the pivoting platform and trigger plate assembly pivot towards the first wall of the housing, moving the rodent toward the first wall of the housing and trapping the rodent between the trigger plate assembly and the first wall of the housing.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

The following description is intended to convey a thorough understanding of the embodiments by providing a number of specific embodiments and details involving an animal trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the animal traps of the various exemplary embodiments described herein have a housing having an entrance providing a passageway into the housing, a platform or trigger plate coupled to the housing, which when an animal, such as a mouse, triggers the trap, the platform or trigger plate and mouse move towards the housing and traps the mouse against the housing.

The various exemplary embodiments generally described devices that "trap" an animal, e.g., a mouse. In the various embodiments, the animal may simply be trapped inside the device so that it cannot escape from the device. However, the embodiments are not so limited. In various embodiments, the trapped animal may be immobilized, injured or killed. For example, in various exemplary embodiments, the trapped animal may be immobilized inside the device by the device itself or by one or more blunt fingers inside the device. Where the trapped animal is a mouse, immobilizing the mouse may cause the mouse to develop hypothermia which may eventually kill the mouse. In other embodiments, the device may injure the trapped animal, such as by crushing it, or impaling it. In other embodiments, the trapped animal may suffer a fatal injury, such as a broken neck.

Figure 1:
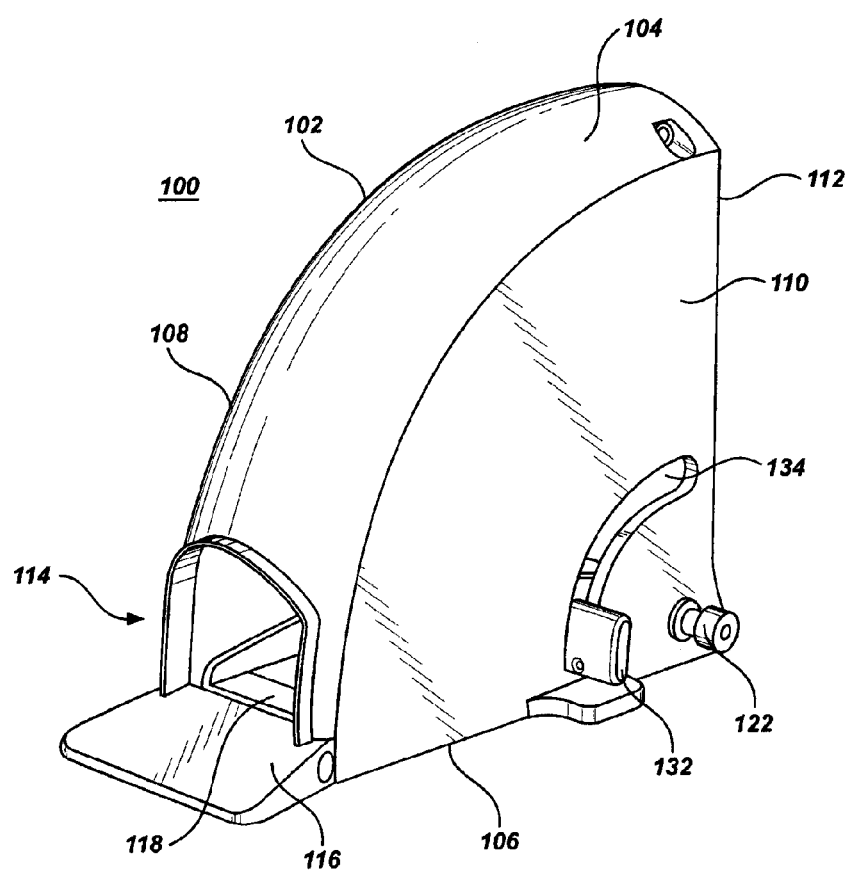
FIG. 1 depicts a perspective view of a trap in accordance with an exemplary embodiment.

Referring to FIG. 1, a perspective view of a trap in accordance with an exemplary embodiment is illustrated. It should be appreciated that trap 100 is a simplified view of an exemplary trap and may include additional elements that are not depicted. As shown, the trap 100 may include a housing 102. The housing 102 may include a top wall 104, a bottom 106 or base, a first side wall 108, a second side wall 110, and a back wall 112. Although the housing 102 is depicted as comprising one piece, the housing 102 may comprise multiple pieces. The top wall 104 may be rounded and extend from the back wall 112 towards the front of the housing 102. The housing 102 may include an entrance 114, e.g., a passageway into the housing 102. For example, the top wall 104 may form an entrance 114 at a location which is close to or at the junction where the top wall 104 meets the bottom 106 of the housing 102. The first side wall 108 and second side wall 110 may be positioned on the longer, opposite sides of the bottom 106. The back wall 112 and entrance 114 may be positioned on the narrower, opposite sides of the bottom 106. The housing 102 may include a ramp 116 at or near the entrance 114. The ramp 116 may be angled at a first end and terminate at a second end such that the higher end of the ramp 116 is approximately flush with a platform 118 which may be adjacent to the ramp 116. The incline of the ramp 116 may assist in attracting an animal to enter the trap 100.

Figure 2:
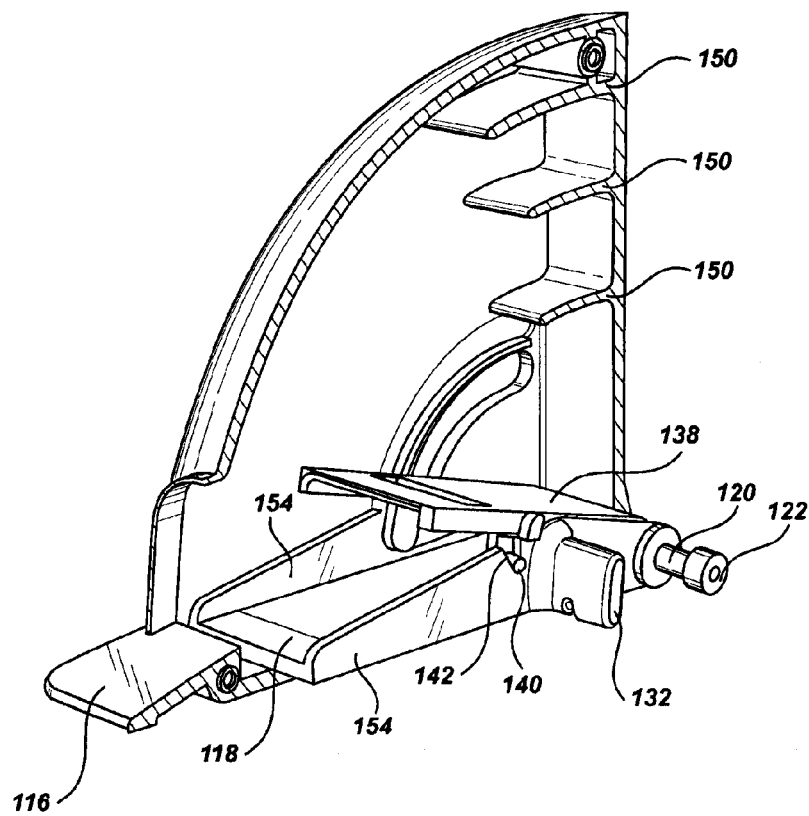
FIG. 2 depicts a perspective view of a trap, without a sidewall, in accordance with an exemplary embodiment.

Referring to FIG. 2, a perspective view of the trap, without a sidewall, in accordance with an exemplary embodiment is illustrated. As shown, the trap 100 may include a platform 118 pivotally coupled to the housing 102. A pivoting element may pivotally couple the platform 118 to the housing 102. For example, the pivoting element may include a rod 120 having one or two threaded ends. The platform 118 may include a slot (not shown) to receive the rod 120. The threaded ends of the rod 120 may extend beyond the first and second sidewalls, 108, 110. A nut 122 may secure each threaded end of the rod 120 to the housing 102. In other embodiments, a screw may be used in conjunction with or in place of the rod 120. In such an embodiment, the screw head and a nut 122 on the threaded end of the screw may secure the screw to the housing 102. In other embodiments, other pivoting elements may be used to pivotally couple the platform 118 to the housing 102.

Figure 3A:
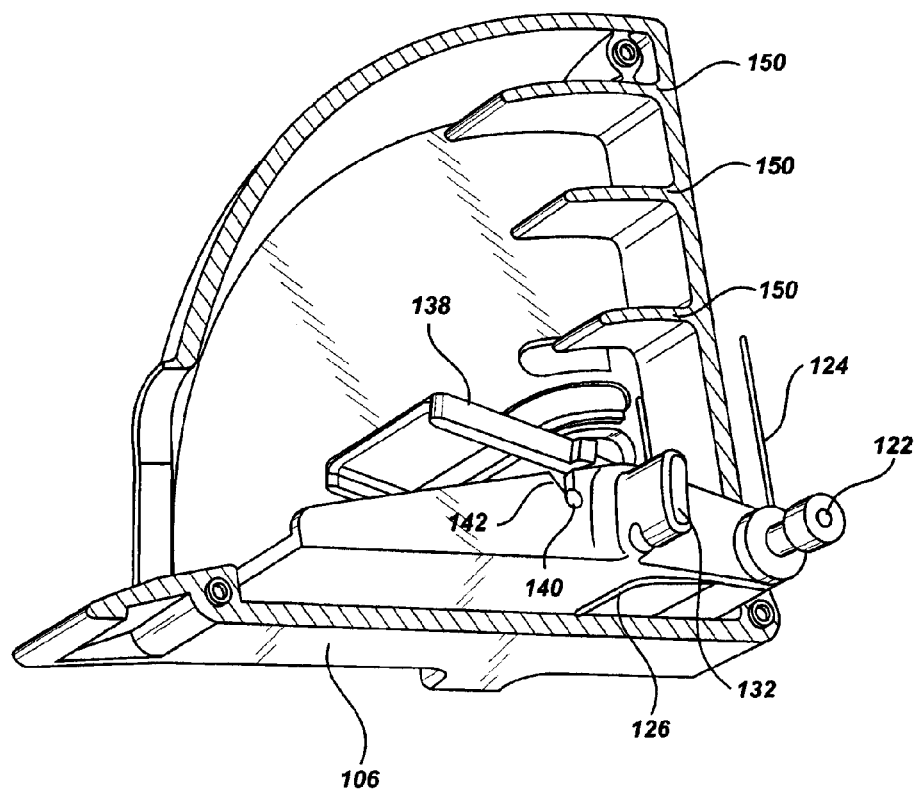
FIG. 3A depicts a perspective view of a trap having a biasing element in accordance with an exemplary embodiment.
Figure 3B:
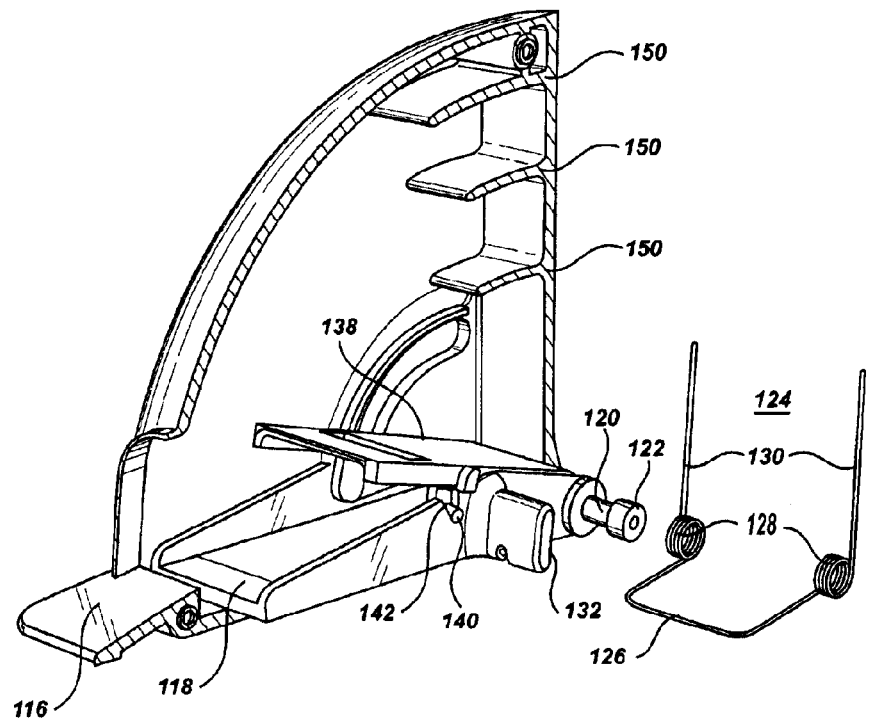
FIG. 3B depicts a perspective view of a trap and a biasing element in accordance with an exemplary embodiment.

Referring to FIGS. 3A and 3B, perspective views of the trap having a biasing element in accordance with an exemplary embodiment are illustrated. The biasing element 124 may bias the platform 118 towards the back wall 112 of the housing 102. As shown, the biasing element 124 may be a torsion spring. Specifically, the torsion spring 124 may be a double segmented torsion spring having a biased end 126, two coils 128, and two leverage ends 130. The biased end 126 may be positioned between the platform 118 and the bottom 106 of the housing 102. The coils 128 may form openings such that the coils 128 may receive the pivoting element, e.g., the rod 120, and couple the torsion spring 124 to the housing 102. The platform 118 may include one or more slots (not shown) to allow the coils 128 to reside in a position to receive the rod 120. The leverage ends 130 may be positioned within the housing 102 and may leverage the tension spring 124 against the back wall 112 of the housing 102. It is appreciated that a single segmented torsion spring having a single biased end 126, a single coil 128, and a single leverage end 130 may be used as well as other biasing elements which may bias the platform 118 towards the back wall 112 of the housing 102.

Figure 4:
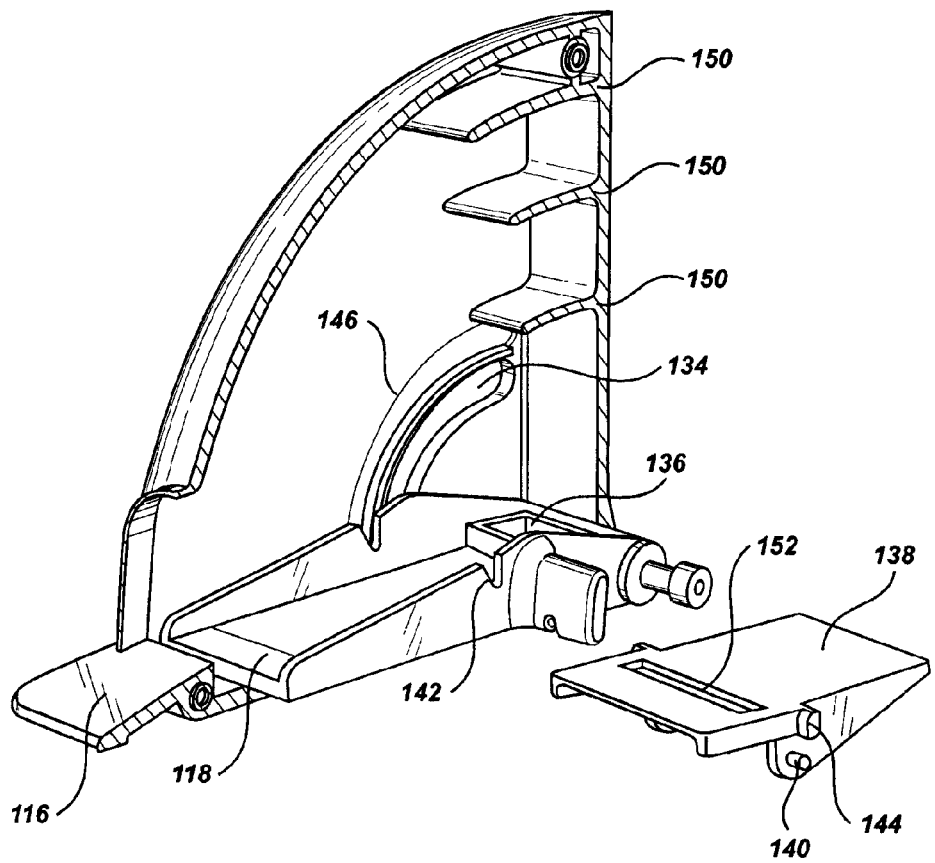
FIG. 4 depicts a perspective view of the platform and a trigger in accordance with an exemplary embodiment.

Referring to FIG. 4, a perspective view of the platform and a trigger in accordance with an exemplary embodiment is illustrated. As shown, the platform 118 may include sides 154 which may assist in positioning an animal on the platform 118 by directing the animal towards the center of the platform 118. The platform 118 may include a tab 132 to assist in moving the platform 118. The tab 132 may extend from the platform 118, e.g., from a side 154 of the platform. The tab 132 may be used to move the platform 118 from a triggered position, e.g., when the platform 118 is biased towards the rear wall 110, to a latched position, e.g., when the platform 118 is positioned on top of the bottom 106 of the housing 102 (adjacent to the entrance 114). The housing 102 may include one or more slots 134 or cutouts from which a tab 132 may extend from the interior of the housing 102 to the exterior of the housing 102. It is appreciated that multiple tabs 132 and multiple slots 134 may be used or other setting means may be used to move the platform 118 from the triggered position to the latched position. For example, the platform 118 may have tabs 132 that extend from two sides of the platform 118. In another example, a push bar (not shown) may have one end extend from the back wall 112 (via an aperture) with the other end coupled to the platform 118. By pushing on the push bar, the platform 118 may be moved from a triggered position to a latched position. In yet another example, a handle or lever (not shown) may have one end extend from the housing 102 (via an aperture) with the other end coupled to the platform 118. By moving the handle or lever from a first position to a second position, the platform 118 may be moved from a triggered position to a latched position.

The platform 118 may include an attractant reservoir 136 configured to hold an attractant (not shown). The attractant may be a scent, a rodenticide, and/or bait. The housing 102 may include an opening (not shown) to allow an attractant to be placed in the attractant reservoir 136. For example, the opening may allow a knife having food, e.g., peanut butter or cheese, to be placed in the attractant reservoir 136 to assist in attracting an animal, such as a mouse, to the trap 100. More specifically, the attractant may assist in attracting an animal onto the platform 118.

Referring to FIG. 2 again, the trap 100 may include a trigger (or trigger mechanism) 138 operatively coupled to the platform 118. More specifically, the trigger 138 may be pivotally connected to the platform 118. For example, the trigger 138 may include mating projections 140 on each side of the trigger 138. The mating projections 140 may be adapted to mate with mating slots 142 on the platform 118. The mating projections 140 and mating slots 142 may interact to allow the trigger 138 to pivot with respect to the platform 118. In other embodiments, other coupling elements may be used to couple a trigger 138 to a platform 118 in which the triggering of the trigger 138 causes the platform 118 to move towards the back wall 112 of the housing 102. In other embodiments, the platform 118 may move towards a wall of the housing 112 or towards the housing 112 if the housing 112 does not have a "wall."

Referring to FIG. 4 again, the trigger 138 may include one or more channel projections 144. Each channel projections 144 may extend from the side of the trigger 138 and may be adapted to interact with one or more corresponding channels 146 on the side walls 108, 110. It is appreciated that no guidance elements or other guidance elements may be used to assist in guiding the trigger 138 towards the back wall 112 of the housing 102.

Figure 5A:
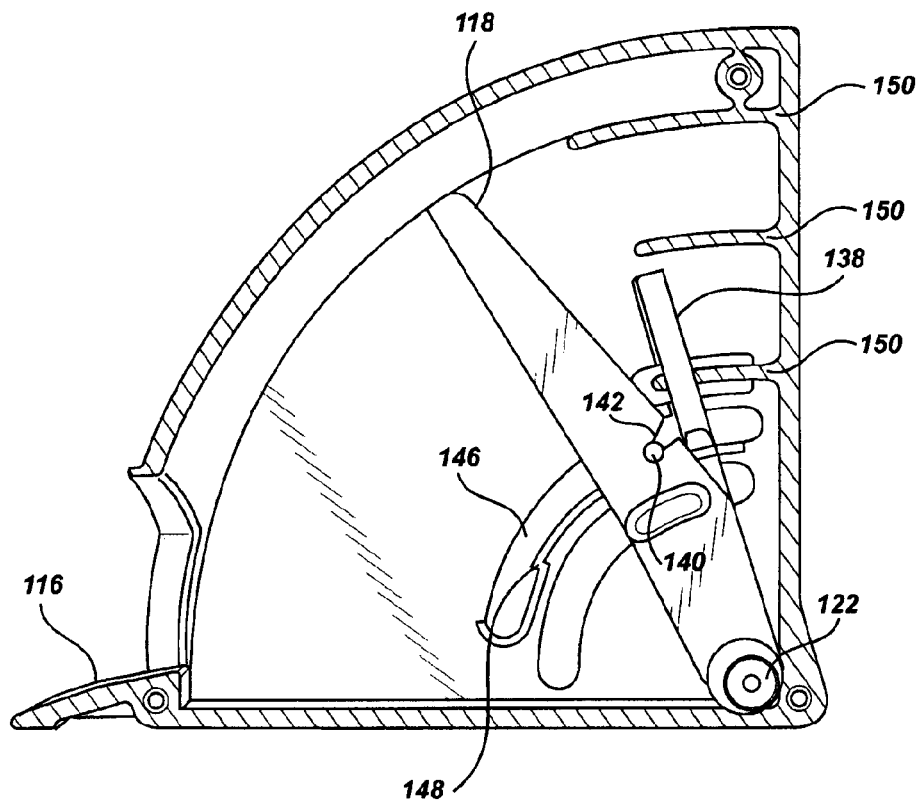
FIG. 5A depicts a side view of a trap in between the latched position and the unlatched position in accordance with an exemplary embodiment.
Figure 5B:
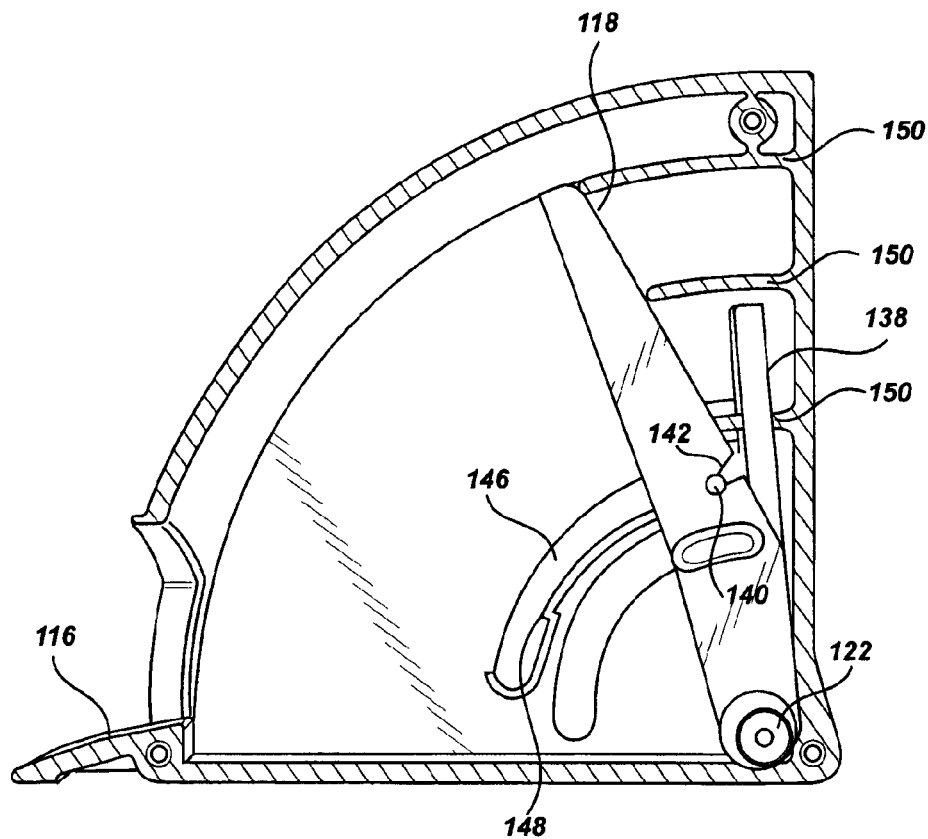
FIG. 5B depicts a side view of a trap in the unlatched position in accordance with an exemplary embodiment.

Referring to FIGS. 5A and 5B, perspective views of the platform in various unlatched positions in accordance with an exemplary embodiment are illustrated. As shown, a corresponding channel 146 may reside in the side wall 108. In addition, a corresponding channel 146 may reside in the other side wall 110. Each channel 146 may include a lip 148. The lip 148 may be located near the bottom of the side wall 108, 110. The lip 148 may be adapted to set or position the trigger 138 and platform 118 in a latched position when a channel projection 144 extending from the trigger 138 is positioned under the lip 148. For example, a channel projection 144 may extend from two sides of the trigger 138, with each channel projection 144 setting the trigger 138 and platform 118 in the latched position. When triggered, each channel projection 144 may unlatch from the lip 148 and move along the channel 146 towards the back wall 112 of the housing 102. Thus, the lip 148 may be a retention mechanism for retaining the platform 118 in the latched or set position. During this movement, each channel projection 144 may slidingly engage with a corresponding channel 146.

Referring to FIG. 2 again, the trap 100 is shown in a latched position. When setting the trap 100 in the latched position, the platform 118 (and connected trigger 138) are moved from the triggered position, e.g., when the platform 118 is biased against the back wall 112, to the latched position, e.g., when the platform 118 is positioned above the bottom 106 of the housing 102. In the latched position, the platform 118 may be adjacent to the entrance 114. To move the platform 118 from the triggered position to the latched position, a force may be applied to the tab 132 to move the platform 118 to the latched position. In other embodiments, a push bar, handle, lever, or another means for moving the platform 118 and trigger 138, may be used. When moving the platform 118 to the latched position, each channel projection 144 slides or moves in the corresponding channel 146 until the channel projection 144 catches the lip 148. When an animal, such as a mouse, enters the trap 100 via the entrance 114, the animal crosses the ramp 146 and steps on the platform 118. When the animal triggers the trigger 138, e.g., each channel projection 144 unlatches from the lip 148 in the channel 146 and the biasing element 126 causes the platform 118 (and animal) to move towards the back wall 112 of the trap 100. For example, when a mouse brushes or pushes the trigger 138 upwards, the trigger 138 is triggered and the platform 118 and mouse move towards the back wall 112 where the mouse is trapped between the platform 118 and the back wall 112 of the housing 102.

Referring to FIGS. 5A and 5B again, the trap 100 may include one or more blunt fingers 150, e.g., protrusions. As shown, the blunt fingers 150 extend, e.g., laterally, from the back wall 112. In other embodiments, one or more blunt fingers may extend, e.g., laterally, from the first side wall 108 and/or the second side wall 110. In other embodiments, the one or more blunt fingers may extend from the top 104 of the housing 102. The one or more blunt fingers 150 may have different widths, e.g., the distance each extends from the back wall 112. The blunt fingers 150 may assist in trapping an animal within the trap 100. For example, when the trap 100 is triggered as recited above, the biasing element 128 biases the platform 118 towards the back wall 112, the mouse may contact the one or more blunt fingers 150. As shown in FIGS. 2, 5A and 5B, the trigger 138 may include one or more slots 152 which allow the blunt fingers 150 to pass through the trigger 138. Depending on the configuration of the blunt fingers 150, the mouse may be trapped within the trap 100 between the platform 118 and the one or more blunt fingers 150. The one or more blunt fingers 150 may be adapted to impale the animal or to assist in trapping the animal without impaling the animal. In other embodiments of the trap 100 that do not include blunt fingers 150, the animal may be trapped between the platform 118 and the back wall 112. In other embodiments, e.g., the traps 600, 700, 800 recited below, may include one or more blunt fingers 150. An animal, such as a mouse, may be trapped between the platform of the traps and one or more blunt fingers 150 as recited above.

Figure 6:
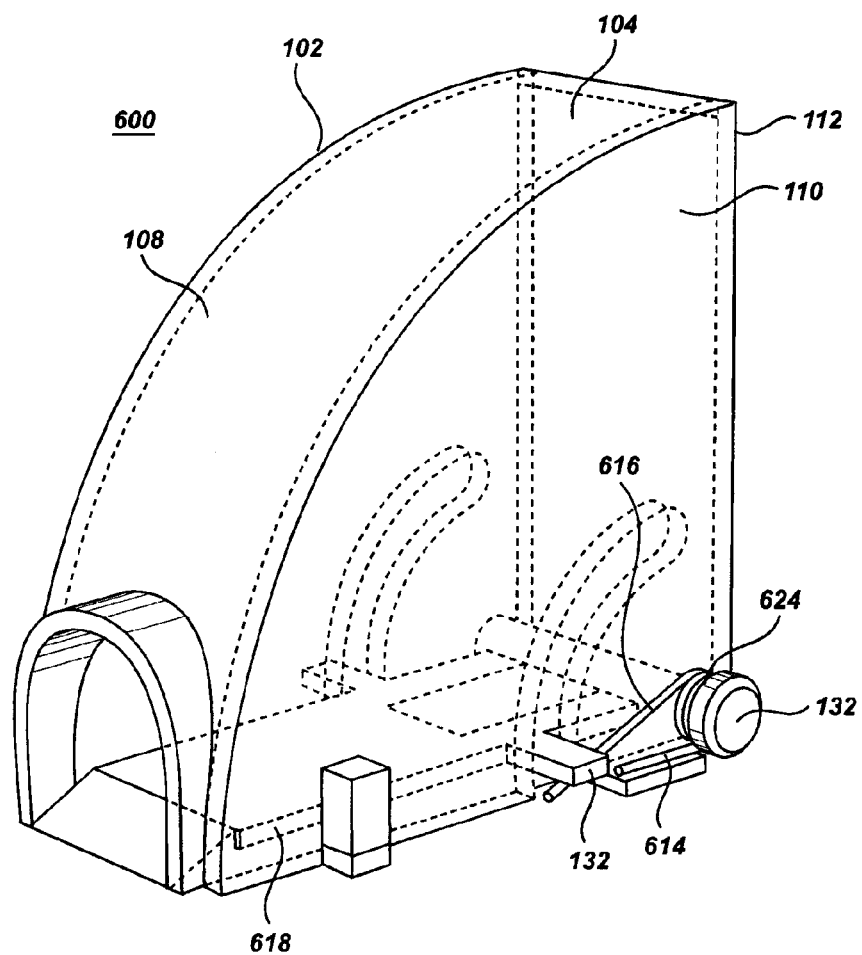
FIG. 6 depicts a perspective view of a trap in accordance with an exemplary embodiment.

Referring to FIG. 6, a perspective view of a trap in accordance with an exemplary embodiment is illustrated. It should be appreciated that trap 600 is a simplified view of another embodiment of the trap 100 illustrated in FIG. 1 and may include additional elements that are not depicted. The trap 600 illustrated in FIG. 6 is similar to the trap 100 illustrated in FIG. 1. For example, the housing 102 is similar and the platform 618 is pivotally coupled to the housing 102. However, the platform 618 and trigger 638 in FIG. 6 differ from the platform 118 and trigger 138 in FIG. 1. In other embodiments, other platforms and/or triggers may be used where the platform moves from a latched position towards the back wall 112 of the housing 102 when the trigger is triggered.

Figure 7:
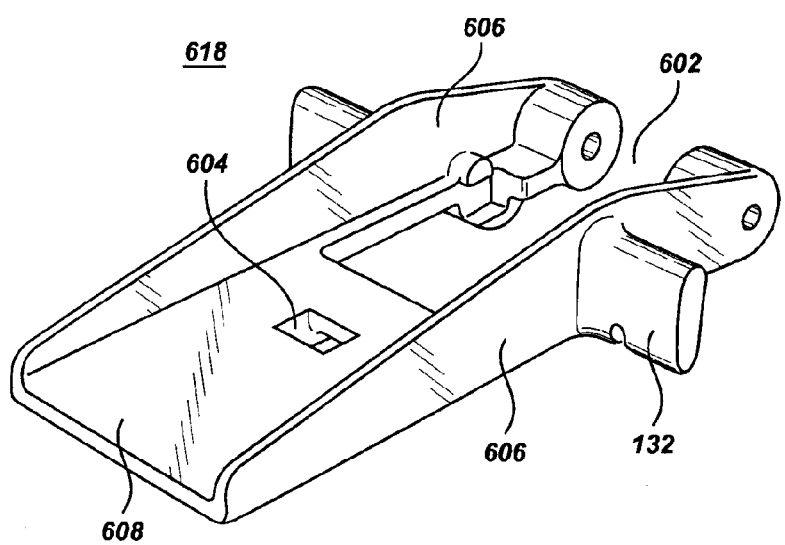
FIG. 7 depicts a perspective view of a platform in accordance with an exemplary embodiment.

Referring to FIG. 7, a perspective view of the platform 618 in accordance with an exemplary embodiment is illustrated. As shown, the platform 618 may include a cutout 602, an aperture 604, sides 606, and a surface 608. The cutout 602 may be adapted to receive a trigger 638 (discussed in further detail below). The aperture 604 may be adapted to receive a catch tab 610 of a catch 612 (discussed in further detail below). The sides 606 may assist in positioning an animal on the platform 618 by directing the animal towards the center of the platform 618. The surface 608 of the platform 618 may be flat or angled. For example, the surface 608 of the platform 618 may be angled and continue the incline of the ramp 116.

Referring to FIG. 6 again, the trap 600 may include a biasing element 624 to bias the platform 618 towards the back wall 112. As shown, the biasing element 624 may be a spring, such as a tension spring, operatively coupled to the rod 120. The biasing element 624 may be positioned between the exterior of a side wall, such as the second side wall 110, and a nut 122. As shown, the biasing element 624 may have a first end 614 anchored or tensioned against the bottom 106 of the housing 102 and a second end 616 anchored or tensioned against the tab 132 of the platform 618. In other embodiments, the biasing element 624 may be positioned within the housing 102. For example, the biasing element 624 may be positioned in the interior of the housing 102 with the first end 614 and second end 616 of the biasing element 624 residing inside the housing 102 as well. In other embodiments, other biasing elements may be used to bias the platform 618 towards the back wall 112 of the housing 102.

Figure 8:
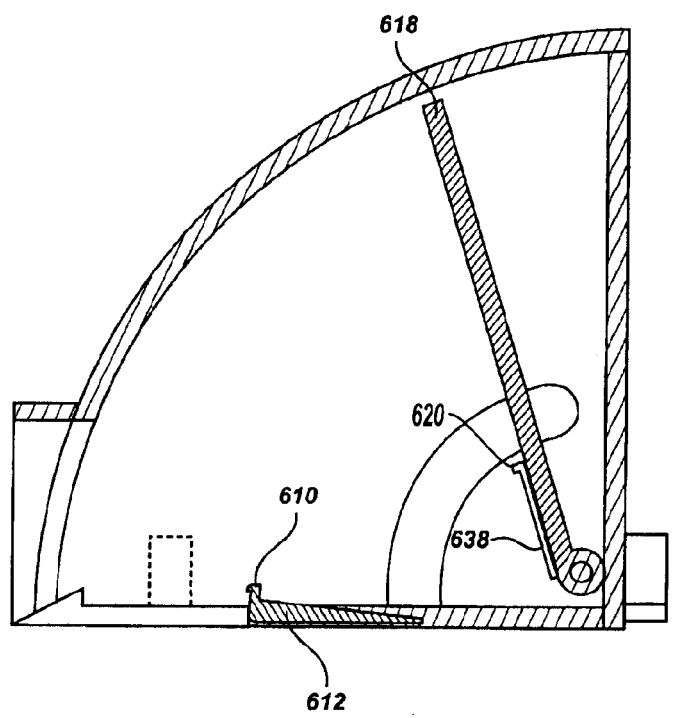
FIG. 8 depicts a side view of a trap in the unlatched position in accordance with an exemplary embodiment.
Figure 9:
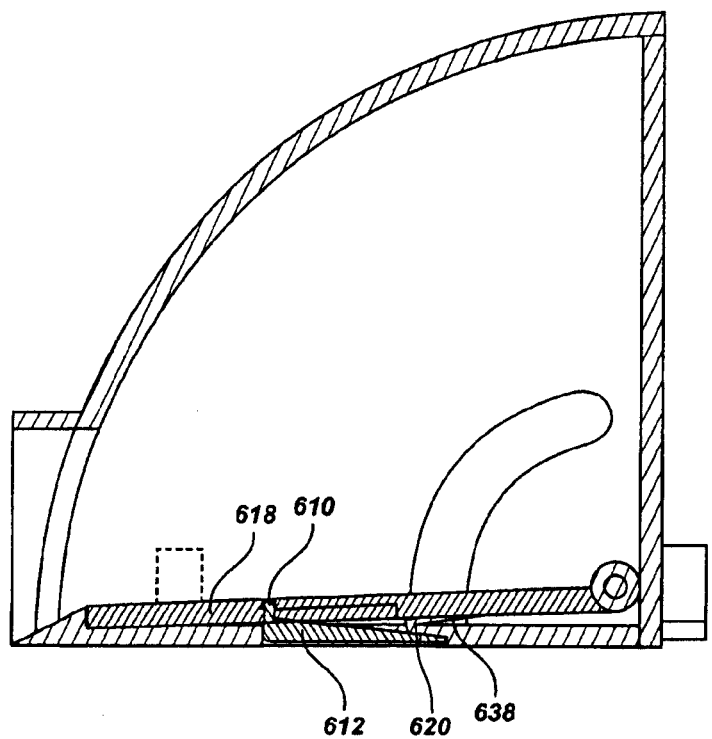
FIG. 9 depicts a side view of a platform in the latched position in accordance with an exemplary embodiment.
Figure 10:
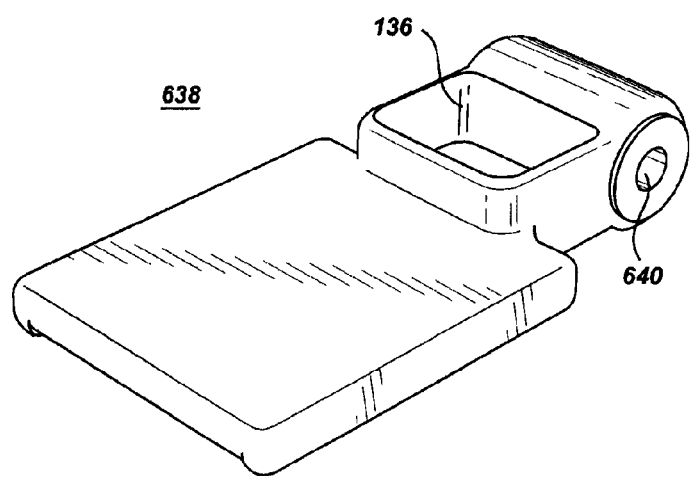
FIG. 10 depicts a perspective view of a catch in accordance with an exemplary embodiment.

Referring to FIGS. 8 and 9, side views of the trap with the platform in the triggered position and in the latched position, respectively, in accordance with exemplary embodiments are illustrated. As shown, the trap 600 may include a trigger (or trigger mechanism) 638 embedded in the platform 618, e.g., in the cutout 602 of the platform 618, and a catch 612 positioned below the platform 618. The trigger 638 may be operatively coupled to the housing 102. For example, the trigger 638 may include a slot 640 (as shown in FIG. 10) which may receive the rod 120, thus pivotally connecting the trigger 638 to the housing 102. As shown in FIG. 8, when the platform 618 is in the triggered position, the trigger 638 may move with the platform 618 since the trigger 638 is embedded in the platform 618 and is pivotally coupled to the rod 120. The trigger 638 may be pivotally coupled to the rod 120 such that when the platform 618 is in the latched position, the trigger is approximately flush with the surface 608 of the platform 618 and may be adjacent the entrance 114. The trigger 638 may include a downward protrusion or tab 620 at one end of the trigger 638 with the downward protrusion 620 extending downward towards the bottom 106 of the housing 102 when the platform 618 is in the latched position. The trigger 638 may be adapted to be operatively coupled to the catch 612 in the latched position. As shown in FIG. 9, when the platform 618 is in the latched position, the downward protrusion 620 may either be in contact or proximate to the catch 612. The trigger 638 may be pivotally positioned such that when the platform 618 is in the latched position and weight is placed on the trigger 638, e.g., a mouse steps on the trigger 638, the trigger 638 may pivot downward. In response to the trigger 638 pivoting downwardly, the catch 612 may move, e.g., pivoting away from the aperture 604 in the platform 618, releasing the platform 618. The biasing element 624 may cause the platform 618 to move towards the back wall 112. As a result, the animal, e.g., mouse, may be trapped between the platform 618 and the back wall 112. If the housing 102 includes the one or more blunt fingers 150 as described above with reference to trap 100, the animal, e.g., mouse, may be trapped between the platform 618 and one or more blunt fingers 150.

Referring to FIG. 10, a perspective view of a trigger 638 in accordance with an exemplary embodiment is illustrated. As shown, the trigger 638 may include an attractant reservoir 136 configured to hold an attractant (not shown). The attractant may be a scent, a rodenticide, and/or bait. The back wall 112, first side wall 108, and/or second side wall 110 may include an opening (not shown) to allow an attractant to be placed in the attractant reservoir 136. For example, using a knife, peanut butter or cheese may be placed in the attractant reservoir 136 to assist in attracting an animal, such as a mouse, to the trap 100.

Figure 11:
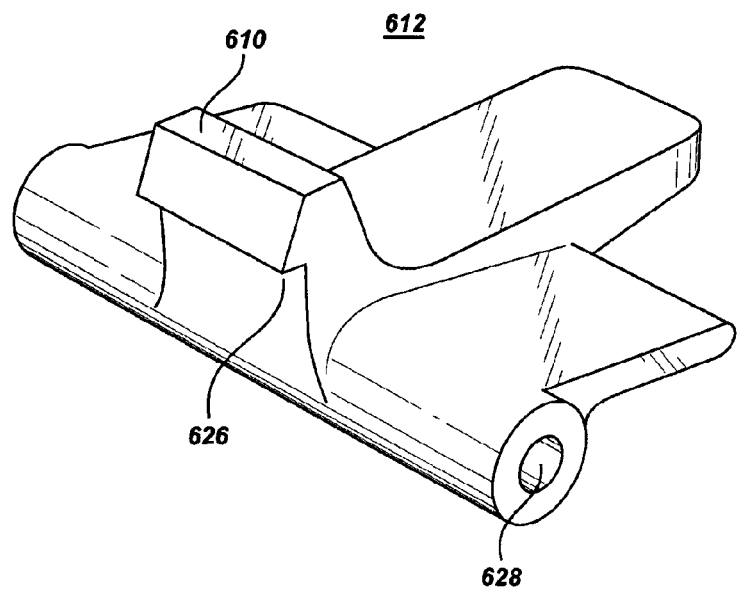
FIG. 11 depicts a perspective view of a trigger in accordance with an exemplary embodiment.

Referring to FIG. 11, a perspective view of a catch 612 in accordance with an exemplary embodiment is illustrated. As shown, the catch 612 may include an upward protrusion or catch tab 610 with a lip 626 adapted to engage the aperture 604 in the platform 618 and to assist in retaining the platform 618 in the latched position. Thus, the lip 626 may be a retention mechanism for retaining the platform 618 in the latched or set position. The platform 618 may be adapted, near the aperture 604, to receive the catch tab 610 and lip 626 such that the lip 626 may engage the platform 618 when the catch 612 is positioned to retain the platform 618 in the latched position. The catch 612 may be pivotally coupled to the housing 102. For example, the catch 612 may include a slot 628 adapted to receive a rod (not shown) which may be anchored in either the bottom 106 of the housing 102 or to the housing 102, e.g., to the first and second side walls 108, 110. By pivoting the catch 612, the catch 612 may engage the platform 618, e.g., the catch tab 610 may protrude through the aperture 604 in the platform 618 and retain the platform 618 in the latched position. When a force is applied to the trigger 638 (e.g., an animal steps on the trigger 638), the trigger 638 pivots downward causing the downward protrusion 620 of the trigger 638 to force the catch 612 to pivot or move, thereby causing the lip 626 of the upward catch tab 610 to unlatch or disengage from the platform 618, thereby releasing the platform 618 to move towards the back wall 112 due to the biasing element 624.

Figure 12:
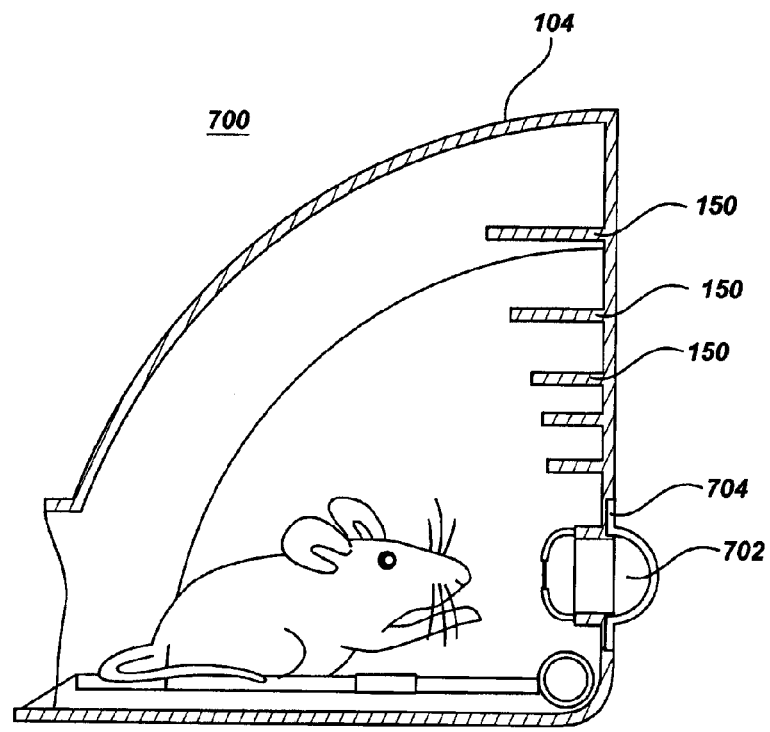
FIG. 12 depicts a side view of a trap, in the latched position in accordance with an alternate exemplary embodiment.

Referring to FIG. 12, a side view of a trap, in the latched position, having a blister pack in accordance with an exemplary embodiment is illustrated. As shown, the trap 700 may include a blister pack 702 operatively coupled to the back wall 112. The blister pack 702 may include an attractant, such as a scent, rodenticide, and/or bait. The back wall 112 may include an opening 704 adapted to receive the blister pack 702. The use of opening 704 may allow for the replacement of the blister pack 702. For example, if the trap 700 has not trapped an animal for a period of time, the existing blister pack 702 may be replaced with other another blister pack 702 having a different attractant.

Figure 13:
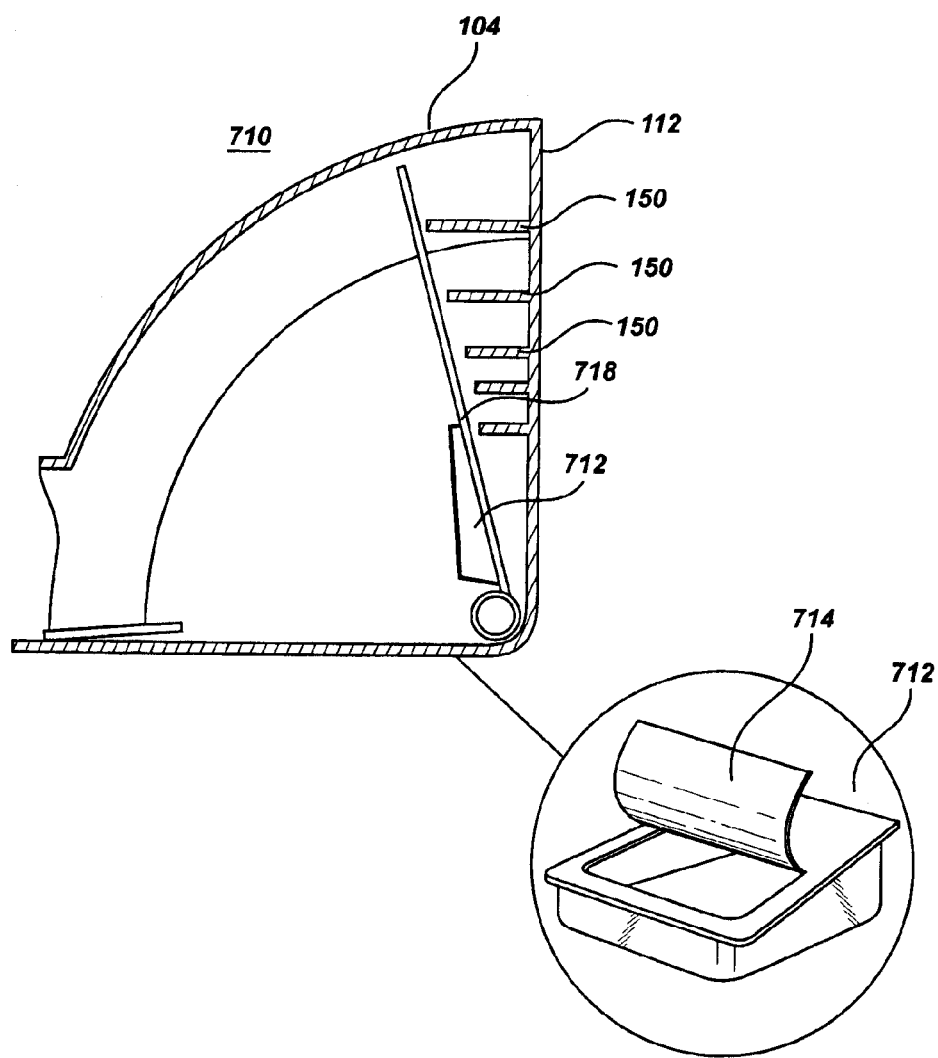
FIG. 13 depicts a side view of a trap, in the unlatched position in accordance with an alternate exemplary embodiment.

Referring to FIG. 13, a side view of a trap, in the triggered position, having a bait trap in accordance with an exemplary embodiment is illustrated. As shown, the platform 718 may be configured to include a bait trap 712 for attracting an animal into the trap 710. The bait trap 712 may include a removable cover or flap 714 which when opened, e.g., pulled off or back, bait inside the bait trap 712 may be exposed. In other embodiments, the bait trap 712 may include other attractants, such as scents or rodenticide. The flap 714 may be operatively coupled to the back wall 112 with the platform 718 in the triggered position when sold, thus when the platform 718 is moved to the latched position, the removable cover or flap 714 may peel off or back exposing the bait.

Figure 14:
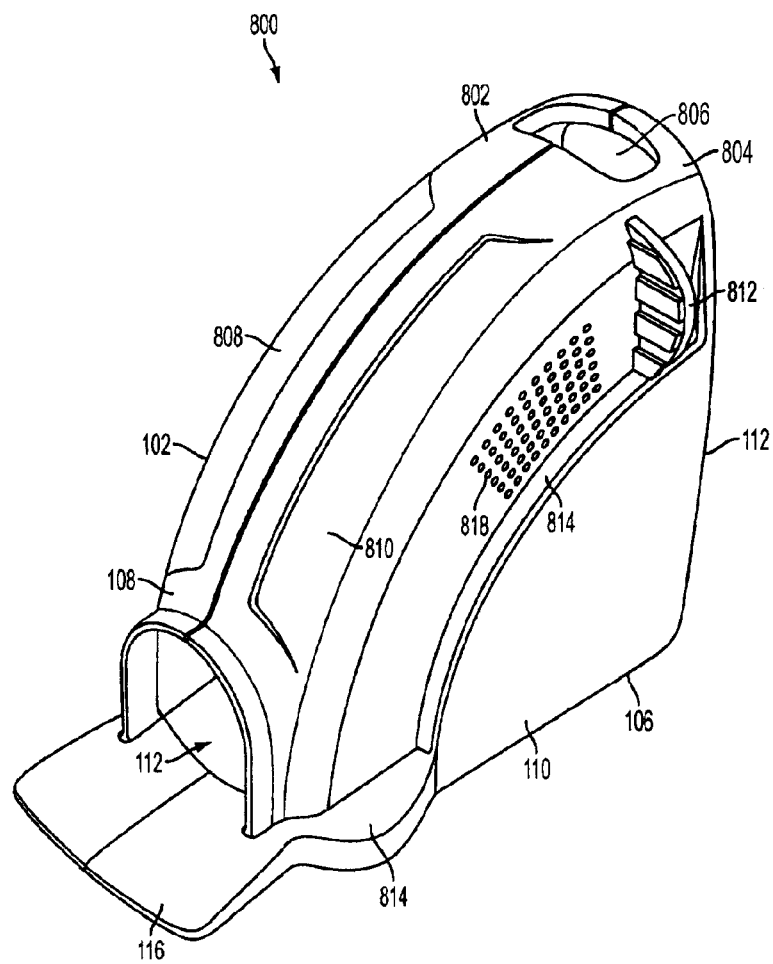
FIG. 14 depicts a perspective view of a trap in accordance with an exemplary embodiment.
Figure 26:
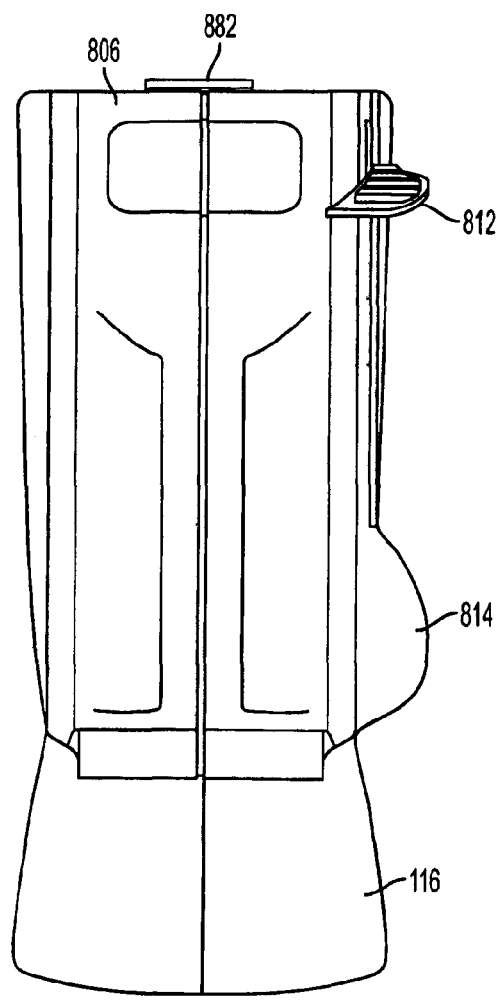
FIG. 26 depicts a top view of the trap in an unlatched position in accordance with an exemplary embodiment.

Referring to FIG. 14, a perspective view of a trap in accordance with an exemplary embodiment is illustrated. It should be appreciated that trap 800 is a simplified view of a trap and may include additional elements that are not depicted. As shown, the trap 800 may include a first housing member 802 and a second housing member 804 which may be configured to interact and form a housing 102 for the trap 800. Although the housing 102 is depicted as comprising two pieces, e.g., first housing member 802 and second housing member 804, the housing 102 may comprise more or less pieces or components. The housing 102 may include a top wall 104, a bottom 106 or base, a first side wall 108, a second side wall 110, and a back wall 112. The housing 102 may include a grip 806, e.g., a finger grip. As shown in FIGS. 14 and 26, the finger grip 806 may extend between an opening or passageway in the top wall 104 and back wall 112 that allows a user to grab the trap 800. For example, a user may insert a finger in the opening and grab the finger grip 806 or may use two fingers to pinch the finger grip 806. It is appreciated that other grips may be used to grab the trap. For example, a tab may extend from the trap 800.

The top wall 104 may be rounded and extend from the back wall 112 towards the front of the housing 102. The top wall 104 may include indents 808, 810. The housing 102 may include an entrance 114, e.g., a passageway into the housing 102. For example, the top wall 104 may form an entrance 114 at a location which is close to or at the junction where the top wall 104 meets the bottom 106 of the housing 102. The first side wall 108 and second side wall 110 may be positioned on the longer, opposite sides of the bottom 106. The back wall 112 and entrance 114 may be positioned on the narrower, opposite sides of the bottom 106. The housing 102 may include a ramp 116 at or near the entrance 114. The ramp 116 may be angled at a first end and terminate at a second end such that the higher end of the ramp 116 is approximately flush with a trigger plate 802 which may be adjacent to the ramp 116 when the platform is in the set position. The incline of the ramp 116 may assist in attracting an animal to enter the trap 800.

Figure 24:
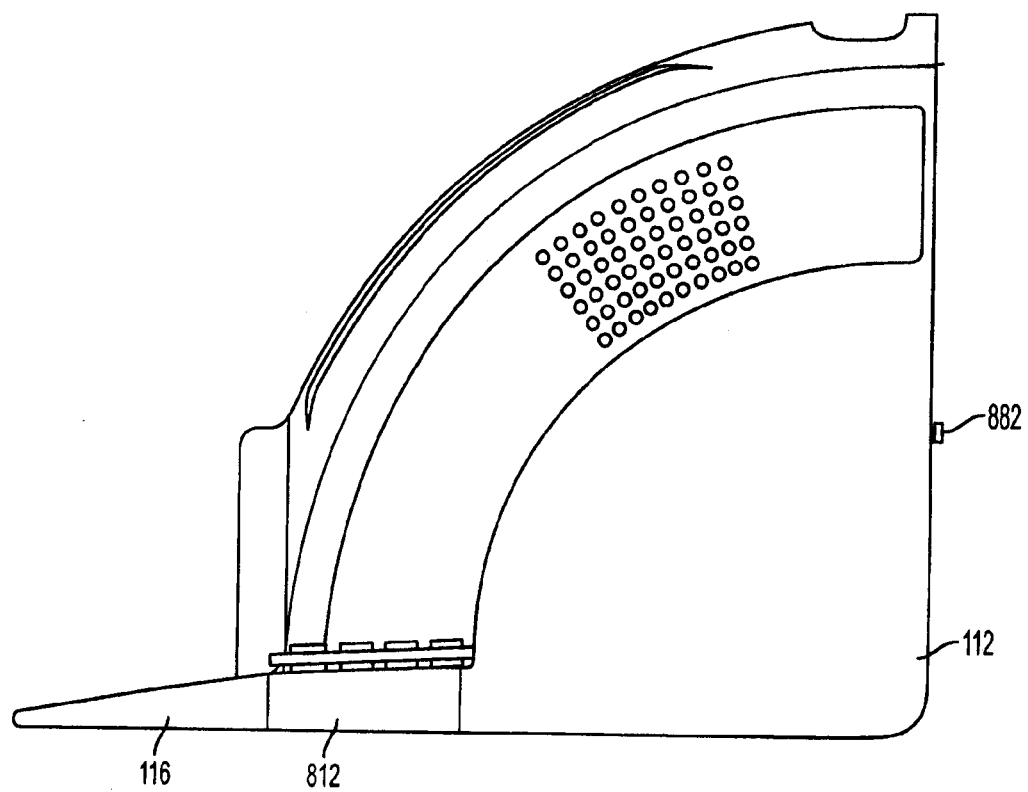
FIG. 24 depicts a first side view of the trap in the latched position in accordance with an exemplary embodiment.

The trap 800 may include a set arm 812 for setting the trap 800. As shown, the set arm 810 is in an unlatched position. When force is applied to the set arm 812, the set arm 812 may move downwards through a channel 814, e.g., a slot in the housing 102 which provides a space for the set arm 812 to travel from an unlatched position (as shown in FIG. 14) to a latched position (as shown in FIG. 24). When an animal, e.g., a mouse, is trapped within the trap 800, the set arm 812 may be positioned between indicia 818, e.g., between the left side and right side of the indicia 818. As shown, the indicia 818 may be round indentations or recesses in the side of the housing 102. It is appreciated that other indicia 818 may be used to provide an indication that an animal, e.g., a mouse, is trapped within the trap 800. For example, a sticker or wording may be used in place of the indentations.

Figure 15:
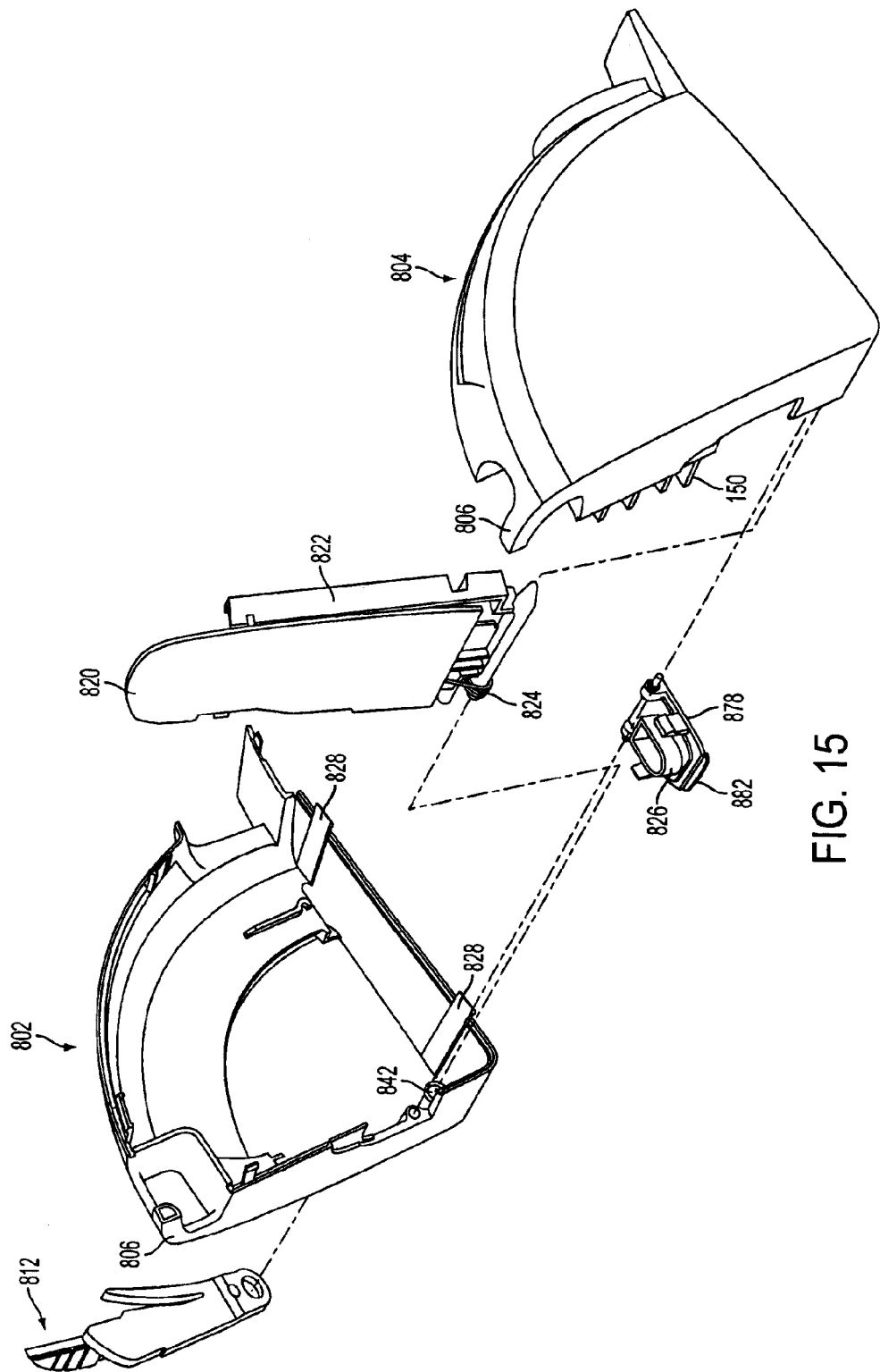
FIG. 15 depicts an exploded view of the trap in accordance with an embodiment.
Figure 25:
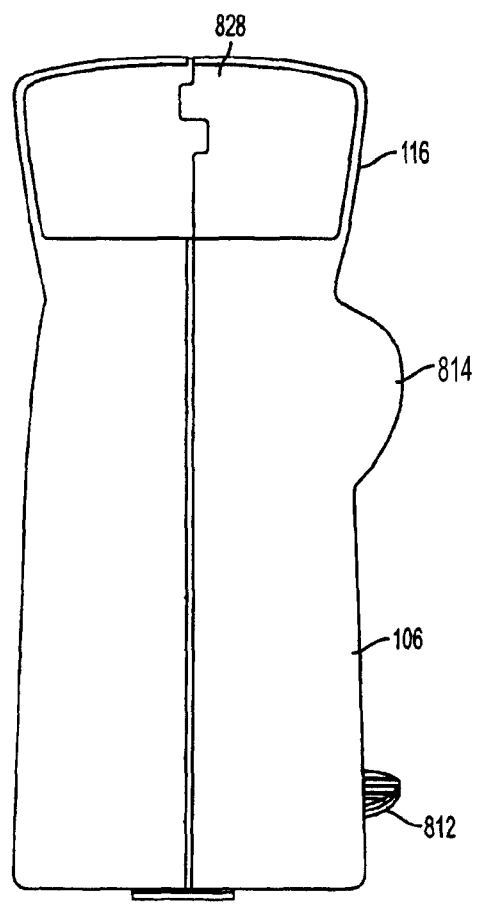
FIG. 25 depicts a bottom view of the trap in an unlatched position in accordance with an exemplary embodiment.

Referring to FIG. 15, an exploded view of the trap in accordance with an exemplary embodiment is illustrated. As shown, the trap 800 may include the first housing member 802, the second housing member 804, the set arm 812, a trigger plate 820, a platform plate 822, a biasing element 824, and an attractant reservoir 826. To join the first housing member 802 and the second housing member 804, the housing members 802, 804 may include housing tabs 828 and recesses (not shown) for receiving the housing tabs 828 and for holding the housing members 802, 804 together. It should be appreciated, that other mating pieces may be used to form the housing and/or the housing may be manufactured as one piece. For example, as shown in FIG. 25, the ramp 116 may include housing tabs 828 for holding the housing members 802, 804 together.

Figure 16:
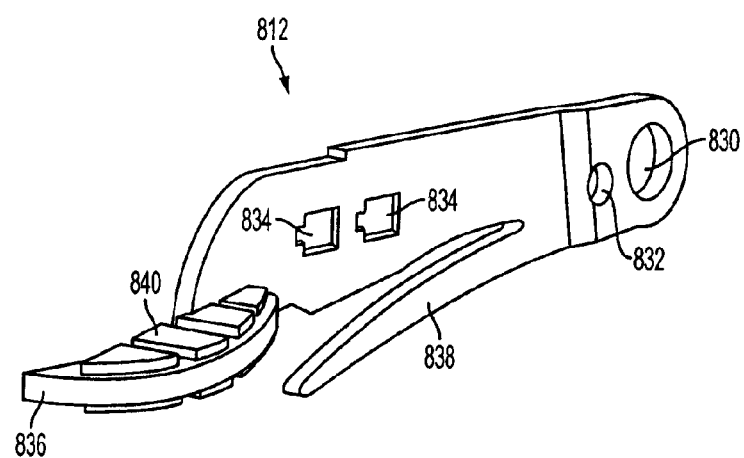
FIG. 16 depicts a perspective view of the set arm trap in accordance with an exemplary embodiment.

Referring to FIG. 16, a perspective view of a set arm in accordance with an exemplary embodiment is illustrated. As shown, the set arm 812 may include a' pivoting recess 830, a coupling recess 832, one or more slots 834, a pressing area 836, and an integrated spring 838. The pivoting recess 830 may be adapted to receive a pivoting projection 842 from the first housing member 802. The interaction between the pivoting recess 830 and the pivoting projection 842 may allow the set arm 812 to pivot with respect to the housing 102. It should be appreciated that other pivoting mechanisms may be used to pivot the set arm 812 with a housing member 802, 804. The coupling recess 832 may be adapted to receive a coupling projection 844 from the platform plate 822. It should be appreciated that other coupling mechanisms may be used to couple the set arm 812 with the platform plate 822.

Figure 17:
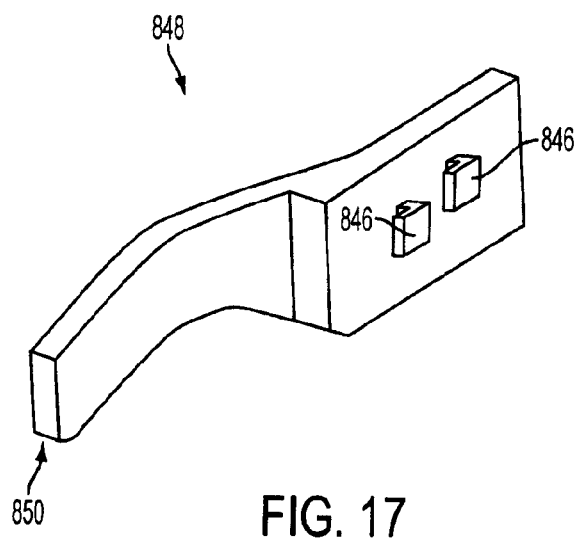
FIG. 17 depicts a perspective view of the lever in accordance with an exemplary embodiment.

The one or more slots 834 may be adapted to receive one or more mating projections 846 from a lever 848 (discussed below). For example, as shown, the one or more slots 834 may comprise a larger area to receive the one or more mating projections 846 to the lever 848 (as shown in FIG. 17) and a smaller area to lock or snap the lever 848 with the set arm 812. It should be appreciated that other attaching mechanisms may be used to couple the lever 848 and set arm 812, as well as being formed as one piece. For example, the set arm 812 may include the one or more mating projections and the lever 848 may include the one or more slots.

The set arm 812 may include a pressing area 836, an area for a user to apply pressure on the set arm 812 to move the set arm 812 from an unlatched position to a latched position. As shown, the pressing area 834 may include one or more gripping members 836. The one or more gripping members 836 may project outward from the set arm 812 and form one or more raised areas on the set arm 812. The one or more gripping members 836 and set arm 812 may be one piece or may be multiple pieces. For example, the set arm 812 and the one or more gripping members 834 may be formed as one piece.

The integrated spring 838 may be located on the bottom of the set arm 812. In setting the trap 800, the set arm 812 may move from the unlatched position to a latched position. To achieve the latched position, the integrated spring 838 may be compressed which allows a setting tab 854 of the trigger plate 820 to interact with a notch 872 to set the trap 800 as explained in greater detail below. It is appreciated that other compressible mechanisms may be used.

Referring to FIG. 17, a perspective view of a lever in accordance with an exemplary embodiment is illustrated. As shown, the lever 848 may include one or more mating projections 846 and a contact applicator 850. The one or more mating projections 846 may be adapted to interact with corresponding slots 834 in the set arm 812 and to couple the lever 848 and the set arm 812. The mating projections 846 may be dovetail shaped. The contact applicator 850 may be angled from the area of the lever 848 containing the mating projections 846. The contact applicator 850 may contact the top of the trigger plate 820 to assist in setting the trigger plate 820 in the latched position. For example, when the set arm 812 moves from an unlatched position to the latched position, the contact applicator 850 contacts the top surface of the trigger plate 820 moving the trigger plate 820 downward to a latched position.

Figure 18:
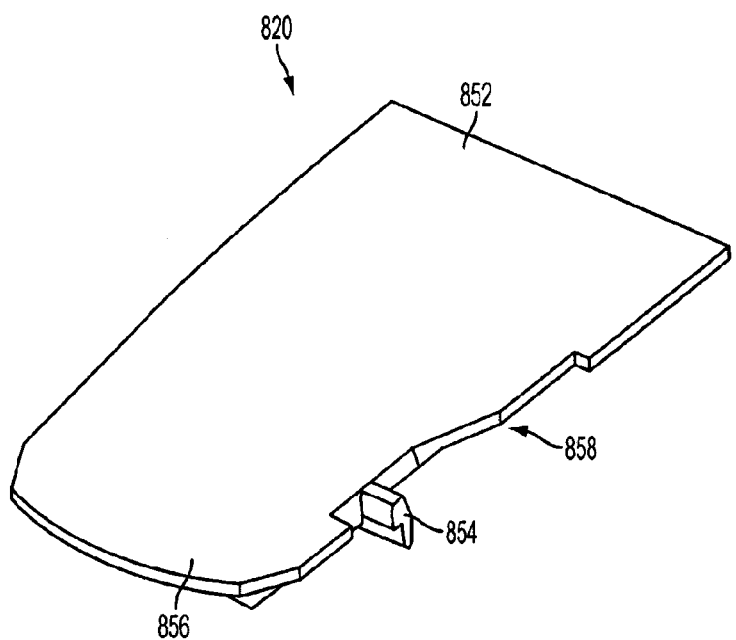
FIG. 18 depicts a top perspective view of the trigger plate in accordance with an exemplary embodiment.
Figure 19:
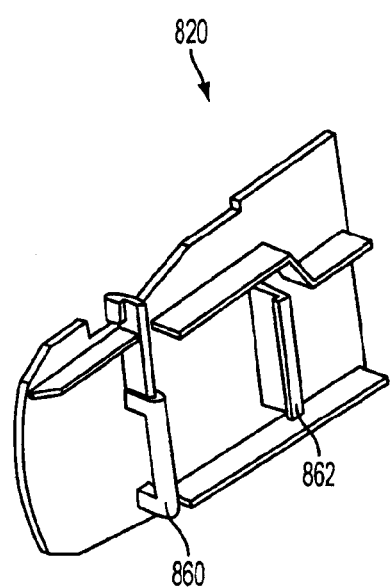
FIG. 19 depicts a bottom perspective view of the trigger plate in accordance with an exemplary embodiment.

Referring to FIGS. 18 and 19, top and bottom perspective views of the trigger plate in accordance with exemplary embodiments are illustrated. As shown, the trigger plate 820 may include a flat top surface for an animal to walk on. The trigger plate 820 may include a setting tab 854 which is adapted to engage a notch 872 (shown in FIG. 14) on the first side member 802. In a latched position, the setting tab 854 is received by the notch 872 and sets the trap 800 in the latched or set position. It is appreciated that other setting mechanisms may be used to set the trigger plate 820 in a set or latched position. To move the trigger plate 820 from an unlatched position to a latched position, the contact applicator 850 of the lever 848 may contact the contact area 856 of the trigger plate, e.g., a trigger plate contact area, and force the trigger plate 820 downward until the setting tab 854 engages the notch 872. The trigger plate 820 may have a cutout 858 corresponding to the shape of the lever 848. The trigger plate 820 may include a handle 860 adapted to interact with the plate platform 822 and to pivotally couple the trigger plate 820 and plate platform 820. For example, the handle 860 may form an opening capable of receiving a component, e.g., a tab 864, from the platform plate 822. The trigger plate 820 may include a catch 862, e.g., a trigger plate catch, adapted to interact with the plate platform 822 to limit the tilt or pivot of the trigger plate 820 with respect to the platform plate 822. It is appreciated that other coupling mechanisms may be used to pivotally couple the trigger plate 820 and the platform plate 822.

Figure 20:
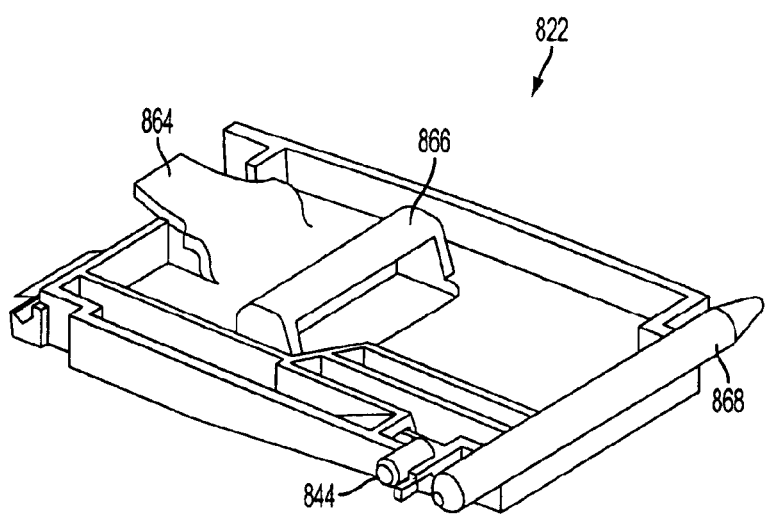
FIG. 20 depicts a top perspective view of the platform plate in accordance with an exemplary embodiment.
Figure 21:
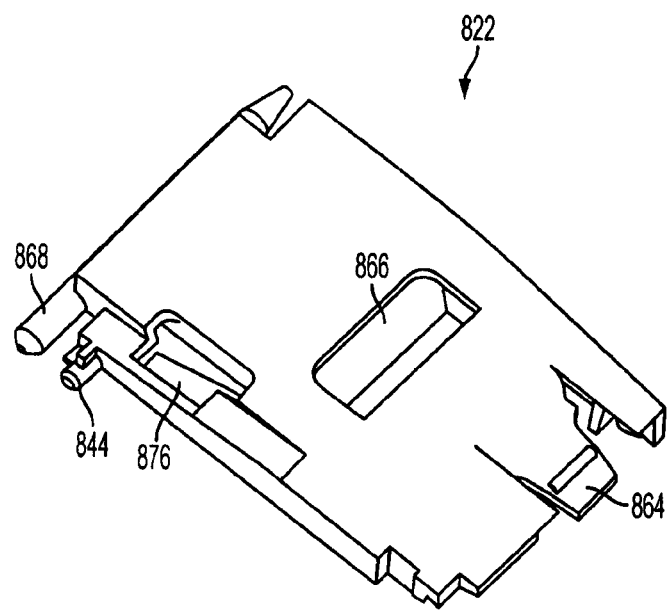
FIG. 21 depicts a bottom perspective view of the platform plate in accordance with an exemplary embodiment.

Referring to FIGS. 20 and 21, top and bottom perspective views of the platform plate in accordance with exemplary embodiments are illustrated. As shown, the platform plate 822 may include a tab 864, e.g., a coupling tab. The coupling tab 864 may be adapted to extend through the opening of the handle 860 of the trigger plate 820 and to pivotally couple the trigger plate 820 and the platform plate 822. It is appreciated that other pivotally coupling mechanisms may be used to couple the trigger plate 820 and the platform plate 822. For example, the platform plate 822 may include a handle and the trigger plate 820 may include a tab. The platform plate 822 may include a stop catch 866. The stop catch 866 may be adapted to interact with the catch 862 of the trigger plate 820 and to limit the tilt or pivot of the trigger plate 820 with respect to the platform plate 822. As shown in the figures, the catch 862 may be "L" shaped with a piece extending approximately parallel with the trigger plate and interacting with an opening of the stop catch 866 which is adapted to retain the catch 862 in an opening of the catch stop 866. It is appreciated that other interaction mechanisms may be used to limit the tilt of the trigger plate 820 with respect to the platform plate 822. For example, the platform plate 822 may include a stop catch and the trigger plate 820 may include a catch. The trigger plate 820 and platform plate 822 may include additional coupling mechanisms to pivotally couple the trigger plate 820 and the platform plate 822. The platform plate 822 may include an opening and a biasing element retention area 876. The opening may receive an extending end of a biasing element 874 (shown in FIG. 15) and the biasing element retention area 876 may retain the extending end of the biasing element 824 as discussed below.

The platform plate 822 may include a pivoting bar 868. The pivoting bar 868 may have a first end and a second end with the first end adapted to engage with the first side member 802 and the second end adapted to engage with the second side member 804. As shown, the first end or second end may be conical shape to assist the pivoting bar in engaging with the side members 802, 804. Each of the side members 802, 804, may include pivoting recess for receiving the first or second end of the pivoting bar 868. For example, the pivoting projection 842 of the first side member 802 may include a recess to receive the first end or second end of the pivoting bar 868 as shown in FIG. 15. The second side member 804 may include a recess to receive the other end of the pivoting bar 868. It is appreciated that other pivoting mechanisms may be used to pivotally couple the platform plate 822 with the housing 102. For example, the first and second side members 802, 804, may include projections adapted to be received by recesses in the platform plate 822. The platform plate 822 may include a coupling projection 844. The coupling projection 844 may be adapted to couple the platform plate 822 with the coupling recess 832 of the set arm 812. By coupling the platform plate 822 to the set arm 812, the platform plate 822 and trigger plate 820 may move in conjunction with the set arm 812, e.g., from an unlatched position to a latched position. It is appreciated that other coupling mechanisms may be used to couple the platform plate 822 with the set arm 812. For example, the set arm 812 may include a coupling projection and the platform plate 822 may include a coupling recess.

A biasing element 874, e.g., a spring such as a single coil spring, may be interposed between a first or second end of the pivoting bar 868. Specifically, the pivoting bar 868 may extend through a hole formed by the coiled spring to couple the biasing element 874 and the pivoting bar 868. The biasing element 874 may include a first extending end that is retained by the biasing element retention area 876 of the platform plate 822 and a second extending end that is retained against the bottom 106 of the trap 800. The biasing element 874 may bias the platform plate 822 (and the coupled trigger plate 820) towards the back wall 112 of the trap 800.

Figure 22:
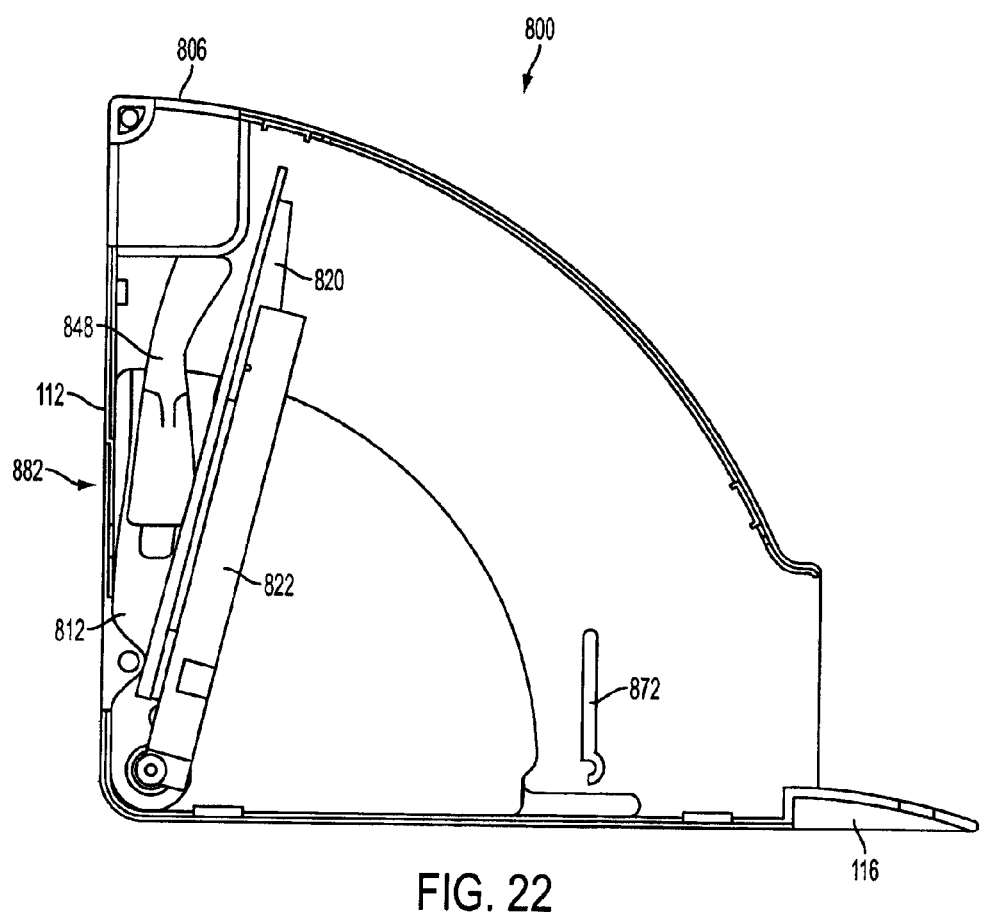
FIG. 22 depicts a side view of the trap, without a sidewall, in the unlatched position in accordance with an exemplary embodiment.

Referring to FIG. 22, a side view of the trap, without a sidewall, in the unlatched position in accordance with an exemplary embodiment is illustrated. As shown, the trigger platform 820 may be above and coupled to the platform plate 822. The coupling projection 844 of the platform plate 822 may couple the platform plate 822 to the set arm 812. The set arm 812 and the platform plate 822 may be pivotally coupled to the housing 812 via the pivoting recess 830 of the set arm 812 and the pivoting bar 868 interacting with the pivoting projection 842 of the first side member 802. The lever 848 may be coupled to the set arm 812 via the coupling projections 844 on the lever 848 and corresponding slots 834 on the set arm 812. By moving the set arm 812, the set arm 812, the lever 848, the trigger plate 820, and the platform plate 822 may move from a substantially vertical position, e.g. an unlatched position, towards the bottom 106 of the trap 800. As discussed below, the trigger plate 820 and other components move downward with the setting tab 858 of the trigger plate 820 engaging a notch 872 in the first side member 802. The notch 872 may include a straight section with a "c" shaped section on or near the bottom of the straight section. The "c" shaped section may be adapted to receive the setting tab 854 of the trigger plate 820 and to set the trap 800 in the set or latched position. It is appreciated that other setting mechanisms may be used to set the trap 800.

Figure 23:
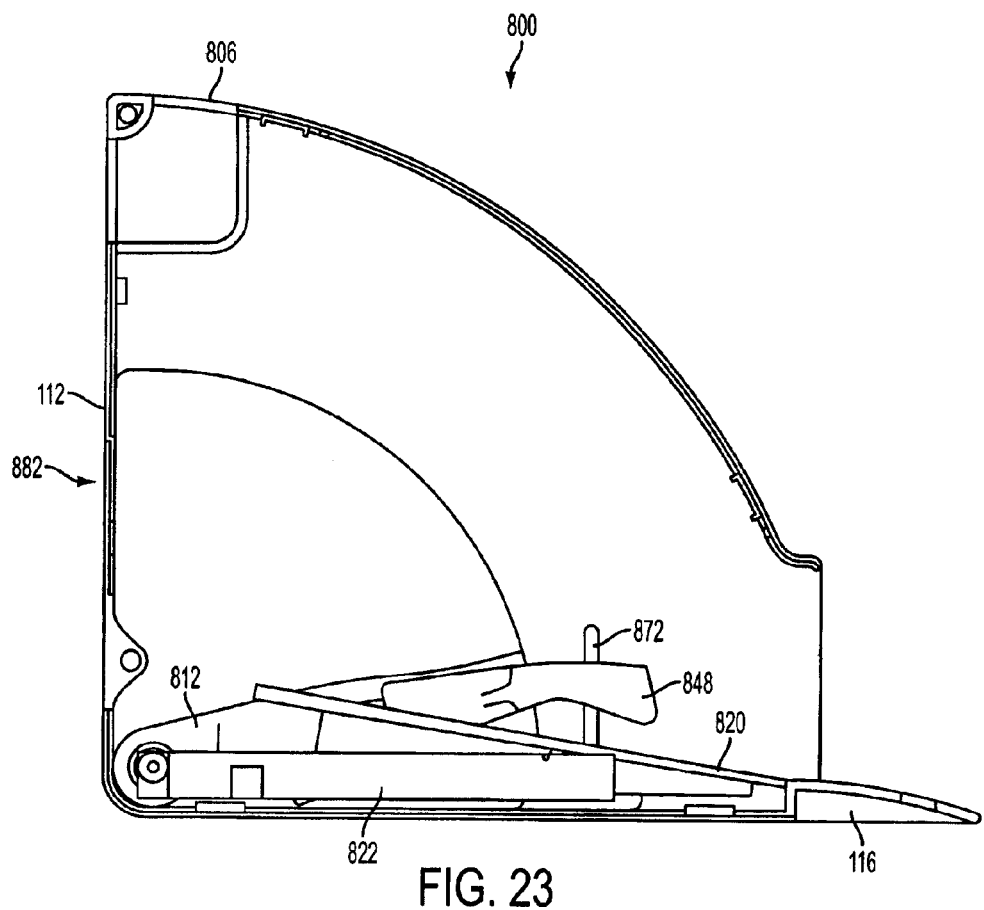
FIG. 23 depicts a side view of the trap, without a sidewall, in the latched position in accordance with an exemplary embodiment.

Referring to FIG. 23, a side view of the trap, without a sidewall, in the latched position in accordance with an exemplary embodiment is illustrated. As shown, the trigger platform 820 may be coupled to and tilted with respect to the platform plate 822. In such a position, the trap 800 is set or is in a latched position To reach the set position, the set arm 812 is press downward towards the bottom 106 of the trap 800. During this process, the contact applicator 850 of the lever 848 may contact the contact area 856 of the trigger plate 820 forcing the trigger plate 820 and platform plate 822 to move towards the bottom 106 of the trap 800. At some point during this process, the setting tab 854 of the trigger platform 820 may contact and engage with the notch 872 of the first side member 802 (shown in FIGS. 14 and 22). Once the platform plate 822 contacts the bottom 106 of the trap 800, force may still be applied to the pressing area 836 of the set arm 812, thereby compressing the integrated spring 838 of the set arm 812 and causing the contact applicator 850 to press down on the contact area 856 of the trigger plate 820 causing the trigger plate 820 to rotate or tilt with respect to the platform plate 822 and for the setting tab 854 to engage with the "c" section of the notch 872. With the platform plate 822 in the tilted position and the setting tab 854 retaining the platform plate 822 in such a position, the trap 800 is set or in the latched position. In the set position, the setting tab 855 prevents the biasing element 874 from causing the platform plate 822 (and coupled trigger plate 820) to pivot towards the back wall 112 of the trap 800. When pressure is released from the set arm 812, the integrated spring 838 may allow the set arm 812 to recover upwards to a nominal position. This action may carry the lever 848 with it and may hold the lever 848 at a distance above the trigger plate 820 such that the lever 848 does not interfere or restrain the trigger plate 820 rotating on its pivot as the setting tab is released by the action or weight of the animal. In this manner neither the set arm 812 nor the lever 848, which are needed to set the trap, offer no resistance to the trap being triggered by the animal after the pressure is released from the set arm 812 during setting the trap 800.

Figure 30:
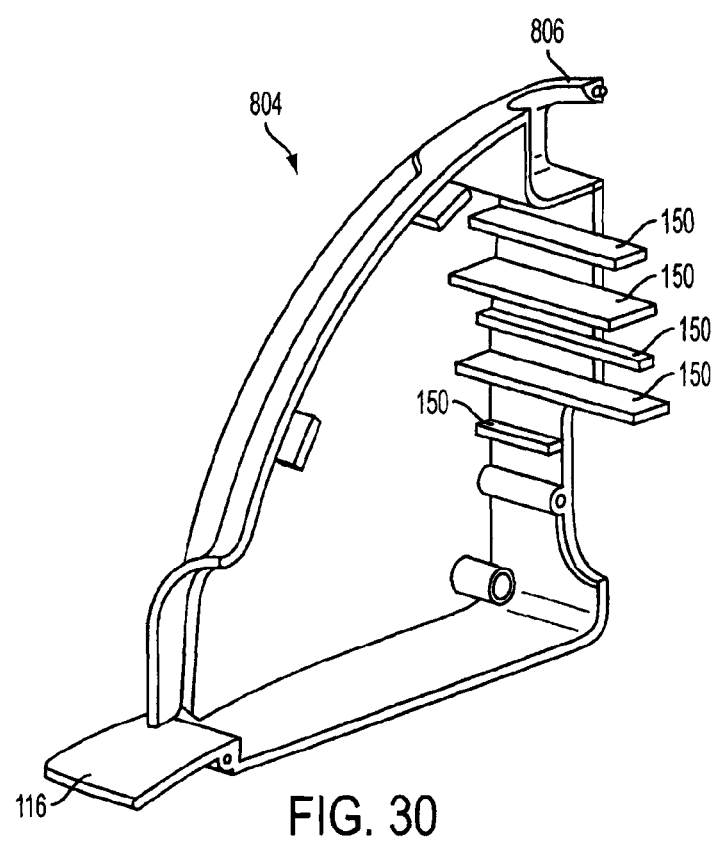
FIG. 30 depicts a side view of the trap without a sidewall in accordance with an exemplary embodiment.
Figure 31:
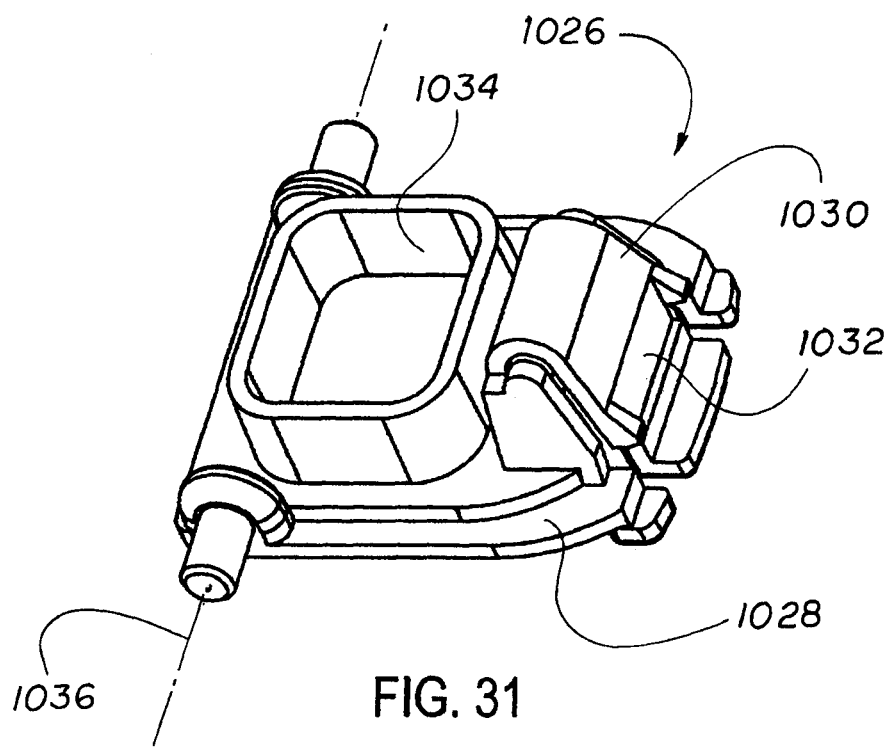
FIG. 31 is a perspective view of an attractant reservoir in accordance with an exemplary embodiment.
Figure 32:
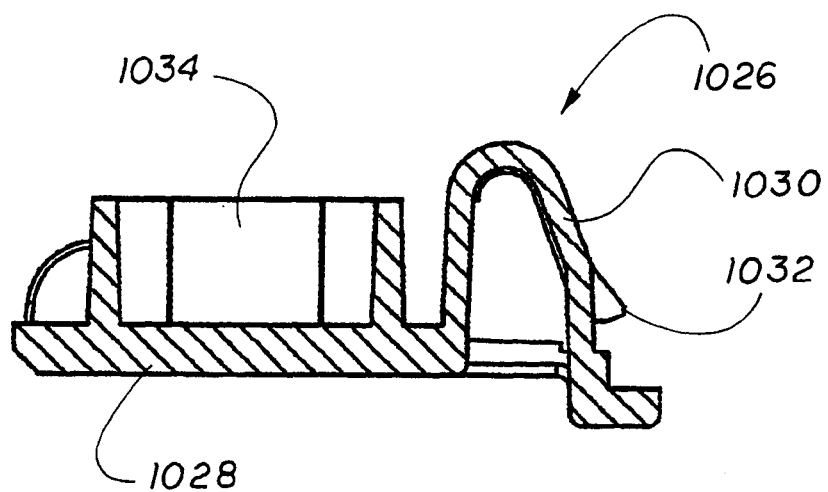
FIG. 32 is a sectional view of an attractant reservoir in accordance with an exemplary embodiment.
Figure 33:
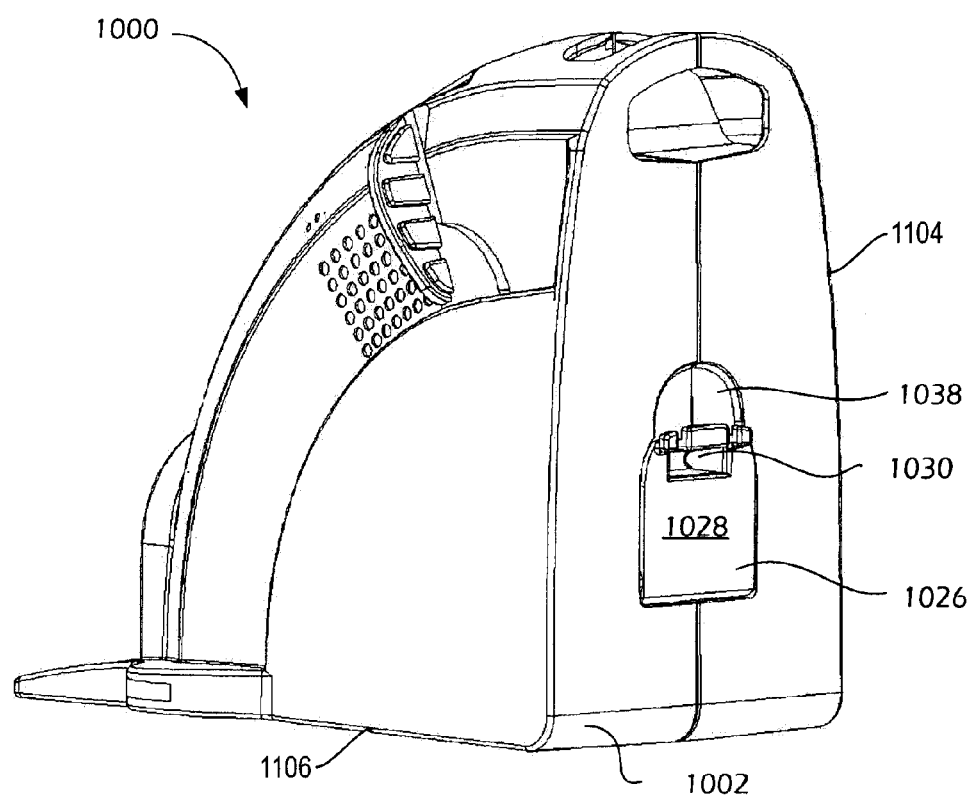
FIG. 33 is a perspective view of a trap with an attractant reservoir in a closed position in accordance with an exemplary embodiment.
Figure 34:
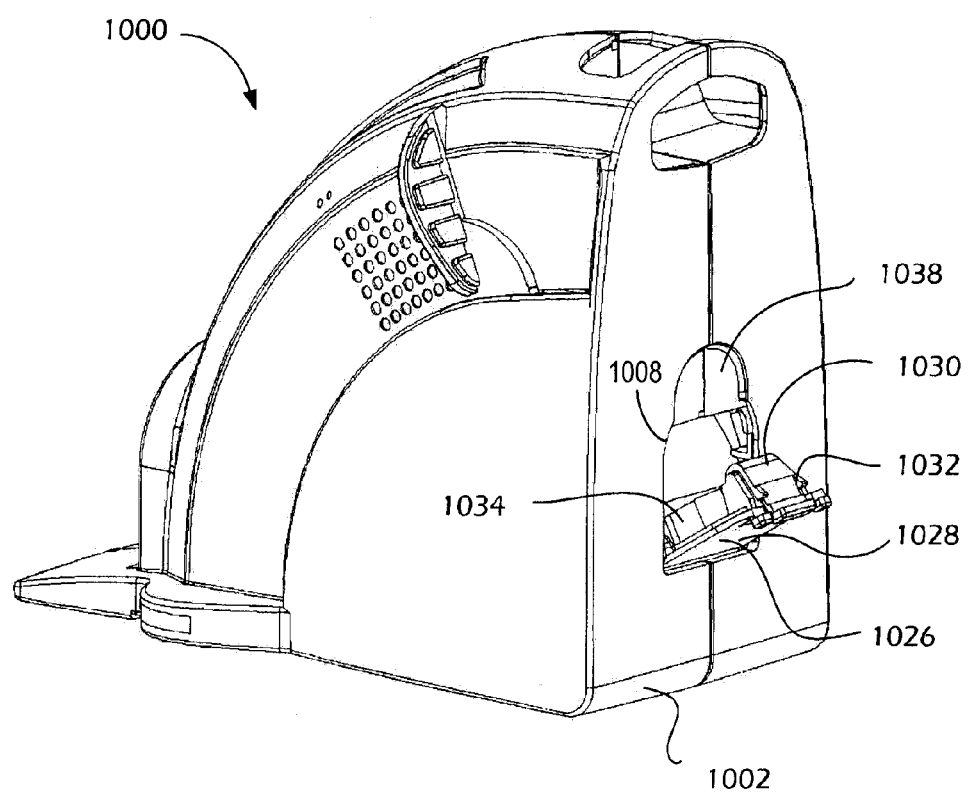
FIG. 34 is a perspective view of a trap with an attractant reservoir in an open position in accordance with an exemplary embodiment.

When the trap 800 is in a set or latched position and an animal, e.g., a mouse, puts weight on the trigger plate 820 the mouse triggers the trap 800. When the trap 800 is triggered, the trigger plate 820 tilts or rotates towards a level position, e.g., becomes substantially parallel with platform plate 822, the setting tab 854 disengages from the notch 872, and the biasing element 874 biases the platform plate 822 (and coupled trigger plate 820) to pivot towards the back wall 112 of the trap 800. As a result, the animal, e.g., mouse, may be trapped between the trigger plate 820 and the back wall 112. If the housing 102 includes the one or more blunt fingers 150 as described above with reference to trap 100 and also shown in FIGS. 15 and 30, the animal, e.g., mouse, may be trapped between the trigger plate 820 and the one or more blunt fingers 150. As shown in FIG. 30, the one or more blunt fingers 150 may have different widths, e.g., the distance from the back wall that each blunt finger extends towards the entrance 112.

Figure 27:
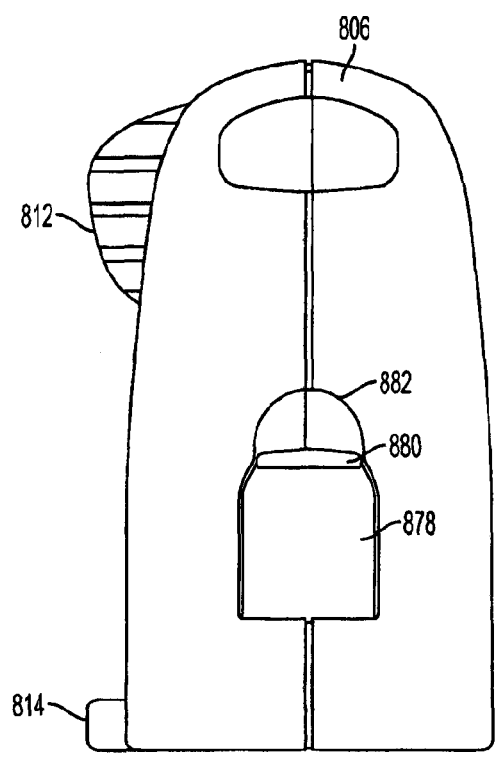
FIG. 27 depicts a back view of the trap in the latched position in accordance with an exemplary embodiment.
Figure 28:
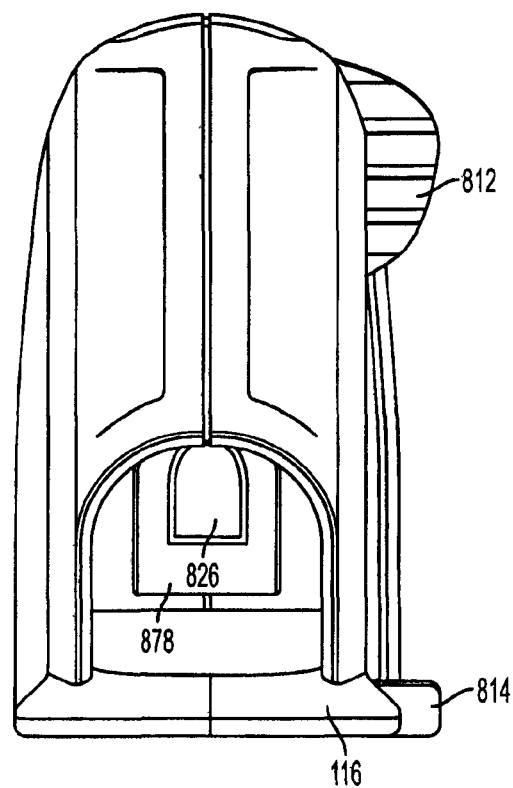
FIG. 28 depicts a front view of the trap in an unlatched position in accordance with an exemplary embodiment.
Figure 29:
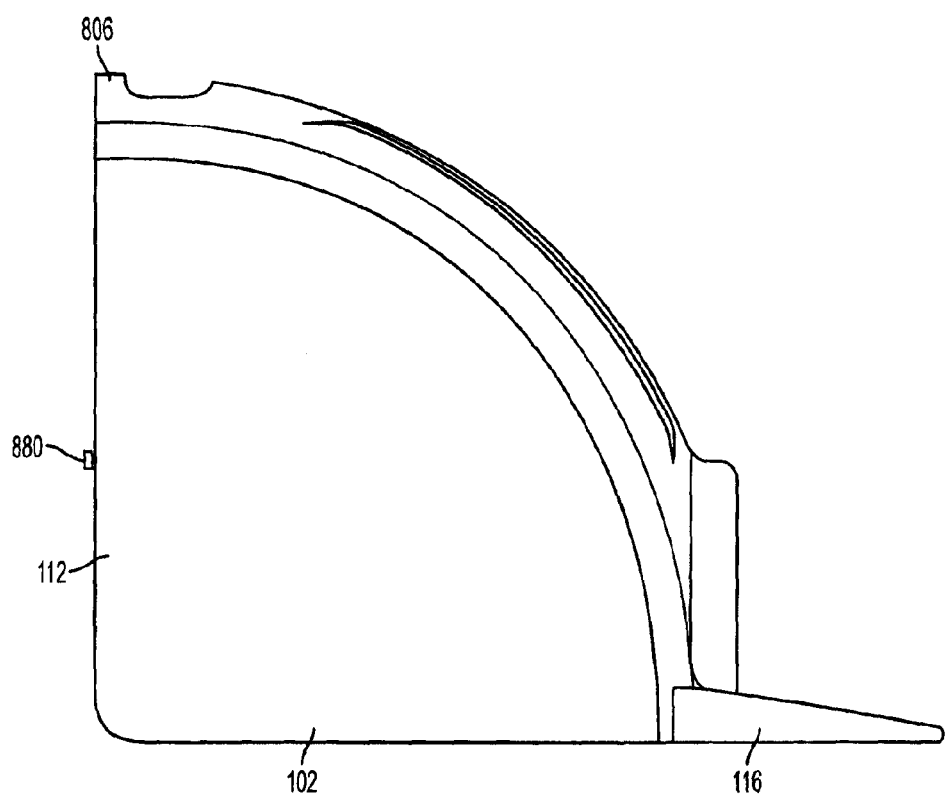
FIG. 29 depicts a second side view of the trap in accordance with an exemplary embodiment.

Referring to FIGS. 27-29, perspective views of an attractant reservoir in accordance with an exemplary embodiment are illustrated. As shown, the trap 800 may include an attractant reservoir 826. The attractant reservoir 826 may be adapted to hold an attractant (not shown). The attractant may be a scent, a rodenticide, and/or bait to attract an animal inside the trap 800. The attractant reservoir 826 may include a reservoir door 878 pivotally coupled to the back wall 112 of the trap 800. As shown in FIG. 15, the attractant reservoir 826 may include pivoting pins and each side member 802, 804 may include pin recesses adapted to receive the pivoting pins. To open the reservoir door 878, the back wall 112 may include an indentation 882 adapted to allow a user to place a finger in the indentation 882 and press down on an edge 880 of the reservoir door 878. The reservoir door 878 may allow access to the attractant reservoir 826 to allow an attractant, e.g., peanut butter or cheese, to be placed in the attractant reservoir 826 to assist in attracting an animal, such as a mouse, to the trap 800.

Referring to FIGS. 31-34, in an exemplary embodiment, a trap 1000 may have an attractant reservoir 1026 with a closure clip 1030. An exemplary trap 1000 may have a housing 1002, with an attractant reservoir opening 1008 in the rear wall of the housing. The attractant reservoir opening 1008 receives an attractant reservoir 1026. The attractant reservoir 1026 may have a reservoir door 1028 pivotally coupled to the housing 1002 at a pivot axis 1036. Any suitable means may be used to pivotally couple the reservoir door 1028 with the housing 1002. The reservoir door 1028 has a spring clip 1030 at one end. Any suitable spring clip 1030 may be used. The spring clip 1030 may have a latch portion 1032 that is configured to releasably engage with at least a portion of the opening 1008, thereby releasably fastening the reservoir door 1028 in a closed position (see FIG. 33). To open, a user could compress the spring clip 1030, to disengage the latch 1032 from the opening 1008. The spring clip 1030 and/or the latch 1032 may be configured to provide any necessary or desired opening or closure force for the reservoir door 1028. For example, in an exemplary embodiment, the spring clip 1030 and/or the latch 1032 may be configured to provide an opening or closure force that is sufficient to prevent a trapped mouse from pushing open the reservoir door 1028 from within the housing 1002. One or more additional features may be added to the trap 1000 to improve the opening or closing of the attractant reservoir 1026, as necessary or desired. An indentation 1038 in the housing 1002 may be provided adjacent the spring clip 1030 and latch 1032, to provide finger access to the spring clip 1030.

Referring to FIGS. 35-41, in an exemplary embodiment, a trap 1100 may have a trigger mechanism 1138 having a plurality of trigger plates, such as a first trigger plate 1140 and a second trigger plate 1160. It is understood that trap 1100 described in part herein is an exemplary trap and may include one or more elements as described with reference to the other exemplary traps, or may include additional elements not described or depicted.

Figure 36:
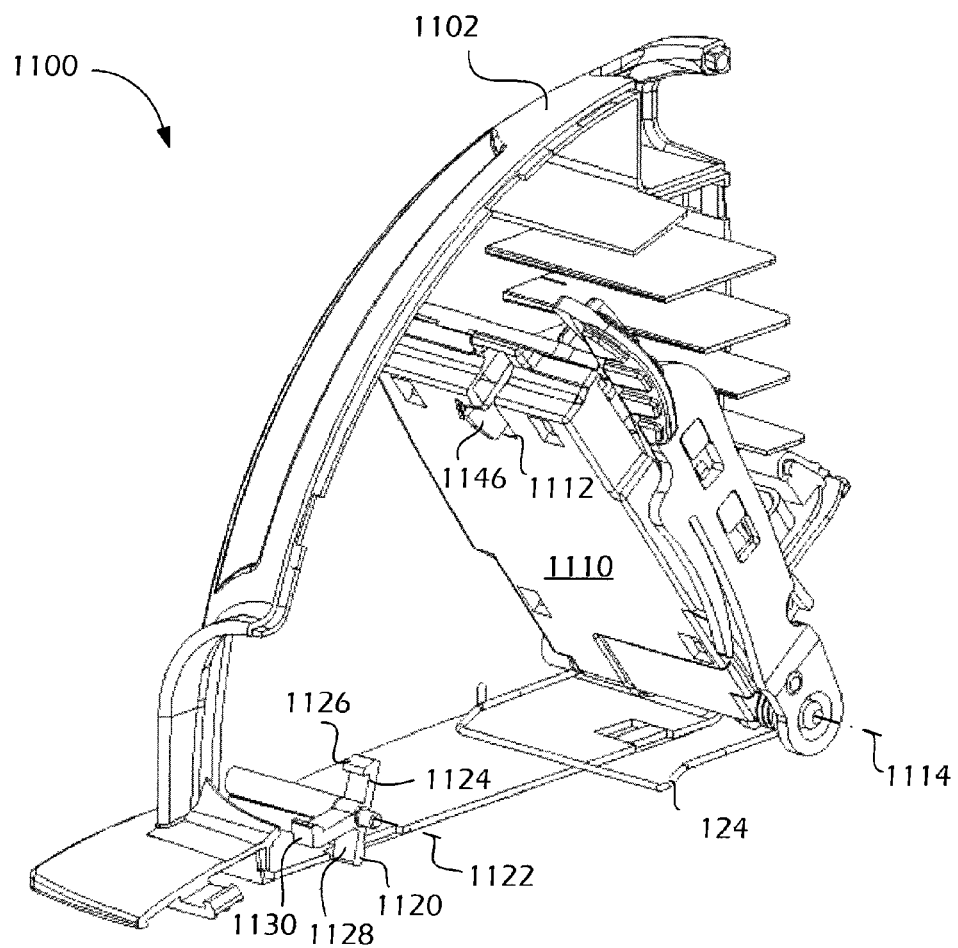
FIG. 36 is a partial sectional view of a trap with a trigger plate assembly in a triggered position in accordance with an exemplary embodiment.
Figure 37:
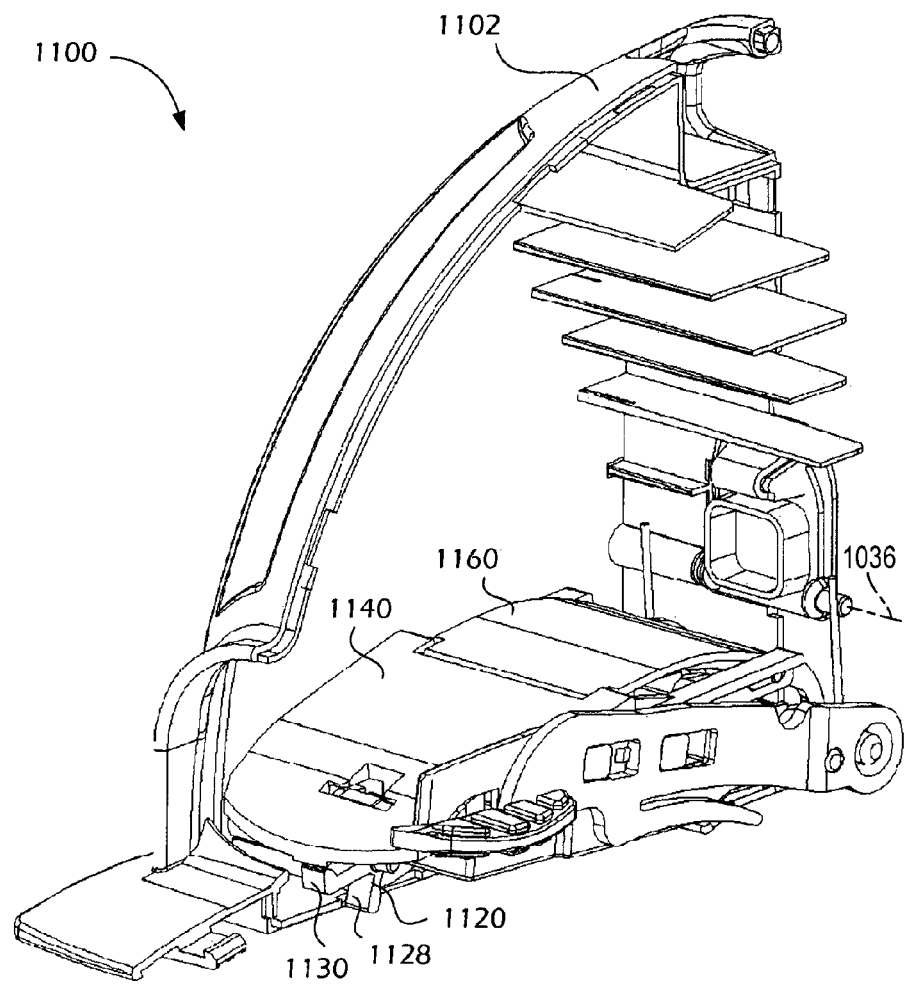
FIG. 37 is a partial sectional view of a trap with a trigger plate assembly in a latched position in accordance with an exemplary embodiment.

Referring to FIGS. 36-37, an exemplary trap 1100 may have a housing 1102. The housing 1102 may comprise multiple members that are joined or fastened together, such as first housing member 1104 and second housing member 1106 that are operably coupled to form housing 1102. Trap 1100 has a platform plate 1110 that is pivotally coupled to the first housing member 1104 and second housing member 1106 about pivot axis 1114. Any suitable means for pivotally coupling the platform plate 1110 with the housing members may be used. For example, platform plate 1110 may have a pair of pivot projections or bosses provided on the rear portion of the platform plate 1110 that are received in corresponding pivot recesses in the housing members 1104 and 1106. Or a pivot rod may be received by a portion of the platform plate 1110 and housing members 1104 and 1106, to provide pivot axis 1114 about which the platform plate 1110 pivots.

The platform plate 1110 pivots between a latched position (see FIG. 37) and a triggered position (see FIG. 36). In the latched position the platform plate 1110 pivots to a position in which it is adjacent to the base of the trap, and extends toward the opening of the trap. In the triggered position, the platform plate 1110 pivots toward the rear wall of the trap. The trap 1110 may have a biasing mechanism 124, such as a dual spring, that biases the platform plate 1110 toward the triggered position.

The trap 1100 may include a catch 1120 that is configured to engage with the platform plate 1110 when the platform plate 1110 is in its latched position (see FIG. 37). The catch 1120 may be pivotally coupled with the trap 1100, such as, for example, about pivot axis 1122. Any suitable means for pivotally coupling the catch 1120 with the housing members may be used. For example, catch 1120 may have a pair of pivot projections or bosses that are received in corresponding pivot recesses in the housing members 1104 and 1106. Or a pivot rod may be received by a portion of the catch 1120 and housing members 1104 and 1106.

Figure 35:
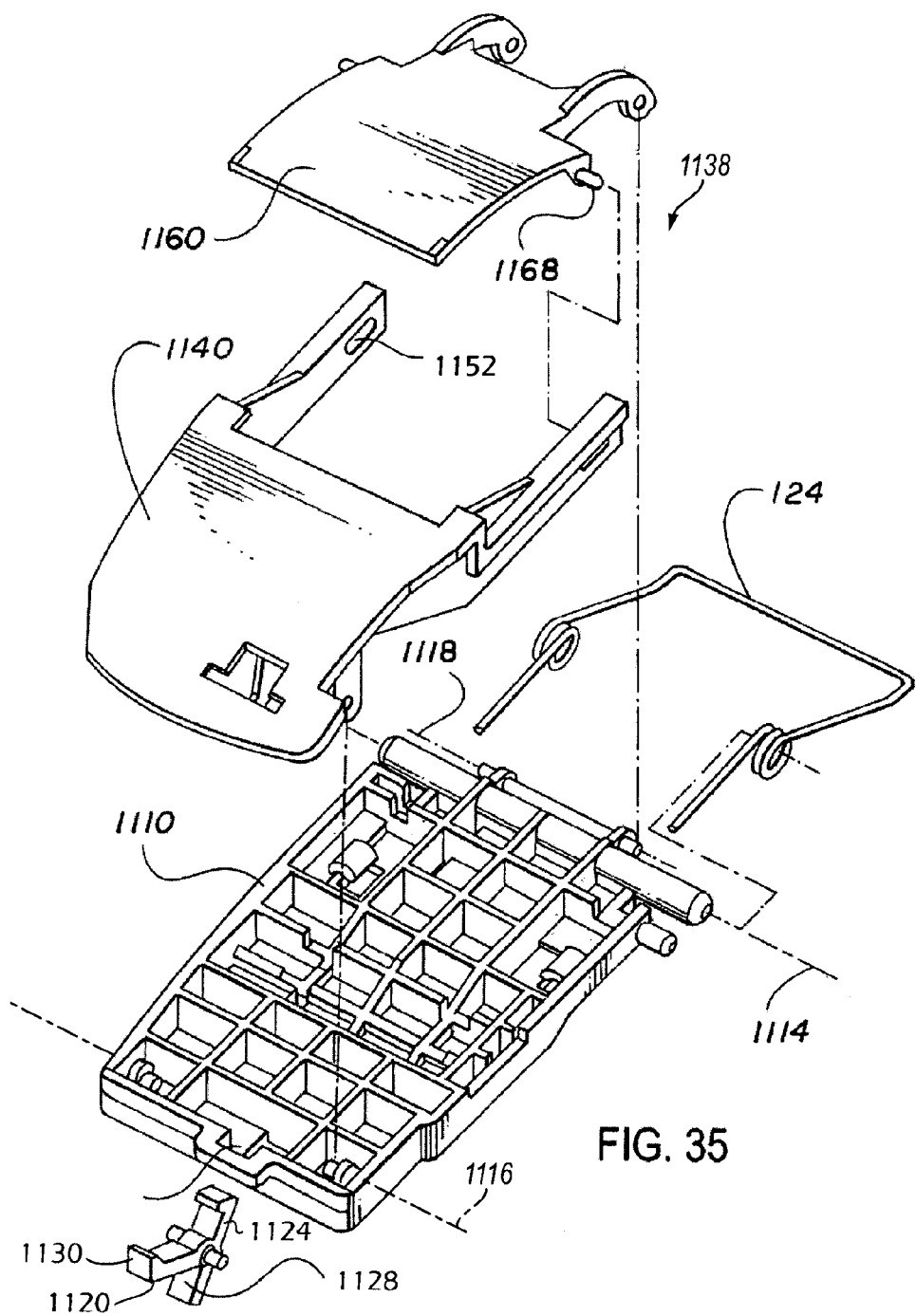
FIG. 35 is an exploded view of a trigger plate assembly in accordance with an exemplary embodiment.

Referring to FIGS. 35-37, the catch 1120 may have a latch portion 1124 extending from the pivot axis 1122. The latch portion 1124 may generally extend upward from the base of the trap, and engages with the platform plate 1110. In an exemplary embodiment the platform plate 1110 has an aperture 1112 that receives at least a portion of the latch portion 1124 when the platform plate 1110 is in its latched position. The latch portion 1124 may have one or more structures that couple with a portion of the platform plate 1110, to hold the platform plate 1110 in the latched position. For example, the latch portion 1124 may have a lip 1126 that may engage with an edge of the aperture 1112 when the catch 1120 pivots in a first direction. When the catch 1120 pivots in a second, opposite, direction, the lip 1126 may disengage from the edge of the aperture 1112, releasing the platform plate 1110 from the latched position.

In various exemplary embodiments, the catch 1120 may have one or more additional features that control the rotation of the catch 1120 in the first and/or second direction, such as by functioning as a counterbalance and/or lever, or providing a stop mechanism. For example, the catch 1120 may have a first leg 1128 configured to operably engage with a portion of a triggering mechanism 1138, so that when the trap is triggered, the triggering mechanism 1138 applies a force to the first leg 1128, causing the catch 1120 to rotate in the second direction (explained in more detail below). The catch 1120 may have a second leg 1130 that provides a counterbalance, for example, that causes the catch 1120 to rotate in a first direction when no other forces are applied to the catch 1120. This may be helpful to maintain the latch portion 1124 in position ready to engage with the aperture 1112 in the platform plate 1110. The second leg 1130 also may engage with a portion of the platform plate 1110, so that when the platform plate 1110 is moved toward its set position, it pushes against the second leg 1130, rotating the catch 1120 in the first direction so that the latch portion 1124 engages with the aperture 1112 in the platform plate 1110. The first leg 1128 and/or second leg 1130 also may be configured to limit the rotation of the catch 1120 in the first and/or second direction. For example, the first leg 1128 may abut the housing 1102 when the catch 1120 rotates in the second direction to a certain point, stopping further rotation. In another example, the second leg 1130 may abut the housing 1102 when the catch 1120 rotates in the first direction, preventing further rotation. It will be understood that these and other mechanisms may be provided to control the rotation of the catch 1120, as necessary or desired.

In an exemplary embodiment, the trap 1100 may have a triggering mechanism 1138 that is operatively coupled with the platform plate 1110 and with the catch 1120. The triggering mechanism 1138 is configured to be actuated by an animal (such as a mouse). When actuated, the triggering mechanism 1138 causes the catch 1120 to release from the platform plate 1110. In an exemplary embodiment, the triggering mechanism 1138 includes a plurality of trigger plates. For example, referring to FIGS. 35-41, the triggering mechanism 1138 may have a first trigger plate 1140 and second trigger plate 1160. The plurality of trigger plates may each operate as independent triggers for the trap 1100, or they may cooperate to provide a trigger for the trap 1100.

Figure 38:
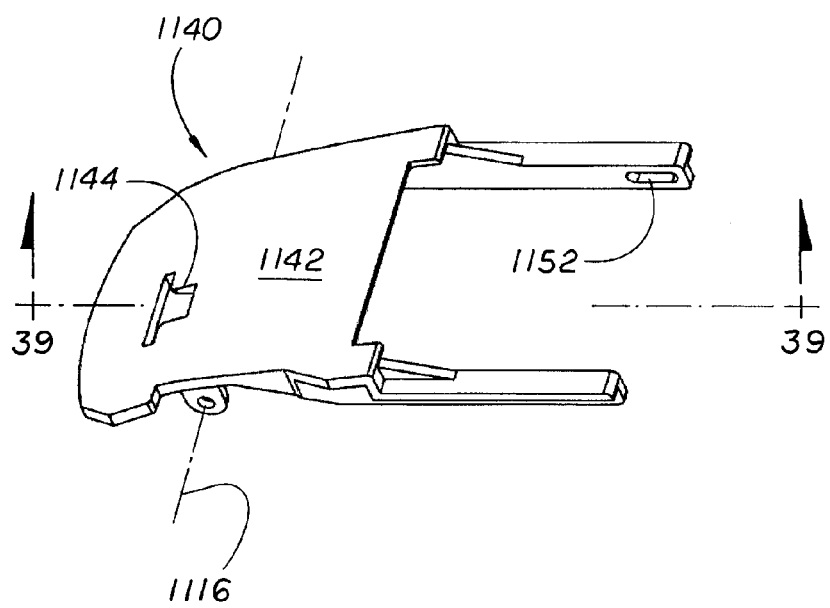
FIG. 38 is a perspective view of a first trigger plate in accordance with an exemplary embodiment.
Figure 39:
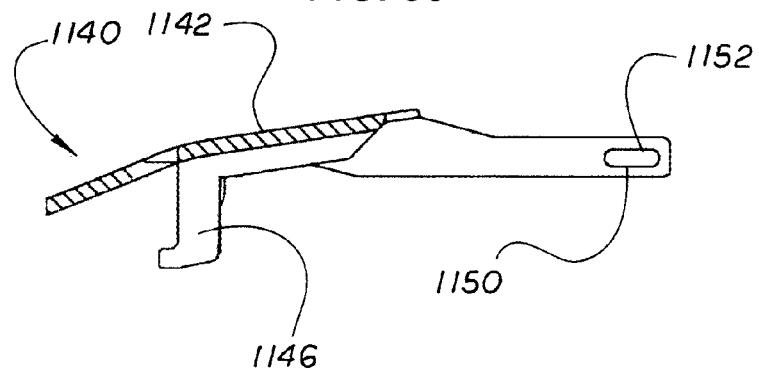
FIG. 39 is a sectional view of a first trigger plate in accordance with an exemplary embodiment.

Referring to FIGS. 35 and 38-39, in an exemplary embodiment the first trigger plate 1140 may be pivotally coupled with the platform plate 1110 about first trigger pivot axis 1116. Any suitable means for pivotally coupling the first trigger plate 1140 with the platform plate 1110 may be used. For example, first trigger plate 1140 may have a pair of pivot projections or bosses provided on the underside of the first trigger plate 1140 that are received in corresponding pivot recesses on the top of the platform plate 1110. Or a pivot rod may be received by a portion of the first trigger plate 1140 and the platform plate 1110 to provide pivot axis 1116 about which the first trigger plate 1140 pivots.

The first trigger plate 1140 may have an upper trigger surface 1142 that is configured to be actuated by an animal. For example, when an animal treads on the upper trigger surface 1142, the first trigger plate 1140 may pivot from a set position to a triggered position, which triggers the trap. In the triggered position, the first trigger plate 1140 may operably couple with the catch 1120, causing the catch 1120 to release the platform plate 1110 from the latched position. For example, the first trigger plate 1140 may have a downwardly extending projection 1146 that engages with a first leg 1128 of catch 1120. When the first trigger plate 1140 pivots to the triggered position, the downward projection 1146 pushes against the first leg 1128 of the catch 1120, causing the catch 1120 to pivot in the second direction. When the catch 1120 pivots in the second direction, the latch 1124 and lip 1126 are released from the edge of aperture 1112 in platform plate 1110, thereby releasing the platform plate 1110 from the latched position.

Figure 40:
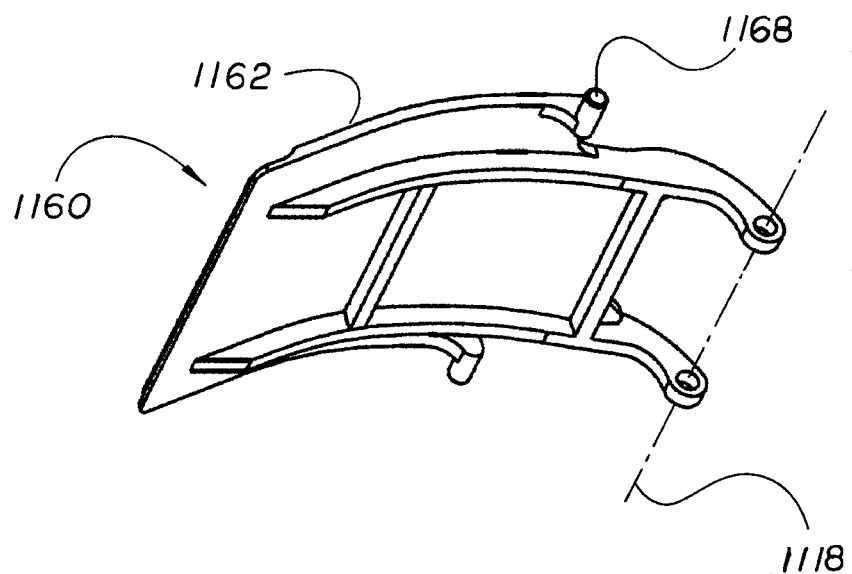
FIG. 40 is a perspective view of a second trigger plate in accordance with an exemplary embodiment.
Figure 41:
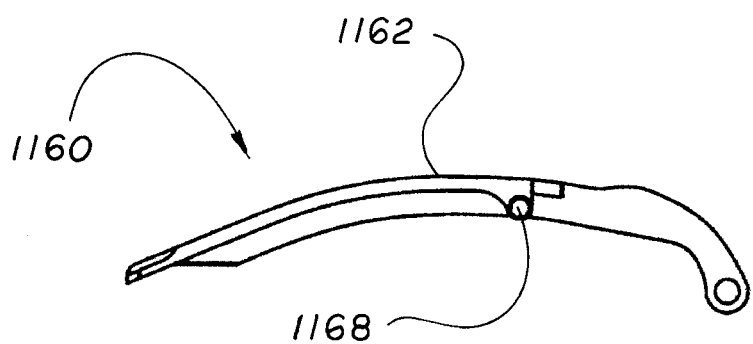
FIG. 41 is a side view of a second trigger plate in accordance with an exemplary embodiment.

Referring to FIGS. 35 and 40-41, in an exemplary embodiment, the second trigger plate 1160 may be pivotally coupled with the platform plate 1110 about a second trigger pivot axis 1118. Any suitable means for pivotally coupling the second trigger plate 1160 with the platform plate 1110 may be used. The second trigger pivot axis 1118 is preferably parallel to, but spaced apart from the first pivot axis 1116. The second trigger plate 1160 may have an upper trigger surface 1162 that is configured to be actuated by an animal, such as when the animal treads on the trigger surface 1162.

The second trigger plate 1160 may be operably coupled with the catch 1120 so that when the second trigger plate 1160 is actuated, the catch 1120 releases the platform plate 1110 from the latched position. In an exemplary embodiment, the second trigger plate 1160 may be configured so that when actuated, it pivots about the second trigger pivot axis 1118, and it acts as a lever to apply force to a leverage point 1150 on the first trigger plate 1140, pivoting the first trigger plate 1140 to its triggered position as described above. In an exemplary embodiment, second trigger plate 1160 may have coupling bosses 1168 that are slidingly received in corresponding coupling slots 1152 in the first trigger plate 1140. When a triggering force is applied to the trigger surface 1162 of the second trigger plate 1160, such as by an animal, the force is transferred from the second trigger plate 1160 to the first trigger plate 1140 at the contact point between the coupling bosses 1168 and slots 1152. In exemplary embodiments, second trigger plate 1160 may be disposed behind first trigger plate 1140, i.e., with at least a portion of the second trigger plate 1160 disposed between the first trigger plate 1140 and the rear wall of the housing.

In exemplary embodiments, the first trigger plate 1140 and/or second trigger plate 1160 are biased toward an untriggered position. Any means for biasing the first trigger plate 1140 and/or second trigger plate 1160 may be employed. In one exemplary embodiment, when the platform plate 1110 is in its latched position, the first leg 1128 of the catch 1120 engages with the downward projection 1146 of the first trigger plate 1140, biasing it toward an untriggered position. The first trigger plate 1140 engages with the second trigger plate 1160, at the coupling slots 1152, which apply a biasing force to the coupling bosses 1168 on the second trigger plate 1160, thereby pivoting the second trigger plate 1160 to its untriggered position. It is understood that these and/or other mechanisms may be used for biasing the first trigger plate 1140 and/or second trigger plate 1160, as necessary or desired.

In exemplary embodiments, the first trigger plate 1140 and/or the second trigger plate 1160 may have a predetermined threshold triggering force (the force required to overcome the biasing force and actuate the triggering mechanism). The first trigger plate 1140 and/or the second trigger plate 1160 may have any necessary or desired threshold triggering force. In exemplary embodiments, the first trigger plate 1140 and/or the second trigger plate 1160 has a threshold triggering force that allows the respective trigger plate to be actuated by an animal.

In exemplary embodiments, a triggering force (above the threshold triggering force) applied to the first trigger plate 1140 pivots the first trigger plate 1140 about the first pivot axis 1116 causing the catch 1120 to release from the platform plate 1110. The trigger surface 1142 and/or leverage point 1150 may be located at a predetermined distance from the first trigger pivot axis 1116, so that the weight of an animal may provide at least the threshold triggering force. It will be understood that when the trigger surface 1142 and/or leverage point 1150 is located closer to the first trigger pivot axis 1116, a larger triggering force is required to actuate the first trigger plate 1140; and when the trigger surface 1142 and/or leverage point 1150 is further away from the first trigger pivot axis 1116, a smaller force is required to actuate the first trigger plate 1140. Likewise, trigger surface 1162 of the second trigger plate 1160 may be located at a predetermined distance from the second trigger pivot axis 1118. It will be understood that when the trigger surface 1162 is located closer to the second trigger pivot axis 1118, a larger triggering force must be applied to actuate first trigger plate 1140; and when the trigger surface 1162 is further away from the second trigger pivot axis 1118, a smaller triggering force is required to actuate the first trigger plate 1140. These dimensions may be configured to provide any necessary or desired threshold triggering force.

In some exemplary embodiments, the first trigger plate 1140 and the second trigger plate 1160 may have a different threshold triggering force. For example, in one exemplary embodiment, the second trigger plate 1160 may have a lower threshold triggering force than that of the first trigger plate 1140. This type of trigger plate configuration may help the trap to capture animals having various weights. For example, the first trigger plate 1140 may have a first threshold triggering force that can be achieved when an animal having at least about a first weight treads on the first trigger plate 1140. If an animal weighing less than the first weight treads across the first trigger plate 1140, it may not directly actuate the first trigger plate 1140. However, the second trigger plate 1160 may be configured to have a second threshold triggering force that can be achieved when an animal having a second (lesser) weight treads on the second trigger plate 1160. It will be understood that the trigger plates can be configured to have the same threshold trigger force, or different threshold trigger forces, to provide necessary or desired triggering characteristics to the trap.

In various exemplary embodiments, a trap may combine the one or more different trapping mechanisms, described herein, or may combine the trapping mechanisms described herein with one or more additional trapping mechanisms. Exemplary additional trapping mechanisms are disclosed in U.S. application Ser. No. 11/956,963 filed on Dec. 14, 2007; and U.S. application Ser. No. 11/956,912, filed on Dec. 14, 2007; the disclosures of which are incorporated by reference herein in their respective entirety.

In various exemplary embodiments, a trap may combine features of a pivoting platform, with the features of a compressible or collapsible trapping enclosure, described in more detail below. For example, the trap may have a housing that has members that are slidingly engaged. An animal may enter the collapsible trapping enclosure through an opening. When the trap is triggered by an animal, the pivoting platform moves the animal toward a wall of the housing, while a portion of the housing collapses to close the opening to the trap.

An exemplary trapping device having a collapsible trapping enclosure will be described in more detail with respect to FIGS. 42A-49. In the exemplary embodiments illustrated in FIGS. 42A, 42B and 43, trap 2100 may have a first housing member 2200, and a second housing member 2300, which may be slideably engaged. It should be appreciated that all of the drawing figures illustrate a simplified view of an exemplary trap 2100, and its components, and that trap 2100 may include additional elements that are not depicted. Generally speaking, the trap 2100 may initially be set to an open position such as by sliding first housing member 2200 and/or second housing member 2300 apart, and latching the members this position. Trap 2100 may have at least one opening 2240, that provides a passageway for an animal to enter the trap 2100. When an animal enters the trap, and actuates a trigger, the first and/or second housing members 2200, 2300 collapse towards each other, thereby causing the trap 2100 to move to a closed position. In the closed position, the at least one opening 2240 is substantially blocked so that the animal is enclosed within the trap 2100, and is unable to escape. In addition, the animal may be immobilized by one or more immobilizing members 2270, 2370, within the first and/or second housing member 2200, 2300. Various means for configuring and operating the trap 2100 are described below.

Figure 47:
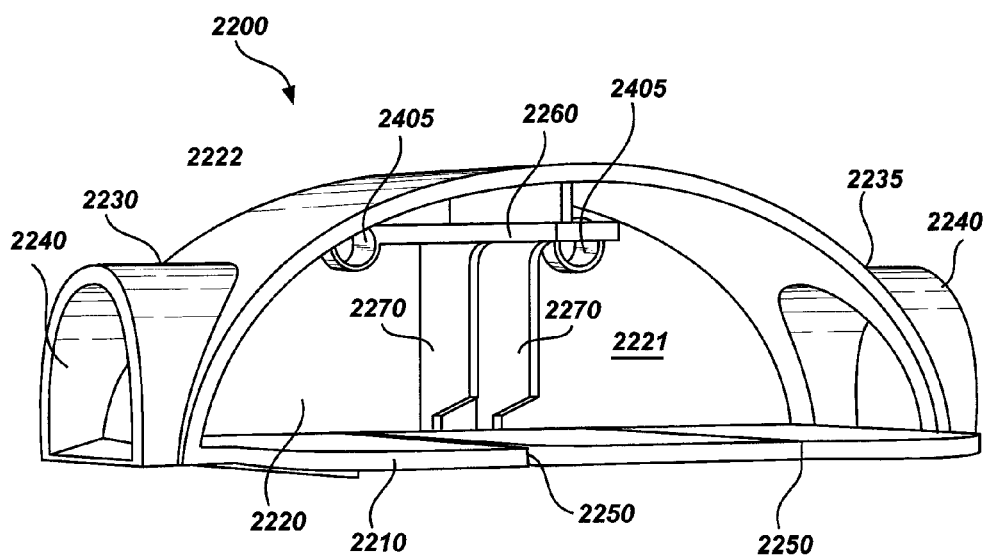
FIG. 47 depicts a perspective view of a first housing member in accordance with an exemplary embodiment.

In an exemplary embodiment illustrated in FIG. 47, first housing member 2200 may have a partial enclosure 2200, such as one defined by a base 2210, a side wall 2221, and an upper wall 2222. In exemplary embodiments, at least one side of the partial enclosure 2200 may be partially open. The partial enclosure 2220 may have two ends 2230 and 2235. In various exemplary embodiments, the first housing member 2200 may be rigid or substantially rigid. In other embodiments, at least a part of the first housing member 2200 is rigid or substantially rigid.

Figure 48:
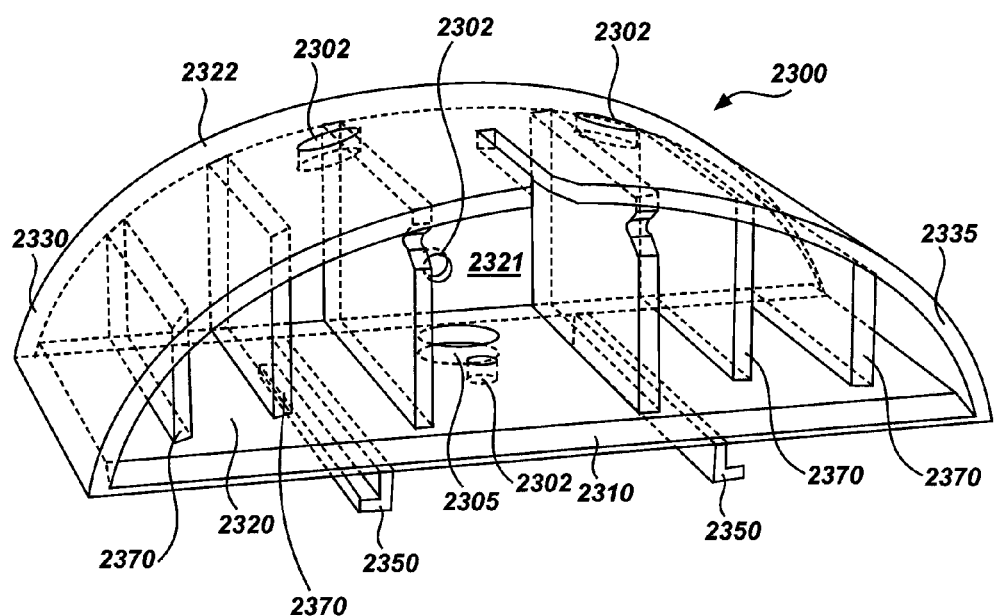
FIG. 48 depicts a perspective view of a second housing member in accordance with an exemplary embodiment.

In an exemplary embodiment illustrated in FIG. 48, second housing member 2300 may have a partial enclosure 2320, such as one defined by a base 2310, a side wall 2321, and an upper wall 2322. In exemplary embodiments, at least one side of the partial enclosure 2320 may be at least partially open. The partial enclosure may have two ends 2330 and 2335. In various exemplary embodiments, the second housing member 2300 may be rigid or substantially rigid. In other embodiments, at least a part of the second housing member 2300 is rigid or substantially rigid.

Figure 42A:
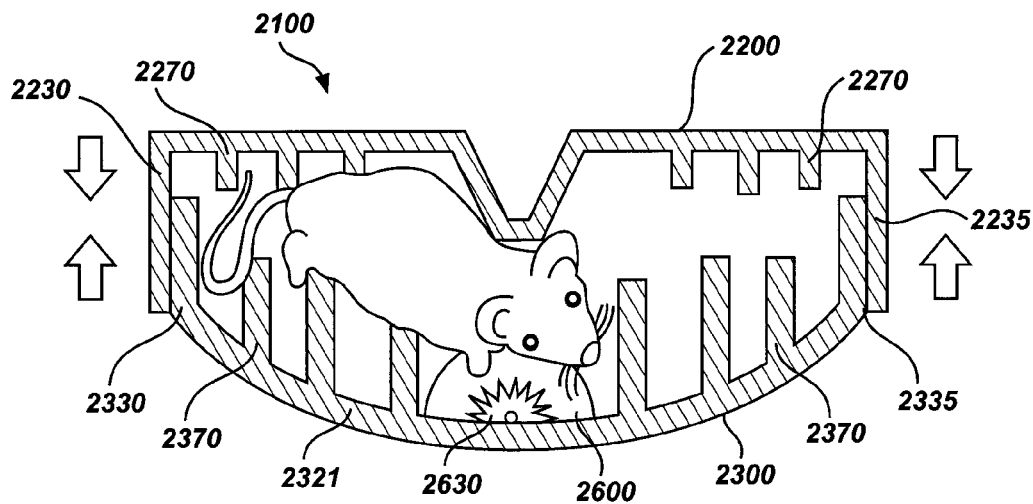
FIG. 42A depicts a top view of a trap illustrated in the closed position, in accordance with an exemplary embodiment.
Figure 42B:
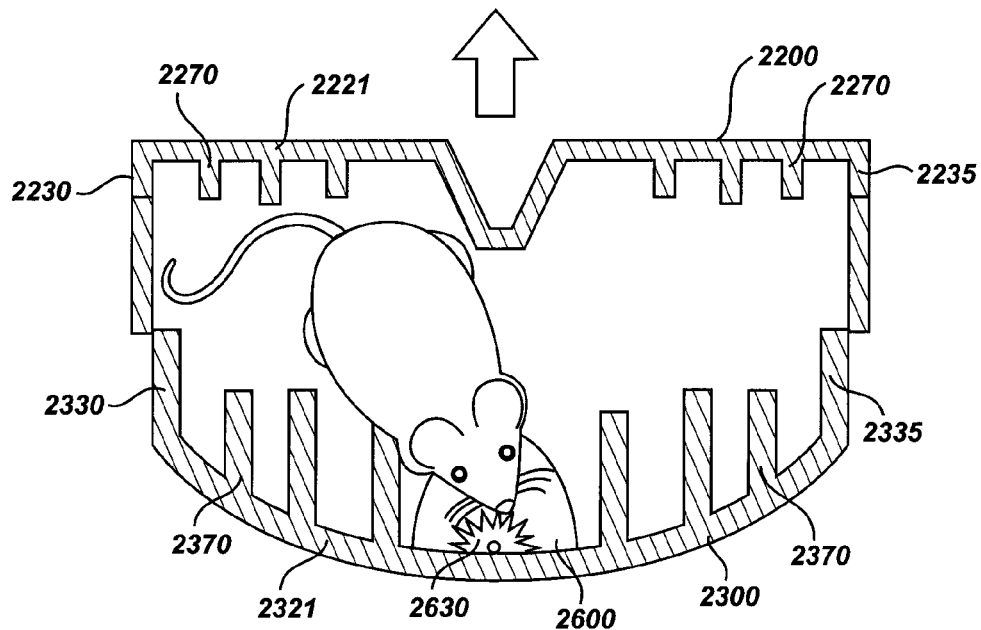
FIG. 42B depicts a top view of a trap illustrated in the open position, in accordance with an exemplary embodiment.
Figure 43:
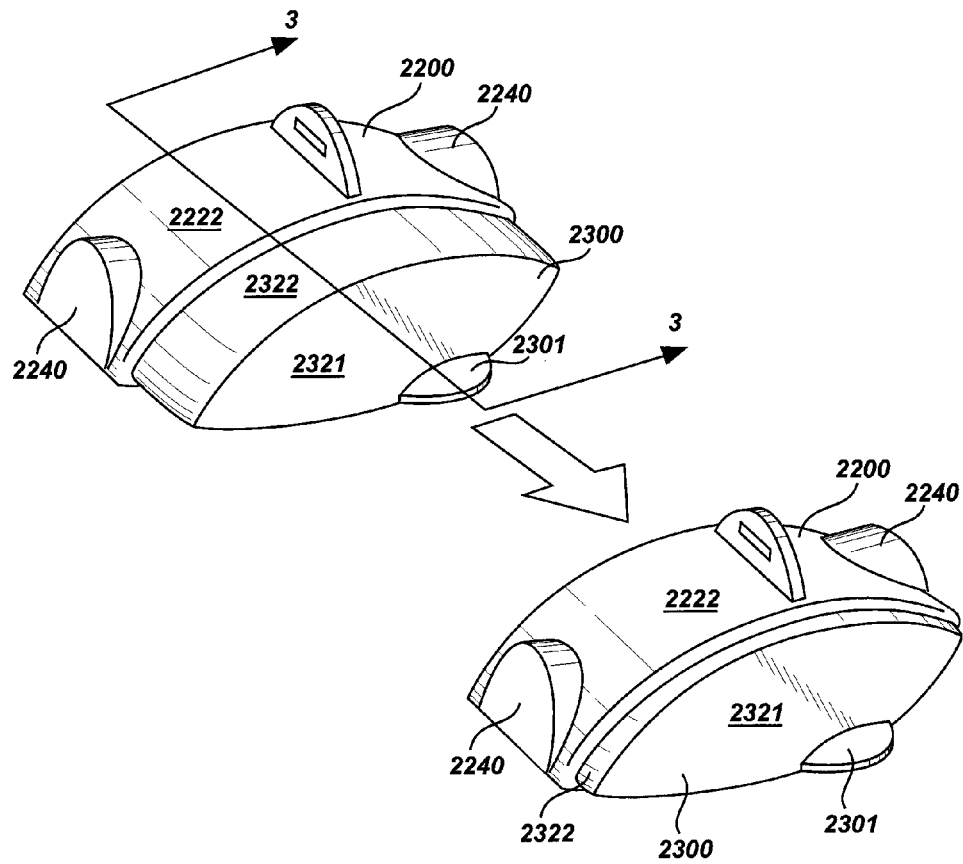
FIG. 43 depicts a perspective view of a trap illustrated in the open and closed position, in accordance with an exemplary embodiment.

In exemplary embodiments, the partial enclosure 2220 may have at least one opening 2240, in at least one of the ends 2230, 2235, providing a passageway for an animal to enter the trap 2100. As illustrated in FIGS. 42A, 42B and 43, in various exemplary embodiments, first housing member 2200 may have two openings 2240 with each opening 2240 disposed in an end 2230, 2235 of the first housing member 2200. In some embodiments, the openings 2240 may be disposed on opposite ends 2230, 2235 of the housing member 2200 so that they may provide a line of sight between the two openings 2240. It is understood that one or more openings 2240 may optionally be provided in partial enclosure 2320, in the same or similar manner.

In various exemplary embodiments, the first housing member 2200 and second housing member 2300 may be reversed so that the second housing member 2300 may have the components described herein with respect to first housing member 2200, and the first housing member 2200 may have the components described herein with respect to the second housing member 2300. In other embodiments, housing members 2200, 2300 may have the same components, such as a combination of the components described herein with respect to the first and second housing members 2200, 2300.

In various exemplary embodiments, trap 2100 may be configured so that side 2221, and side 2321 are on opposite sides of the trap 2100. When first and second housing members 2200, 2300 are slidably engaged, they provide a trapping enclosure, substantially defined by the combination of the first enclosure 2220, and second enclosure 2330. The one or more openings 2240 in the trap 2100, thereby provide a passageway for an animal to enter the trap 2100.

In various embodiments, trap 2100 may have an collapsible or compressible trapping enclosure. In some embodiments, first housing member 2200 and second housing member 2300 may be slideably engaged with each other to define a collapsible trap enclosure therebetween. For example, the first housing member 2200 and second housing member 2300, may be configured so that one or both of the housing members 2200 and 2300 may slide between a closed position and an open position, without the two members becoming disengaged. As one or both members 2200, 2300 slide toward the open position, side walls 2221 and 2321 to move apart, expanding the trapping enclosure. In the open position, one or more openings 2240 in the trap 2100 may be substantially unblocked, providing a passageway to the trapping enclosure. As one or both members 2200, 2300 slide toward the closed position, the side walls 2221 and 2321 to move toward each other, collapsing the trapping enclosure. In the closed position, ends 2330, 2335 may substantially close or block the one or more openings 2240 in the first housing member 2200, as illustrated in FIG. 42A. In the closed position, the passageways are blocked, trapping an animal inside.

In various exemplary embodiments, the distance that the first housing member 2200 may slide relative to the second housing member 2300 when moving from the open position to the closed position should be at least the width of the one or more openings 2240.

Figure 49:
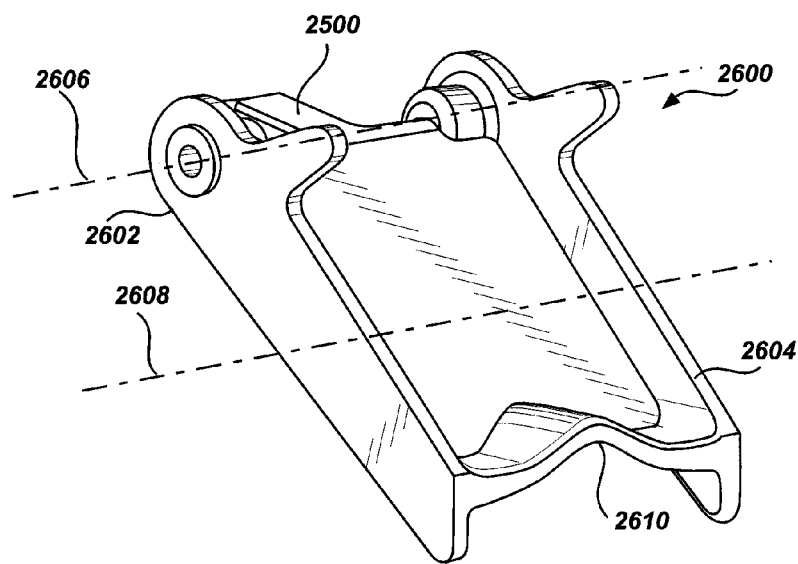
FIG. 49 depicts a perspective view of a trigger, in accordance with an exemplary embodiment.

In the exemplary embodiments illustrated in FIGS. 48 and 49, first housing member 2200 and second housing member 2300 may be configured to slideably engage along one or more surfaces, such as at their respective base members 2210, 2310. In the exemplary embodiments, first housing member 2200 may have one or more grooves 2250 in the base 2210, while second housing member 2300 may have one or more corresponding rails 2350 extending from its base 2310. In exemplary embodiments, when the first housing member 2200 and second housing member 2300 are slideably engaged, the rails 2350 may glide back and forth inside grooves 2250. It is appreciated that the slideably engaging mechanisms of the first and second housing members 2200, 2300 may be interchangeable—in other words, second housing member 2300 may include grooves, and first housing member 2200 may include corresponding rails. Furthermore, it is appreciated that there are various other mechanisms, such as tubes and bosses, that would enable first housing member 2200 and second housing member 2300 to be slideably engaged with respect to each other, and that these mechanisms may be disposed on one or more surfaces of the first and second housing members 2200, 2300.

Figure 44:
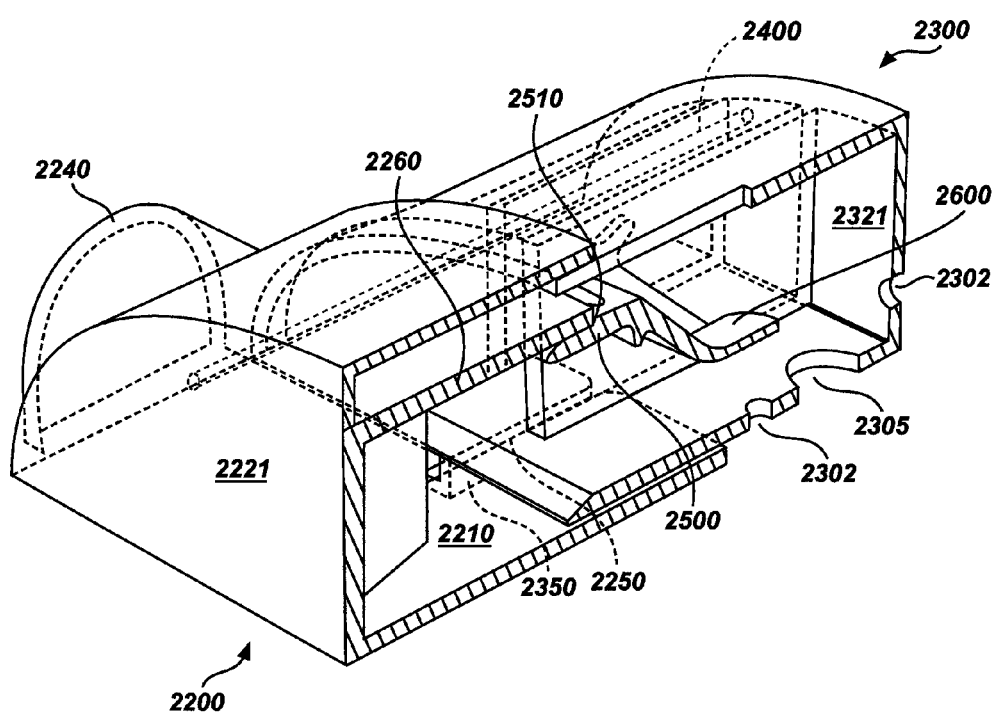
FIG. 44 depicts a perspective view of a trap illustrated in the open position, as viewed along 3-3 of FIG. 43, in accordance with an exemplary embodiment.

In various exemplary embodiments, first housing member 2200 and second housing member 2300 may have a size and shape that enables the housing members 2200, 2300 to at least partially nest together. For example, FIGS. 42A-44 illustrate an exemplary embodiment in which second housing member 2300 may nest inside first housing member 2200. In a nested configuration, it is preferred that the overall shape of the housing members are similar, with one enclosure fitting closely inside the other, to provide relatively small gaps between the two housing members when they are nested together. At a maximum, the gaps between nested housing members 2200 and 2300 should be sufficiently small so that an animal cannot fit through the gaps. For example, as illustrated in FIG. 44, when the two housing members 2200, 2300 are nested, the upper wall 2322 of second housing member 2300 may fit closely against the upper wall 2222 of first housing member 2200, with only a slight clearance between them. It will be appreciated that in various other embodiments, the first and second housing members 2200, 2300 may nest together in various other configurations, including partial nesting of one or more of the surfaces.

In various exemplary embodiments, the trap 2100 may be biased toward the closed position, and a latching mechanism 2500 may be provided so that a user can initially set the trap 2100 to the open position, so that an animal may enter the trap 2100, such as through one or more openings 2240. In exemplary embodiments, the trap 2100 may include a triggering mechanism 2600 disposed at least partially inside the trap. When triggering mechanism 2600 is triggered by an animal it releases the latching mechanism 2500 from its latched position, and the biasing forces move the trap 2100 to its closed position, trapping the animal inside.

In exemplary embodiments, the trap 2100 may have a biasing mechanism 2400 that biases the trap 2100 toward the closed position. In various exemplary embodiments, the trap 2100 may have a biasing mechanism 2400, operably coupled with first and second housing members 2200, 2300, that may provide constant tension between the two housing members 2200 and 2300, tending to pull them toward the closed position. For example, the biasing mechanism 2400 may include one or more springs joined on one end to the first housing member 2200, such as through spring attachment holes 2405, illustrated in FIG. 47, and on the opposite end to the second housing member 2300. It will be appreciated that other suitable biasing mechanisms may be provided in addition to or as an alternative to those described herein, to provide a biasing force between housing members 2200 and 2300, such as, for example, an elastomeric material stretched between or around the housing members 2200, 2300.

To initially set the trap 2100 to the open position, a force may be applied to one or both of the housing members 2200 and 2300, overcoming the biasing force and sliding one or both of the housing members 2200 and 2300 into the open or set position. For example, a user of the trap 2100 may pull on the second housing member 2300 to slide it away from first housing member 2200 until the trap 2100 is in the open position. It will be appreciated that in various exemplary embodiments, an opening means or gripping means may be provided to slide the first and/or second housing members to the open or set position, or assist in the movement of one or both of the housing members to the open or set position. For example, in the exemplary embodiment illustrated in FIG. 43, a finger tab 2301 may be provided on the side of second housing member 2300. The finger tab 2301 may be configured so that a user of the trap may grab the second housing member and pull it away from the first housing member 2200. In other exemplary embodiments, such as one illustrated in FIG. 44, one or more finger gripping holes 2302 may be provided on one or more of the base portions 2210, 2310, sides 2321, 2221 or upper walls 2322, 2222 that provides a region for the user to grip and slide the first and second housing members 2200, 2300 toward their open position. It will be appreciated that other means and devices may be used to provide a gripping region, including various types of lips, grooves, protrusions, depressions, or other such devices that improve the user's ability to grip and slide the housing members 2200, 2300.

Figure 45:
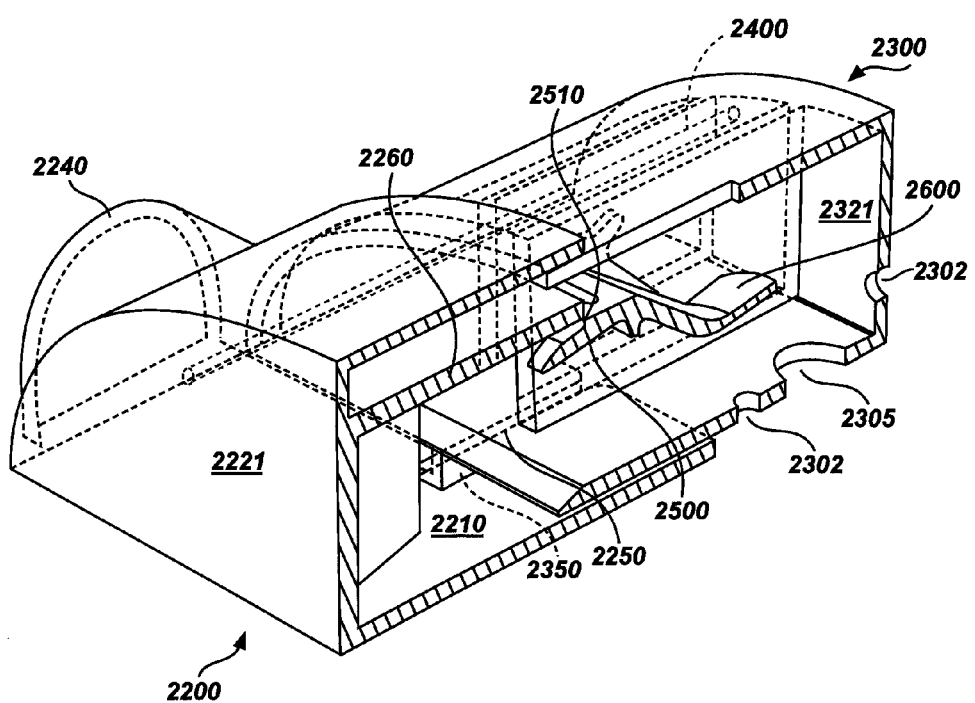
FIG. 45 depicts a perspective sectional view of a rodent illustrated in the unlatched position, as viewed along 3-3 of FIG. 43, in accordance with an exemplary embodiment.
Figure 46:
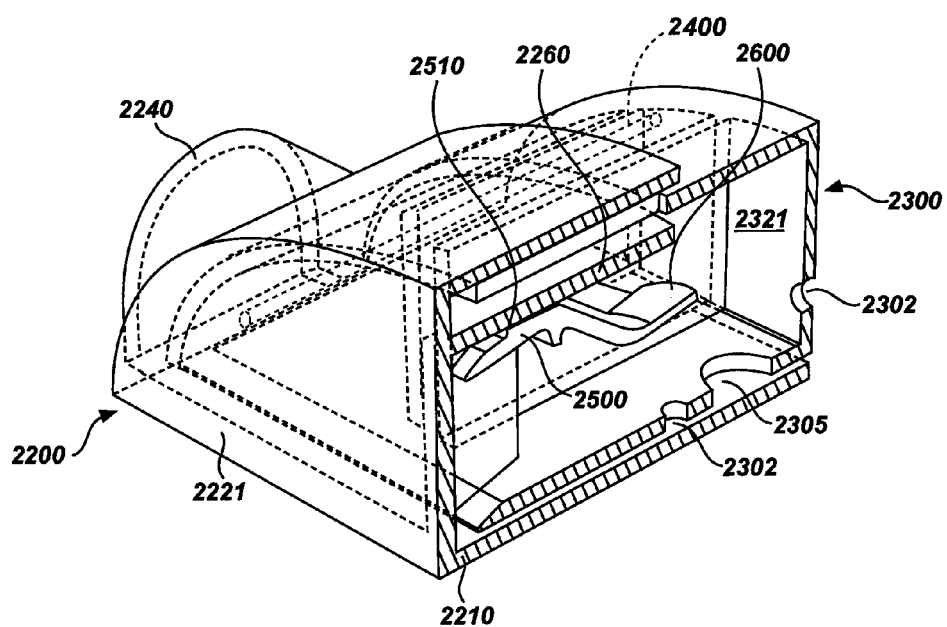
FIG. 46 depicts a perspective sectional view of a trap illustrated in the closed position, as viewed along 3-3 of FIG. 43, in accordance with an exemplary embodiment.

To maintain the trap 2100 in the open position, a latching mechanism 2500 may be provided. For example, as shown in FIGS. 44-46, latching member 2500 may be joined with second housing member 2300, extending between first housing member 2200 and second housing member 2300. In a latched position, latching member 2500 may have a prong 2510 that may rest against an edge or surface of first housing member 2200, to hold the two housing members 2200, 2300 in an open position. The latching mechanism 2500 may be configured so that the latching member 2500 latches with any suitable portion of first housing member 2200, or against a separate latching member, such as latching flange 2260, illustrated in FIG. 47. In some exemplary embodiments, the latching member 2500 may be biased towards its latched position, so that, for example, when the first and second housing members 2200, 2300 are slid toward the open position, the latching member 2500 automatically moves to its latched position, without further user intervention. It will be appreciated that other latching mechanisms may be provided to latch the first and second housing members 2200, 2300 in their open positions.

In exemplary embodiments, a triggering mechanism 2600 may be provided that causes the trap 2100 to move from the open position to the closed position. For example, a triggering mechanism 2600 may be provided that releases latching mechanism 2500 from its latched position, enabling the biasing mechanism 2400 to move the trap 2100 to the closed position. The triggering mechanism 2600 may be at least partially disposed inside the trap 2100, and may be adapted to be actuated by an animal inside the trapping enclosure. For example, in the exemplary embodiment shown in FIG. 42B, the triggering mechanism 2600 may be provided inside the second housing member 2300. The triggering mechanism 2600 according to an exemplary embodiment is illustrated in FIG. 49. In this exemplary embodiment, the triggering mechanism 2600 may have a latching portion 2602, and an actuation portion 2604. The triggering mechanism 2600 may be pivotally coupled with the second housing member 2300, so that it may pivot about pivot axis 2606. The triggering mechanism 2600 may be configured so that when an animal pushes against the triggering mechanism 2600, the latching portion 2602 rotates about the axis, releasing the latch member 2500 from its latched position.

In various exemplary embodiments, an attractant 2630 may be provided inside the trap 2100. The attractant 2630 may entice an animal to enter the trap 2100, and to move toward the triggering mechanism 2600, so the animal may manipulate the triggering mechanism 2600. In exemplary embodiments, triggering mechanism 2600 may be disposed at least partially between the one or more openings 2240 and the attractant 2630. As the animal attempts to access the attractant 2630, it will likely push against or nuzzle the triggering mechanism 2600, causing the triggering mechanism 2600 to pivot about pivot axis 2606. Simultaneously, the latching portion 2602 of the triggering mechanism 2600, will rotate about pivot axis 2606, and will eventually cause the release of latching member 2500 from latching flange 2260. When the latching mechanism 2500 releases, the trap 2100 moves to its closed position.

It is appreciated that any suitable attractant 2630 may be provided to entice an animal into the trap 2100, and toward the triggering mechanism 2600. For example, attractant 2630 may include a bait, such as a food or chemical bait, a fragrance, a rodenticide, or other suitable means for attracting the animal toward the rear portion of the second housing member 2300. In exemplary embodiments, the trap 2100 may be provided to the user with an attractant 2630 already installed. For example, when a user obtains the trap 2100, an attractant 2630 may be disposed in the first or second housing portion 2200, 2300. In certain exemplary embodiments, the trap 2100 may be provided with an attractant 2630, but the user exposes the attractant 2630 prior to use. For example, the attractant 2630 may be provided in the trap 2100 with a plastic or foil wrapper that should be removed by the user prior to use, or the attractant 2630 may be provided in a blister pack to which the user should apply pressure in order to expose the attractant 2630. In certain exemplary embodiments, the user may expose the attractant 2630 from outside of the trap 2100. In other exemplary embodiments, the trap 2100 may be provided with one or more means for inserting the attractant 2630 into the trap 2100, or replacing old or spent attractant 2630. For example, in the exemplary embodiment illustrated in FIG. 44, one or more cutaways 2305 may be provided to insert an attractant 2630, or remove and replace an attractant 2630. Where such a cutaway is provided, the cutaway 2305 should be small enough so as not to provide an entrance or exit point for an animal. It is appreciated that other suitable means for inserting attractant 2630, removing attractant 2630, or both may be provided in trap 2100, such as, for example, a slidable tray that receives an attractant, or a groove for receiving a pre-baited device.

In various exemplary embodiments, the triggering mechanism 2600 may be configured to provide a line of sight to the attractant 2630, so that the animal may see the attractant 2630. It is believed that by providing a line of sight to the attractant 2630, an animal should be more likely to advance toward the attractant 2630, and therefore more likely to trigger the triggering mechanism 2600. For example, in an exemplary embodiment illustrated in FIG. 49, the triggering mechanism 2600 may have on its actuating portion 2604, an edge or lip 2610, to provide such a line of sight. As illustrated in FIG. 49, at least a part of the edge 2610 may be concave. In other embodiments, substantially the entire edge 2610 may be concave.

In various exemplary embodiments, the triggering mechanism 2600, once triggered by an animal, may directly or indirectly release the latching mechanism 2500 from its latched position. For example, in exemplary embodiment shown in FIGS. 44-66, the triggering mechanism 2600 may be rigidly connected to the latching member 2500. The triggering member 2600 may be pivotally coupled with the second housing member 2300, so that when the triggering mechanism 2600 is manipulated by an animal, the triggering member 2600 pivots, thereby pivoting the latching member 2500 until prong 2510 releases from the first housing member 2200. In other exemplary embodiments, the latching member 2500 may be indirectly actuated by the triggering mechanism 2600. For example, one or more intermediate mechanisms may be provided between the trigger actuating portion 2604 and the latching member 2500, whereby manipulation of the actuation portion 2606 of the triggering mechanism 2600, sets off one or more of the intermediate mechanisms, which in turn release the latching member 2500.

In exemplary embodiments having a triggering mechanism 2600 like the one illustrated in FIG. 49, it is believed that the weight distribution of the triggering mechanism 2600 about the pivot axis 2606 may affect the effectiveness of the triggering mechanism 2600. For example, the triggering mechanism 2600 may have a center of gravity, which lies on axis 2608, which does not coincide with pivot axis 2606. Without being limited by a specific theory, it is believed that when the two axes 2606, 2608 coincide, the triggering mechanism 2600 may be too sensitive, and may trigger with too slight of an action, in some cases causing the trap 2100 to mis-fire without trapping an animal. Therefore, in various exemplary embodiments, the center of gravity axis 2608 may be spaced at a pre-determined distance from the pivot axis 2606. In some exemplary embodiments, the center of gravity axis 2608 may be located toward the actuating portion 2604 of the triggering mechanism 2600. Without being limited to a specific theory, it is believed that by locating the center of gravity toward the actuating portion 2604 of the triggering mechanism 2600, the trigger mechanism 2600 may require slightly more effort to manipulate and actuate, causing a more predictable triggering action. The methods of determining the location of the center of gravity axis 2608 relative to the pivot axis 2606 will be appreciated by those familiar with such devices.

It is understood that other suitable triggering mechanisms 2600 may be provided, such as, for example, a triggering mechanism 2600 that actuated by an animal stepping on a trigger, or a triggering mechanism 2600 that may be triggered by an electronic sensing device. While the action of such triggering devices will differ from the triggering mechanism 2600 described above, suitable triggering mechanisms 2600 should be effective at directly or indirectly compressing or collapsing the trap 2100 to its closed position, such as by releasing the latching member 2500 from its latched position, causing the first and second housing members 2200, 2300, to compress or collapse toward each other under a biasing force.

As mentioned above, when the latching member 2500 is released from the latched position, one or both housing members 2200 and 2300 slide toward each other, collapsing or compressing the trapping enclosure therebetween. In the closed position, the one or more openings 2240 may be substantially closed or blocked, confining an animal inside the trap 2100. In exemplary embodiments, the biasing mechanism 2400 should provide sufficient action so that the first and second housing members 2200, 2300 may collapse almost simultaneously with the release of the latching mechanism 2500. In addition, the biasing mechanism 2400 should provide sufficient force so that when the trap 2100 is in the closed position, an animal trapped inside cannot manipulate on or both of the first and second housing members 2200, 2300 and open them. The various means for determining an appropriate biasing force and action to satisfy the objectives disclosed herein will be understood. It will be appreciated that there are numerous devices that may be suitable for providing the biasing mechanism 2400.

In various exemplary embodiments, the trap 2100 may have additional elements to immobilize an animal trapped inside. For example, as illustrated in FIGS. 42A-42B, second housing member 2300 may have a plurality of immobilizing members 2370 extending into the trapping enclosure. Immobilizing members 2370 may be connected to or project from any portion of the enclosure, such as from the side 2321, base, 2310, or upper wall 2322. Similarly, first housing member 2200 may optionally have one or more immobilizing members 2270 extending into the trapping enclosure. In various exemplary embodiments, the immobilizing members 2270, 2370 may be rigid or substantially rigid projections, having rounded, blunt, or sharp ends. In exemplary embodiments, when the trap 2100 is in the closed position, the immobilizing members 2270, 2370 restrict the area within the trapping enclosure, further restricting the movement of the animal within the enclosure. In various embodiments, the immobilizing members 2270, 2370, may come in direct contact with the animal, crushing it, compressing it, impaling it, or otherwise immobilizing it. It will be appreciated that other suitable means may be provided to immobilize an animal inside the closed trap, such as, for example, adhesive or electrical means.

In various exemplary embodiments, a trap may combine features of a pivoting platform, and/or the features of a compressible or collapsible trapping enclosure, with the features of a trap having a snare, described in more detail below. For example, the trap may have a pivoting platform and a snare. An animal may enter the collapsible trapping enclosure through an opening. When the trap is triggered by an animal, the pivoting platform moves the animal toward a wall of the housing, while a snare encircles the animal.

Figure 50:
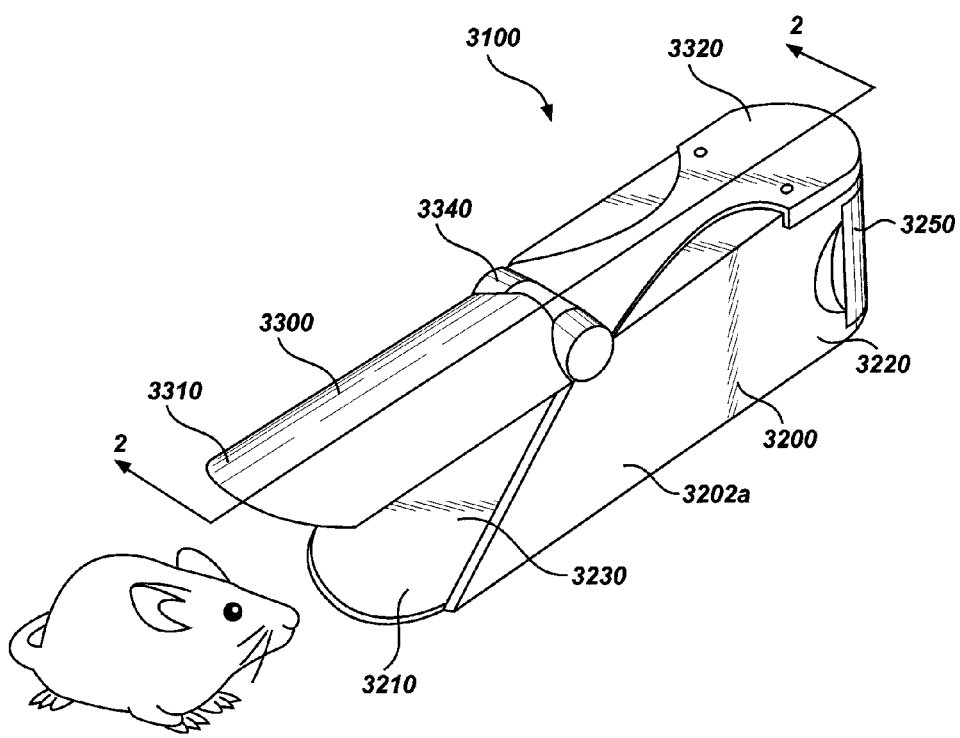
FIG. 50 depicts a perspective view of a rodent trap in accordance with an exemplary embodiment.
Figure 51:
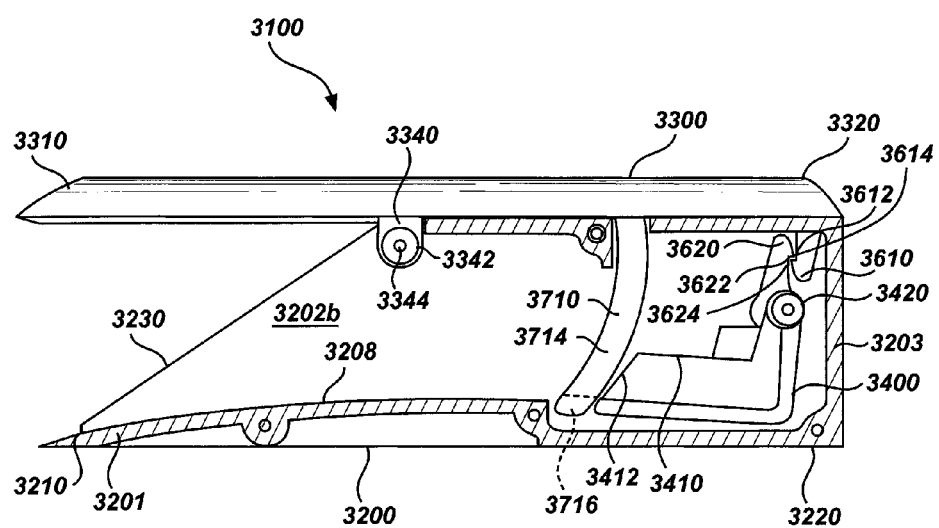
FIG. 51 depicts an elevation view of a rodent trap, as viewed along 2-2 in FIG. 1, in accordance with an exemplary embodiment.
Figure 52:
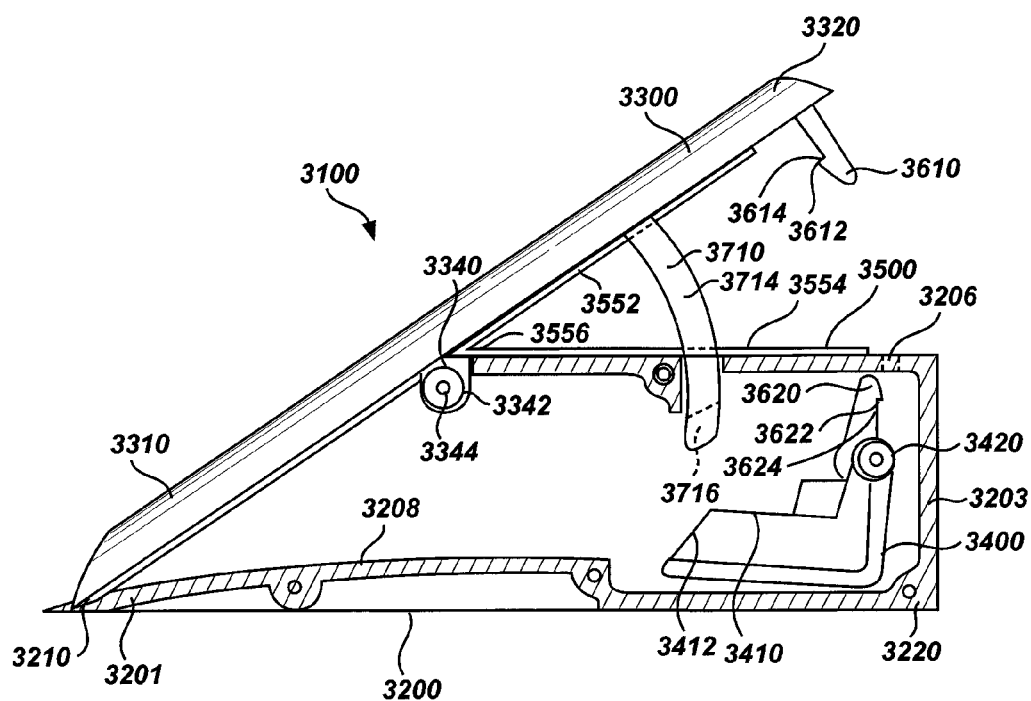
FIG. 52 depicts an elevation view of a rodent trap, as viewed along 2-2 in FIG. 1, in accordance with an exemplary embodiment.

An exemplary trapping device having a snare will be described in more detail with respect to FIGS. 50-57. An exemplary embodiment of a rodent trap 3100 is illustrated in FIGS. 50, 51 and 52. It should be appreciated that all of the drawing figures illustrate a simplified view of an exemplary trap 3100, and its components, and that trap 3100 may include additional elements that are not depicted. FIG. 50 shows a perspective view of the trap 3100, in an open position. FIGS. 51 and 52 show a side elevation view of the trap 3100, with one side wall (3202a) removed to show the internal parts of the trap 3100. In the exemplary embodiment illustrated in FIG. 50, trap 3100 may have a housing 3200. Housing 3200 may have a front portion 3210 and a rear portion 3220. The front portion 3210 of the housing 3200 may have an opening 3230 that provides a passageway, such as for a rodent to enter the housing 3200. In an exemplary embodiment, housing 3200 may provide a partial enclosure large enough to enclose a rodent. For example, as illustrated in FIGS. 50-52 housing 3200 may have a base wall 3201, first and second side walls 3202a, 3202b, a rear wall 3203, and an upper wall 3204.

In exemplary embodiments, trap 3100 may include a snapper plate 3300, pivotally coupled with the housing 3200. The snapper plate may have a front portion 3310 generally corresponding the front portion 3210 of the housing 3200, and a rear portion 3320 generally corresponding the rear portion 3220 of the housing 3200. In some embodiments, the front portion 3310 of the snapper plate may be adapted to open and close about the opening 3230 in the housing 3200, to open or close the passageway into the housing. In other embodiments, the rear portion 3320 of the snapper plate may be adapted to cooperate with the rear portion 3220 of the housing 3200 to provide a trapping means, such as a snare 3700, to immobilize a rodent therein. In other embodiments, both the front portion 3310 and the rear portion 3320 cooperate to provide two separate means for confining and trapping a rodent inside the trap 3100. For example, the front portion 3310 of snapper plate 3300 may close the opening 3230 of the housing 3200, confining a rodent inside the housing 3200 while the rear portion 3320 of the snapper plate 3300 snares the confined rodent. Various means for configuring and operating the trap are described in more detail below.

Figure 53:
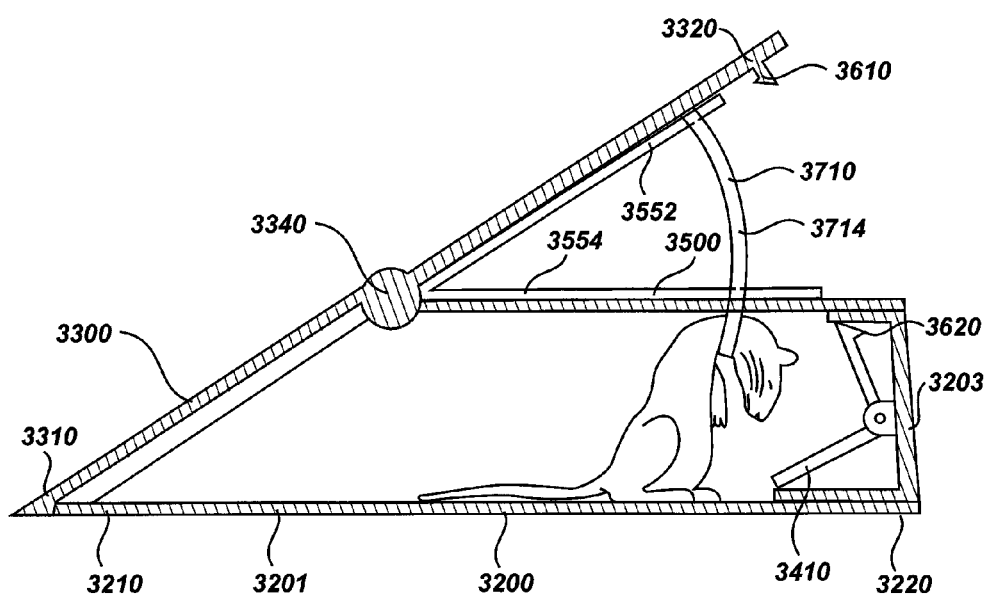
FIG. 53 depicts an elevation view of a rodent trap, in accordance with an exemplary embodiment.

In the exemplary embodiment illustrated in FIGS. 50-52, the snapper plate 3300 may be pivotally coupled to the housing 3200, such as at pivoting member 3340. The pivoting member 3340 may be located at an intermediate portion 330 of the snapper plate 3300. The pivoting member 3340 may enable the front portion 3310 of the snapper plate 3300 to pivot between an open and closed ("snapped") position over opening 3230. In an exemplary embodiment, the front portion 3310 and the rear portion 3320 of the snapper plate 3300 are substantially rigidly connected so that pivotal movement of the front portion 3310 of the snapper plate 3300 between the open and snapped positions is simultaneous with that of the rear portion 3320 of the snapper plate 3300. For example, when the snapper plate 3300 is in its open position, the rear portion 3320 of the snapper plate 3300 is in a set or unsnared configuration, as shown in FIGS. 50 and 51. When the snapper plate 3300 is in a snapped position, such as shown in FIGS. 52 and 53, the rear portion 3320 of the snapper plate 3300 is in a snared or trapped position. While various exemplary embodiments described herein are described with reference to a snapper plate 3300 having a substantially rigid connection between the front and rear portions 3310, 3320 of the snapper plate 3300, it will be understood that the front and rear portions 3310, 3320 of the snapper plate 3300 may be otherwise connected, such as with a pivotal connection or a slidable connection, while providing the same or similar function described above.

It will be appreciated that any suitable device may be used for pivoting member 3340, so long as it can provide a direct or indirect pivotal joint between the snapper plate 3300 and a housing 3200. For example, FIG. 51 illustrates an exemplary embodiment in which snapper plate 3300 may have at least one bearing member 3342 extending from the underside of the snapper plate 3300. The bearing member 3342 may have an aperture or other similar structure suitable for receiving a shaft or boss. A corresponding boss or stub shaft 3344 may be disposed on or joined with one or both side walls 3202a, 3202b of the housing 3200. The boss or stub shaft 3344 may be seated in corresponding bearing member 3342, providing a pivotal relationship between the housing 3200 and the snapper plate 3300. In alternative exemplary embodiments, pivoting member 3340 may include bearing members 3342 on both the housing 3200 and the snapper plate 3300, and an axle or shaft extending through the bearing members 3342 on both the housing 3200 and the snapper plate 3300. It will be appreciated that other suitable devices may be provided as pivoting member 3340, and may be incorporated into the trap 3100 to provide the same or similar function described herein.

In the exemplary embodiment of FIGS. 50-52, the snapper plate 3300 may be pivotally coupled to the upper surface of the housing 3200. In the illustrated embodiments, the front and rear portions 3310, 3320 of the snapper plate 3300 may pivot up and down about pivoting member 3342. For example, in the open or set position, the front portion 3310 of the snapper plate 3300 pivots upward so that it does not substantially block or impede opening 3230 to the trap 3100, as illustrated in FIGS. 50 and 51. Therefore, in this set position, a rodent may enter and exit the opening 3230 of the housing 3200. When the snapper plate 3300 is in the closed or snapped position, the front portion 3310 of the snapper plate 3300 pivots down over the opening 3230 in housing 3200, and substantially blocks the passageway to the housing 3200, preventing a rodent from entering or exiting the housing 3200, as illustrated in FIG. 52. While the exemplary embodiment is described in reference to a snapper plate 3300 being joined to the upper wall 3203 of the housing 3200, it is appreciated that the snapper plate 3300 may be mounted on other portions of the housing 3200 (e.g., the side wall 3202a or 3202b or the base wall 3201), without significantly departing from the spirit and scope of the exemplary embodiments.

Figure 54:
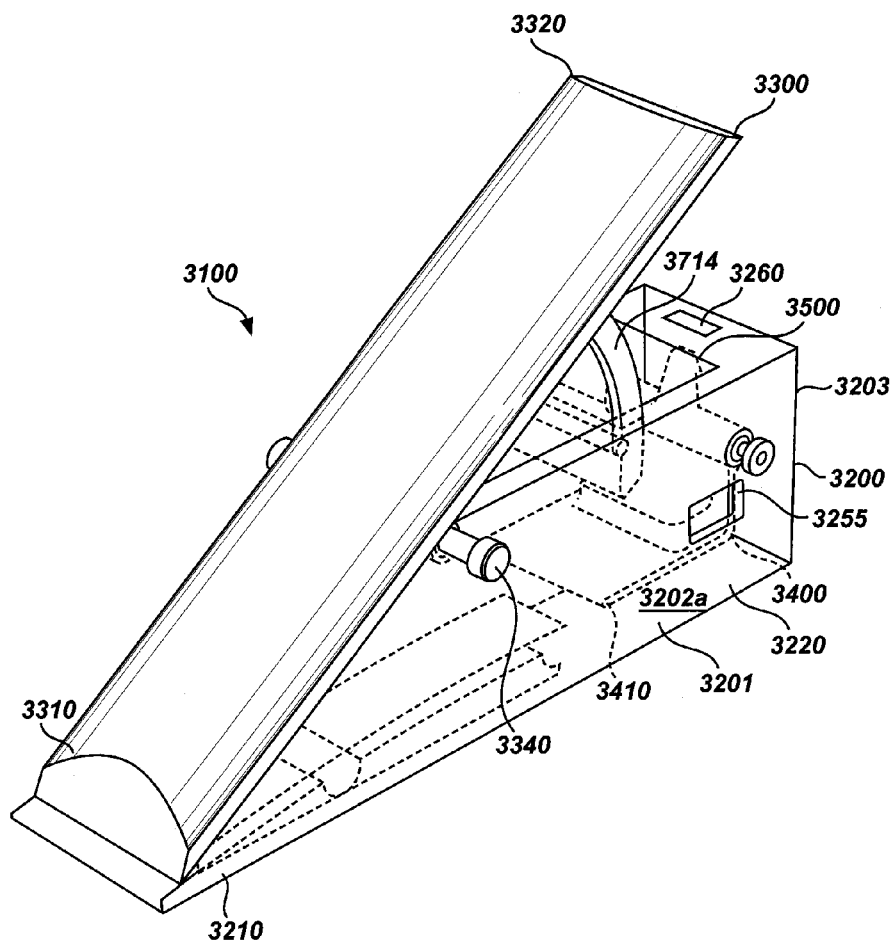
FIG. 54 depicts a perspective view of a rodent trap, in accordance with an exemplary embodiment.
Figure 57:
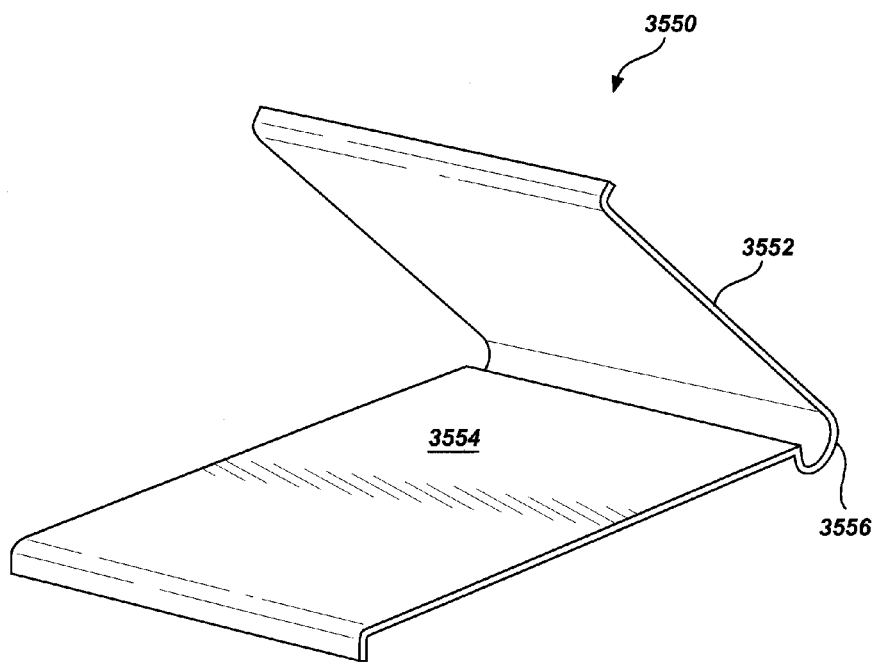
FIG. 57 depicts a perspective view of a spring clip, in accordance with an exemplary embodiment.

In various exemplary embodiments, the snapper plate 3300 and housing 3200 may be biased toward the snapped (closed, snared) position, as shown in FIGS. 52-54. The trap 3100 may include a biasing mechanism 3500 to provide a biasing force between the housing 3200 or snapper plate 3300 or both to urge the members toward the snapped configuration. For example, a spring clip (v-clip) 3550 may be provided between the snapper plate and the housing upper wall 3204, as illustrated in FIGS. 52-54. An exemplary spring clip 3550 is illustrated in FIG. 57. In this exemplary embodiment, spring clip 3550 may have a first side 3552, and a second side 3554, joined at connector 3556. The spring clip 3550 may be made of any flexible material that has a memory, such as, for example, spring steel. In an exemplary embodiment, as illustrated in FIG. 52, the connector 3556 may be disposed at or near the pivot means 3342, with first side 3552 operably coupled with the snapper plate 3300, and the second side 3554 operably coupled with the housing member 3200. In this configuration, the first and second sides 3552, 3554 of the spring clip 3550 exert a biasing force against the snapper plate 3300, and the housing member 3200.

It is understood that other biasing mechanisms 3500 may be provided in the alternative to, or in addition to spring clip 3550. For example, in various exemplary embodiments, the biasing mechanism 3500 may comprise a torsion spring (coil spring, helical spring), with at least one arm providing force against the snapper plate 3300, and at least one arm providing force against the housing member 3200, urging them toward the closed or snapped position. In other exemplary embodiments, the biasing force may be provided by a tension spring, a cantilever spring, a compression spring, an elastomeric material, or any other device or material suitable for providing a biasing force sufficient to urge the members 3200, 3300, to their closed or snapped position.

To set the trap 3100 in the open position, a force may be applied to the housing 3200 and/or snapper plate 3300 that overcomes the biasing force, and moves the housing 3200 and/or the snapper plate 3300 to the open or set position. For example, a user of the trap may apply a manual force to the rear portion 3320 of the snapper plate 3300, such as by pressing on it or stepping on it, to force it into the open or set position. In various exemplary embodiments, other means may be provided to move the snapper plate 3300 or housing 3200, or assist in the movement of the snapper plate 3300 or housing 3200 to the open or set position.

To hold the snapper plate 3300 and housing 3200 in the open or set position, a latching mechanism 3600 may be provided. For example, as shown in FIGS. 51 and 52, snapper plate 3300 may have a latch flange 3610 that extends downwardly from the rear portion 3320 of the snapper plate 3300, through the opening 3206 and into the housing 3200. The distal end of latch flange 3610 may have a notch 3612. A corresponding upwardly projecting latch flange 3620, as shown in FIG. 52, may be provided inside the housing 3200. The latch flange 3620 may be joined with the housing 3200, such as on a pivot 3340, in the rear portion 3220 of housing 3200. The distal end of latch flange 3620 may have a notch 3622 that is configured to engage with notch 3612 of the latch flange 3610, when the snapper plate 3300 and housing 3200 are in a latched position. In exemplary embodiments, the notches 3612, 3622 have mating surfaces 3614, 3624 that engage when the latching flanges 3610, 3620 are latched. These mating surfaces 3614, 3624 may have a sufficient size and angle to hold the two latch flanges 3610, 3620 in the latched position. For example, it is believed that in certain embodiments it is preferable to have mating surfaces 3614, 3624 that are about 0.5 millimeters to about 1.0 millimeters long, to have sufficient latching force to keep the latching flanges 3610, 3620 latched. In addition, it is believed that in certain embodiments it is preferable that the plane in which the mating surfaces 3614, 3624 lie is tangential to the pivot axis of the latch flange 3622. When the two latches 3610, 3620 are engaged in a latched position, the snapping plate 3300 and housing 3200 are maintained in their open or set position. It is understood that other suitable latching mechanisms 3600 may be provided in addition to or in the alternative to those described above for the same purposes described herein.

To release the trap 3100 from the open position, a triggering mechanism 3400 may be provided that releases latching mechanism 3600, enabling the biasing mechanism 3500 to force the snapper plate 3300 and the housing 3200 to the snapped position. In an exemplary embodiment, the triggering mechanism 3400 may be configured to be triggered by a rodent inside the housing. For example, as shown in FIGS. 51 and 52, triggering mechanism 3400 may be disposed inside the rear portion 3220 of the housing 3200. In exemplary embodiments, a rodent could enter housing 3200 at opening 3230, and travel toward the rear of the housing 3220, such as by traversing on entry platform 3208. The entry platform 3208 may be located adjacent the base wall 32201, and may extend from about the opening 3230, to about the location where snare 3710, and triggering mechanism 3400 are provided. The entry platform 3208 stops short of the triggering mechanism so that after traversing the length of the entry platform 3208, the rodent may only proceed further toward the rear wall 3203 of the housing 3200 by stepping onto the triggering mechanism 3400.

In an exemplary embodiment, the latching mechanism 3600 may include a biasing means to bias the latching mechanism 3600 toward the latched position. For example, in embodiments in which latching flange 3620 is pivotally connected with the housing 3200, a spring coil may be operatively coupled with the latch flange 3620, to provide a biasing force to keep the latching flange 3620 in the latched position. The biasing force provided by said biasing means should be sufficient to maintain the latching mechanism 3600 in its latched position, and the triggering mechanism 3400 should be able to provide sufficient force to overcome this biasing force, to move the latch flange 3620 to its released position. It will be appreciated that various devices may be provided that are sufficient to provide such a biasing force to the latching mechanism 3400.

In exemplary embodiments, an attractant 3430 may be provided to draw a rodent toward the rear wall 3203 of the housing 3200. Suitable attractants 3430 may include a bait, such as a food or chemical bait, a fragrance, a rodenticide, or other suitable means for attracting the rodent toward the rear portion 3220 of the housing 3200. It will be appreciated that there are various suitable attractants 3430 that may be incorporated into the trap 3100, to provide the same or similar function described herein. In exemplary embodiments, the attractant 3430 should entice a rodent toward the rear portion 3220 of the housing 3200, so that the rodent will be likely to actuate the triggering mechanism 3400.

Figure 56:
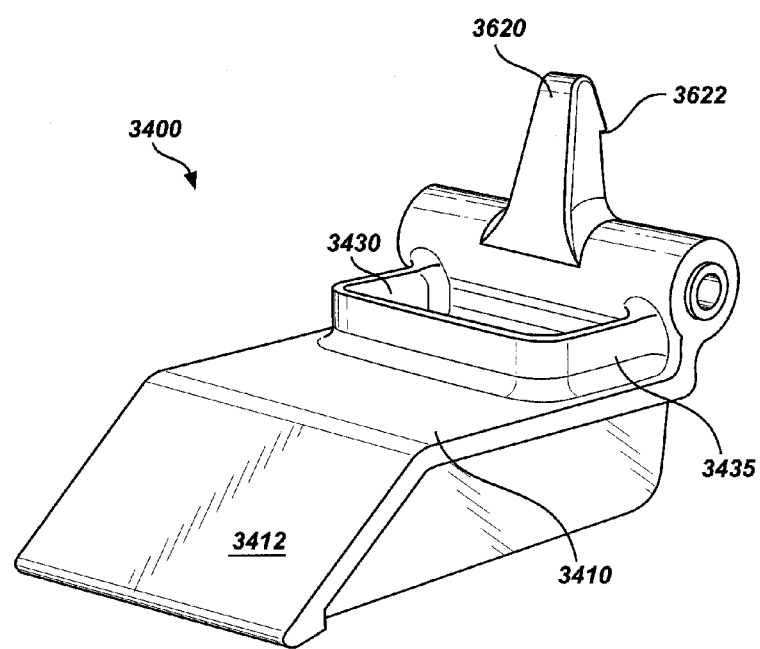
FIG. 56 depicts a perspective view of a triggering mechanism, in accordance with an exemplary embodiment.

In an exemplary embodiment, triggering mechanism 3400 may have a triggering plate 3410 that is located adjacent the base 3201 of the housing 3200. The triggering plate 3410 may be configured so that when a rodent steps on the plate 3410, the plate 3410 is depressed, actuating the triggering mechanism 3400. In exemplary embodiments, the triggering plate 3410 is located above the entry platform 3208, so that a rodent should climb up to the triggering plate 3410. As illustrated in FIG. 56, in the exemplary embodiments the triggering plate 3410 may have a leading edge 3412 that provides an inclined surface leading from the entry platform 3208 to the triggering plate 3410.

In various exemplary embodiments in which an attractant 3430 is provided, an attractant receptacle 3435 may be provided on the triggering mechanism 3400, to receive the attractant 3430. For example, in the exemplary embodiment illustrated in FIG. 56, the attractant receptacle 3435 may be provided on the rearward portion of the triggering plate 3410. In this exemplary configuration, the rodent should step at least partially onto the triggering plate 3410 to get close to the attractant 3430. It will be understood that there are other locations within the housing that the attractant 3430 and/or the attractant receptacle 3435 may be disposed, to ensure that the rodent will likely step onto the triggering plate 3410, or otherwise actuate the triggering mechanism 3400.

In various exemplary embodiments, the trap 3100 may be provided to the user with an attractant 3430 already installed.

For example, when a user obtains the trap 3100, an attractant 3430 may be disposed in the housing 3200. In certain exemplary embodiments, the trap 3100 may be provided with an attractant 3430, but the user should expose the attractant 3430 prior to use. For example, the attractant 3430 may be provided in the housing 3200 with a plastic or foil wrapper that should be removed by the user prior to use, or the attractant 3430 may be provided in a blister pack to which the user applies pressure in order to expose the attractant 3430. In certain exemplary embodiments, the user may expose the attractant 3430 from outside of the housing 3200. In other exemplary embodiments, the trap 3100 may be provided with one or more means for inserting the attractant 3430 into the housing 3200, or replacing old or spent attractant 3430. For example, in the exemplary embodiment illustrated in FIG. 50, an openable tray 3250 may be provided, into which a user may deposit the attractant 3430, and then close. In other exemplary embodiments, such as one illustrated in FIG. 5, one or more cutaways 3255 may be provided to insert an attractant 3430, or remove and replace an attractant 3430. Where such a cutaway is provided, it is preferred that the cutaway 3255 is small enough so as not to provide an entrance or exit point for a rodent. It is appreciated that alternative means for inserting attractant 3430, removing attractant 3430, or both may be provided in trap 3100, such as, for example a groove or opening for receiving a pre-baited device.

In various exemplary embodiments, the triggering mechanism 3400, once actuated, may directly or indirectly release the latching mechanism 3600 from the latched position. For example, in exemplary embodiment shown in FIGS. 51 and 52, the triggering plate 3410 may be pivotally connected to the housing 3200 at trigger pivot means 3420. Latch flange 3620 may also be pivotally connected to the trigger pivot means 3420, and rigidly connected to the triggering mechanism 3400, as illustrated in FIG. 56. In this exemplary configuration, when triggering plate 3410 is depressed, the triggering mechanism 3400 pivots about pivot means 3420, causing the latch flange 3620 to simultaneously pivot about pivot means 3420. When latch flange 3620 has moved a sufficient distance, it releases from corresponding latch flange 3610, which releases the snapper plate 3300.

It is understood that other suitable triggering mechanisms 3400 may be used in the trap 3100 of the exemplary embodiments suitable triggering mechanism 3400 should be configured to be actuated by a rodent. For example, a suitable triggering mechanism 3400 may actuated by a rodent pushing or nuzzling against a trigger. Alternatively, a triggering mechanism 3400 may be provided that is triggered by other means such as an electronic sensing device.

As mentioned above, when the latching mechanism 3600 is released from its latched position, the snapping plate 3300 and/or housing 3200 are moveable and biasing mechanism 3500 may move the snapping plate 3300 and/or housing 3200 toward the snapped position. In the snapped position, the front portion 3310 of the snapper plate 3300 closes the opening of the housing 3200, confining a rodent inside the housing 3200. The biasing mechanism 3500 should provide sufficient action such that the snapping plate 3300 and/or housing 3200 move to the snapped position almost simultaneously with the actuation of the triggering mechanism 3400 and the release of the latching mechanism 3600. In addition the biasing mechanism should provide sufficient force so that when the snapper plate 3300 and/or housing 3200 are in the snapped position, a rodent trapped inside cannot manipulate the housing 3200 or the snapper plate 3300 and open them. As described above, it will be appreciated that there are various suitable biasing mechanisms 3500 that may be incorporated into the trap 3100 to provide the features described herein.

Figure 55:
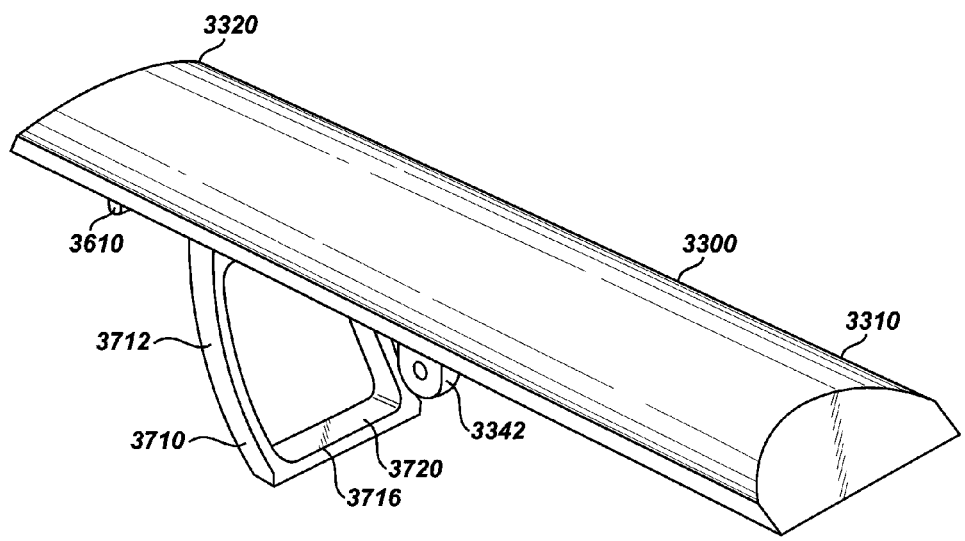
FIG. 55 depicts a perspective view of a snapper plate, in accordance with an exemplary embodiment.

In exemplary embodiments, when the snapper plate 3300 and/or housing 3200 are in the snapped position a snare 3700 further entraps a rodent inside the trap. For example, as shown in FIG. 55, snapper plate 3300 has a snare loop 3710 that extends from the rear portion 3320 of the snapper plate 3300. When the snapper plate 3300 is in the open position, the snare loop 3710, extends through the hole into the rear portion 3220 of the housing 3200, generally encircling the housing 3200, as shown in FIGS. 51-52. When the snapper plate 3300 is in the snapped position, the rear portion 3320 of the snapper plate 3300 is raised, the snare loop 3710 is lifted toward the upper wall of the housing 3200, as shown in FIG. 52. The snare loop 3710, and triggering mechanism 3400 may be configured so that when a rodent actuates the triggering mechanism, the snare loop 3710 encircles at least a portion of the rodent. For example, as shown in FIG. 51, the snare loop 3710 is located just forward of the trigger plate 3410, so that when a rodent depresses the trigger plate 3410 with its front paw, the snare loop 3710 encircles the portion of the rodent behind its front paws. It will be appreciated that snare loop 3710 may be positioned in various positions within the housing 3200, such that it is calculated to encircle at least a portion of the rodent when the rodent actuates the triggering mechanism 3400. For example, the snare loop 3710 could be disposed forward in the housing 3200, so that it is configured to encircle a lower portion of the torso of the rodent in the snapped position. Alternatively, the snare loop 3710 may be disposed more rearward in housing 3200, so that it is configured to encircle the neck or head of the rodent in the snapped position.

In the exemplary embodiments, when the snare loop 3710 is lifted by snapper plate 3300, it carries with it at least a portion of the rodent that actuates the triggering mechanism 3400. Preferably, when the housing 3200 and snapper plate 3300 is in its fully snapped position, the snare loop 3710 constricts the rodent against the upper wall, as shown in FIG. 53. As discussed above, the biasing mechanism 3500 is configured so that the rodent is snared in the snare loop 3710 about simultaneously with the release of the latching mechanism 3600. Furthermore, the biasing mechanism 3500 provides sufficient force to hold the snared rodent so that it cannot free itself from the snare.

In the exemplary embodiment illustrated in FIG. 55, snare loop 3710 is a semi-rigid member, downwardly depending from snapper plate 3300. The snare loop 3710 is at least partially defined by two downward projecting sides, such as sides 3712 and 3714 illustrated in FIG. 55, and a base member 3716 joining sides 3712 and 3714. The snare loop 3710 may have any suitable shape, so long as it is sufficient to encircle the housing 3200 when it is in a set position, and sufficient to constrict a rodent when it is in a raised position. The snare loop 3710 may be rigid, semi-rigid, flexible, or combinations thereof. The snare loop 3710 should have at least sufficient strength to hold a rodent, and constrict it when the snare loop 3710 is in a lifted or raised position. In the exemplary embodiments, the snare loop 3710 further has an inward facing surface 3720, that faces the ensnared rodent. In certain exemplary embodiments, the inward facing surface 3720 may have various surface features, such as grooves, or rides, or teeth-like projections, that assist the snare 3710 in holding the ensnared rodent within the snare 3710.

In various exemplary embodiments, the traps are configured for a single use. Accordingly, the trap and its members or components may be made of a relatively inexpensive material, such as a thin-walled rigid polymeric material that may be injection molded in to the desired shapes. For example, the housing 102 may be made of a polymeric material, such as rigid styrene polymers and co-polymers. Other suitable materials include acrylonitrile-butadiene-styrene (ABS), or poly-vinyl-chloride (PVC). It is appreciated that other suitable polymeric materials, and/or suitable non-polymeric materials, may be selected for the construction of the trap or its component parts.

In certain exemplary embodiments, each of the component described herein are injection molded to a desired shape. In some exemplary embodiments, each component may be molded as a single, unitary molded part. In other exemplary embodiments, the component may be molded in multiple parts that are joined or attached together to form the component. The various means for designing molds, and joining various parts to form one component will be understood by one familiar with such processes and parts.

Although various embodiments of the traps are illustrated, the traps are not limited to the disclosed embodiments. For example, a trap may include different triggers and/or platforms. In such embodiments, the animal may position itself on a platform or trigger plate and triggers the trap. When triggered, a biasing element causes the platform or trigger plate to pivot towards the back wall of the trap thereby trapping the animal between the platform or trigger plate and back wall (or blunt fingers).

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

The invention claimed is:

1. A trap comprising:
   a housing having an entrance, a first wall, and a base extending therebetween;
   a latch mechanism coupled with the base;
   a pivoting platform pivotally coupled with the housing adjacent a juncture of the base and the first wall of the housing, and adapted to releasably engage with the latch mechanism;
   a trigger plate assembly comprising a first trigger plate pivotally coupled with the pivoting platform and operably coupled with the latch mechanism; and a second trigger plate pivotally coupled with the pivoting platform and operably coupled with the first trigger plate;
   wherein the trigger plate assembly, when triggered by a rodent, disengages the pivoting platform from the latch mechanism, and the pivoting platform and trigger plate assembly pivot towards the first wall of the housing, moving the rodent toward the first wall of the housing and trapping the rodent between the trigger plate assembly and the first wall of the housing.

2. The trap of claim 1, wherein the rodent triggers the trap by depressing a portion of the second trigger plate.

3. The trap of claim 1, wherein the rodent triggers the trap by depressing a portion of the first trigger plate.

4. The trap of claim 2, wherein the second trigger plate, when depressed, acts as a lever to apply force to the first trigger plate.

5. The trap of claim 1 further comprising a biasing element coupled to the pivoting platform and biasing the pivoting platform towards the first wall.

6. The trap of claim 5 wherein the biasing element is a double-segmented torsion spring.

* * * * *